US011509455B2

(12) United States Patent
Trevethan et al.

(10) Patent No.: US 11,509,455 B2
(45) Date of Patent: Nov. 22, 2022

(54) BLOCKCHAIN FOR GENERAL COMPUTATION

(71) Applicant: nChain Licensing AG, Zug (CH)

(72) Inventors: Thomas Trevethan, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 242 days.

(21) Appl. No.: 16/620,865

(22) PCT Filed: Jun. 4, 2018

(86) PCT No.: PCT/IB2018/053979
§ 371 (c)(1),
(2) Date: Dec. 9, 2019

(87) PCT Pub. No.: WO2018/224943
PCT Pub. Date: Dec. 13, 2018

(65) Prior Publication Data
US 2020/0204346 A1 Jun. 25, 2020

(30) Foreign Application Priority Data
Jun. 9, 2017 (GB) ..................................... 1709188

(51) Int. Cl.
*H04L 29/06* (2006.01)
*H04L 9/06* (2006.01)
(Continued)

(52) U.S. Cl.
CPC ............ *H04L 9/0637* (2013.01); *H04L 9/085* (2013.01); *H04L 9/3218* (2013.01);
(Continued)

(58) Field of Classification Search
CPC ..... H04L 9/0637; H04L 9/085; H04L 9/3218; H04L 9/3236; H04L 9/3271; H04L 9/3297; H04L 2209/38; G06F 21/64
See application file for complete search history.

(56) References Cited

U.S. PATENT DOCUMENTS 9,442,941 B1 * 9/2016 Luz ........................ G06F 3/061
11,188,977 B2 * 11/2021 Youb ..................... G06Q 30/02
(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Mahfuzur Rahman
(74) *Attorney, Agent, or Firm* — Davis Wright Tremaine LLP

(57) ABSTRACT

There may be provided a computer-implemented method. It may be implemented using a blockchain network such as, for example, the Bitcoin network. The computer-implemented method includes: i) monitoring a computational task distribution system to detect a challenge to a proposer string provided by a proposer computer system in response to a request made by a requester computer system, the request specifying a computational task and a first digital asset associated with the request, the proposer string indicated by a hash of a solution to the computational task, the proposer string specifying a second digital asset referenced in an input to a proposer transaction associated with the proposer string; and ii) as a result of detecting the challenge, at least: a) resolving the challenge using a first blockchain network by at least selecting a solution from a set of solutions provided to the first blockchain network, the set of solutions at least including the proposer string; and b) distributing digital assets from the first digital asset and the second digital asset
(Continued)

to one or more parties of the computational task distribution system based at least in part on the solution.

15 Claims, 23 Drawing Sheets

(51) Int. Cl.
*H04L 9/08* (2006.01)
*H04L 9/32* (2006.01)
*H04L 9/00* (2022.01)

(52) U.S. Cl.
CPC .......... *H04L 9/3236* (2013.01); *H04L 9/3271* (2013.01); *H04L 9/3297* (2013.01); *H04L 9/50* (2022.05)

(56) References Cited

U.S. PATENT DOCUMENTS

| | | | |
|---|---|---|---|
| 2009/0327141 A1* | 12/2009 | Rabin | H04L 9/3218 708/250 |
| 2010/0145951 A1* | 6/2010 | Van Coeverden De Groot | H04L 63/123 707/747 |
| 2016/0330034 A1 | 11/2016 | Back et al. | |
| 2017/0046638 A1 | 2/2017 | Chan et al. | |
| 2017/0163733 A1 | 6/2017 | Grefen et al. | |
| 2018/0246717 A1* | 8/2018 | Martin | H04L 9/0643 |
| 2020/0162264 A1* | 5/2020 | Zamani | H04L 9/3297 |

OTHER PUBLICATIONS

Bartoletti et al., "A Proof-of-Stake Protocol for Consensus on Bitcoin Subchains," Universita degli Studi di Cagliari, Italy, 2017, 16 pages.

De La Rouviere, "An Intro to TrueBit: A Scalable Decentralized Computational Court," https://medium.com/@simondir/an-intro-to-truebit-a-scalable-decentral, Jul. 5, 2016, 9 pages.

Ethereum Foundation, "TrueBit: Scalable Computation—Christian Reitwiessner," YouTube, https://www.youtube.com/watch?v=sO2tEOBBFOE, Mar. 29, 2017 [retrieved Apr. 12, 2022], 13 pages.

Gerbus et al., "FAQ Golernractory/Golem Wiki," https://github.com/golemfactory/golem/wiki/FAQ [retreieved Aug. 31, 2017], 5 pages.

International Search Report and Written Opinion dated Aug. 6, 2018, Patent Application No. PCT/IB2018/053979, 12 pages.

Nakamoto, "Bitcoin: A Peer-to-Peer Electronic Cash System," Bitcoin, Oct. 31, 2008, https://bitcoin.org/bitcoin.pdf, 9 pages.

Pipermerriam, "Ethereum-Computation-Market," https://github.com/pipermerriam/ethereum-computationmarket/blob/master/docs/overview.rst [retrieved Aug. 31, 2017], 2 pages.

Poon et al., "Plasma: Scalable Autonomous Smart Contracts," retrieved from https://plasma.io/plasma.pdf, Aug. 11, 2017, 47 pages.

Satoshi et al., "Connection Limits," Bitcoin Forum, Aug. 9, 2010, https://bitcointalk.org/index.php?topic=741.0;prev_next=prev, 2 pages.

Teutsch et al., "A scalable verification solution for blockchains," Nov. 16, 2017, https://people.cs.uchicago.edu/~teutsch/papers/truebit.pdf, 50 pages.

UK Commercial Search Report dated Sep. 4, 2017, Patent Application No. GB1709188.5, 8 pages.

UK IPO Search Report dated Nov. 10, 2017, Patent Application No. GB1709188.5, 6 pages.

Wood et al., "Polkadot: Vision for A Heterogeneous Multi-Chain Framework," retrieved from https://github.com/polkadot-io/polkadotpaper, Sep. 10, 2016, 21 pages.

Zawistowski et al., "Golem," The Golem Project Crowdfunding Whitepaper, Nov. 2016, 28 pages.

Zyskind et al., "Enigma: Decentralized Computation Platform with Guaranteed Privacy," arXiv preprint arXiv:1506, Jun. 10, 2015, 14 pages.

\* cited by examiner

BLOCKCHAIN FOR GENERAL COMPUTATION

This invention relates generally to distributed systems, and more particularly to methods and systems for improving reliability in transactions on a distributed system. The invention is particularly suited, but not limited to, use in improving the reliability of computations in a computational task distribution system.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While "Bitcoin" may be referred to herein as a useful application of the technology described in the present disclosure, for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention. For example, techniques described in the present disclosure would provide advantages to utilising blockchain implementations and with other cryptocurrencies that have similar constraints on verification of the blockchain and/or verification of the cryptocurrency transactions as Bitcoin, regardless whether an exchange of a cryptocurrency occurs.

A blockchain is a consensus-based, electronic ledger that is implemented as a computer-based decentralised, distributed system made up of blocks that in turn may be made up of transactions and that, in an embodiment, includes additional information. In some examples, a "blockchain transaction" refers to an input message encoding a structured collection of field values comprising data and a set of conditions, fulfillment of the set of conditions being prerequisite for the set of fields to be written to a blockchain data structure A blockchain may also be referred to a peer-to-peer electronic ledger as there is no centralized system for managing the ledger and the transactions of the ledger may be validated using a consensus protocol between the nodes of the distributed system. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions that have been written to the blockchain since its inception. Transactions contain small programs known as scripts embedded into their inputs and outputs, which specify how and by whom the outputs of the transactions can be accessed. On the Bitcoin platform, these scripts may be written using a stack-based scripting language. It should be noted that a stack-based scripting language may refer to a programming language that supports various stack-based or stack-oriented execution models and operations, but in some cases is not limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin). Scripts written in a stack-based scripting language may be pushed onto a logical stack that can be implemented using any suitable data structure such as a vector, list, or stack.

As used herein, a "digital asset" may be a unit of a resource managed by a blockchain. In some embodiments, such as with Bitcoin, the resource is untokenized so that, for instance, there is no identifier of the resource identified in the blockchain, but rather control of the resource is demonstrated through the ability to generate a valid transaction that becomes recorded on the blockchain. Note, however, that some blockchain implementations may use tokenized resources so that, for example, resources are specifically identifiable using information recorded on the blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets. A "digital asset," as used in the present disclosure, may refer to one or more digital assets. For example, a transaction may have multiple inputs and each of those inputs may represent different digital assets. A digital asset whose control is transferred may be, in this example, a collection of multiple digital assets, the collection itself being a digital asset. Similarly, a transaction may subdivide and/or combine those multiple inputs to produce one or more outputs so that, for example, the number of inputs and the number of outputs may be different.

In order for a transaction to be written to the blockchain, it must be "validated". Validity may be determined by the nodes based on a common set of rules that are used by a majority of nodes with block generation power. For example, in the Bitcoin protocol, some network nodes act as "miners" and perform work to ensure that each transaction is valid, with invalid transactions rejected from the network. In some examples, a "miner" is a computational system that performs work to ensure that each transaction is valid, with invalid transactions rejected from the network. For example, software clients installed on the nodes perform this validation work on transactions that reference unredeemed transaction outputs (UTXO) by executing associated locking and unlocking scripts. If executions of the locking and unlocking scripts evaluate to TRUE and, if certain other conditions are met, the transaction is valid and the transaction is written to the blockchain. Thus, in order for a transaction to be written to the blockchain, it is i) validated by a node that receives the transaction (i.e., if the transaction is validated, the node relays it to the other nodes in the network); ii) added to a new block built by a miner; and iii) mined (i.e., added to the public ledger of past transactions).

In recent times, digital entrepreneurs have begun exploring the use of both the cryptographic security system Bitcoin is based on and the data that can be stored on the Blockchain to implement new systems. It would be highly advantageous if the blockchain could be used for automated tasks and processes that are not limited to the realm of cryptocurrency. Such solutions would be able to harness the benefits of the blockchain (e.g. a permanent, tamper proof records of events, distributed processing, etc.) while being more versatile in their applications.

A blockchain is largely immutable and can often be anonymous. The immutable and largely anonymous nature of blockchain technology presents a number of technical challenges when guarding users against malicious behaviour. For example, because a number of blocks built on a block that includes a transaction cause the transaction to be practically irreversible, refunds are often not available and new technical systems are required in order to maintain the integrity of transactions. Such challenges are also difficult due to the decentralized trustless nature of blockchain technology. That is, there is no central party to ensure the integrity of transactions and transaction integrity is instead achieved through technical means. It would, therefore, be desirable for blockchain technology to improve reliability in transactions.

Reliability challenges may be present in computational task distribution systems. Computational task distribution systems are services that allow for off-chain execution of expensive computations. Such computational task distribution systems allow a node in a network to outsource the execution of an algorithm to another remote node. The result of the algorithm is then reported back to the node that outsourced the operation of the algorithm. The node receiving the result may not know whether the result is reliable. For the receiving node to determine whether the answer is correct, the receiving node would, in general, need to execute the algorithm themselves, which would defeat the purpose of the outsourcing. It would, therefore, be desirable for blockchain technology to improve the reliability of results in a computational task distribution system.

The present disclosure describes technical aspects of one or more blockchain-based computer programs. A blockchain-based computer program is a machine readable and executable program recorded in a blockchain transaction. A blockchain-based computer program comprises rules that can process inputs in order to produce results, which can then cause actions to be performed dependent upon those results. If a locking script can access both the unlocking and previous transactions, the blockchain can be utilized to enable highly flexible and complex blockchain-based computer programs. One area of current research is the use of blockchain-based computer programs for the implementation of "smart contracts". Unlike a traditional contract, which would be written in natural language, smart contracts are computer programs designed to automate the execution of the terms of a machine-readable contract or agreement.

Another area of blockchain-related interest is the use of 'tokens' (or 'coloured coins') to represent and transfer real-world entities via the blockchain. A potentially sensitive or secret item can be represented by the token that has no discernible meaning or value. The token thus serves as an identifier that allows the real-world item to be referenced from the blockchain.

Thus, it is desirable to provide methods and systems that improve blockchain technology in one or more of these aspects.

Thus, in accordance with the invention, there is provided a method as defined in the appended claims.

Therefore, in accordance with the invention there may be provided a computer-implemented method (and corresponding system(s)) as defined in the appended claims. The method may be described as a method for implementing a computational task distribution system using a blockchain network. The computer-implemented method includes: i) monitoring a computational task distribution system to detect a challenge to a Proposer string provided by a Proposer computer system in response to a request made by a Requester computer system, the request specifying a computational task and a first digital asset associated with the request, the Proposer string indicated by a hash of a solution to the computational task, the Proposer string specifying a second digital asset referenced in an input to a Proposer transaction associated with the Proposer string; and ii) as a result of detecting the challenge, at least: a) resolving the challenge using a first blockchain network by at least selecting a solution from a set of solutions provided to the first blockchain network, the set of solutions at least including the Proposer string; and b) distributing digital assets from the first digital asset and the second digital asset to one or more parties of the computational task distribution system based at least in part on the solution.

The ghost chain may be a temporary blockchain. In contrast to a traditional blockchain, the ghost chain may be configured to terminate, disappear and/or expire upon performance or satisfaction of one or more criteria, goal or designated purpose. That is, the ghost chain may be a single-purpose blockchain that ceases operations once its purpose has been achieved. The ghost chain may include a first block, which may be referred to as a genesis block, and that may be created for deployment of the ghost chain or created for a purpose, criteria, or goal of the ghost chain.

The computer-implemented method may also include: cooperating with other nodes of the group to construct a transaction, transferable to the group, with a bounty and Proposer deposit as input and the bounty and the Proposer deposit and a Challenger deposit as output and providing the transaction to the Challenger for adding of the Challenger deposit as input. The bounty (e.g., Proposer deposit and Challenger deposit), in an embodiment, is a value in a transaction that serves as a signal to another computer system that work is available to be performed with the value indicating the significance of the work relative to other bounties. In some embodiments, the bounty is a digital asset. The bounty, in an embodiment, upon being recorded in a first transaction on the blockchain, enables another computer system in the blockchain network to cause a second transaction to be written to the blockchain (e.g., by successfully unlocking the locking script of the first transaction as a result of executing the unlocking script of the second transaction). The bounty and Proposer deposit may be placed under control of the group prior to construction of the Challenger transaction. For example, the bounty and Proposer deposit may be placed under exclusive control of the group when the challenge is detected within a time period following committal by the Proposer to a solution to the request.

The Proposer string may be selected from the set of solutions based at least in part on a timestamp associated with the Proposer string.

The challenge may specify a hash of a Challenger string to the computational task and the set of solutions includes the Challenger string.

The computational task distribution system may be implemented as a webservice associated with a proof-of-work blockchain network.

The computational task distribution system may be implemented on a proof-of-work blockchain network.

The first blockchain network may be a proof-of-stake blockchain network.

The Proposer string may indicate that there is no solution to the computational task.

The challenge may indicate that there is no solution to the computational task.

The digital assets may include a deposit provided by the Proposer to the first blockchain network.

The digital assets may be distributed from the first digital asset, the second digital asset, and a third digital asset referenced in an input to a transaction associated with the challenge.

Resolving the challenge may include performing a corresponding set of verification operations of one or more solutions of the set of solutions.

Resolving the challenge may include performing an arbitration procedure that at least includes receiving, from the Proposer, a first set of intermediate results for the Proposer string of the set of solutions. Additionally or alternatively, resolving the challenge may include receiving, from a Challenger, a second set of intermediate results for a Challenger string of the set of solutions. Additionally or alternatively, resolving the challenge may include comparing the first set of intermediate results to the second set of intermediate results to determine a location where the Proposer string and the Challenger string diverge. Additionally or alternatively, resolving the challenge may include selecting a solution based at least in part on repeating one or more calculations of the first set of intermediate results at the location using the first blockchain, and/or repeating one or more calculations of the second set of intermediate results at the location using the first blockchain.

Resolving the challenge may at least include identifying an incorrect solution of the set of solutions by at least receiving, from the Proposer, a first set of intermediate results for the Proposer string of the set of solutions. Additionally or alternatively, resolving the challenge may include receiving, from a Challenger, a second set of intermediate results for a Challenger string of the set of solutions. Additionally or alternatively, resolving the challenge may include analyzing the first set of intermediate results and the second set of intermediate results to identify a location where the Proposer string and the Challenger string diverge. Additionally or alternatively, resolving the challenge may include identifying the incorrect solution based at least in part on the analyzing. In some implementations of the computer-implemented method, deploying the ghost chain to resolve the challenge may include performing a task associated with the request on the ghost chain to determine a correct solution of the one or more Proposer strings and/or of the one or more Challenger strings.

In some implementations of the computer-implemented method, deploying the ghost chain to resolve the challenge may include performing a portion of the task on the ghost chain to determine that one of the Proposer or the Challenger has erred in an intermediate step of a task associated with the request.

In some implementations of the computer-implemented method, terminating the ghost chain may include transferring information pertaining to the resolution of the challenge to the proof-of-work blockchain network.

In some implementations of the computer-implemented method, terminating the ghost chain may include constructing a terminal block that includes a record of mining distributions due for blocks created during a signing of a final transaction.

In accordance with the invention, there may be provided an electronic device. The electronic device includes an interface device, a processor coupled to the interface device and a memory coupled to the processor. The memory has stored thereon computer executable instructions that, when executed, configure the processor to perform a method described herein.

In accordance with the invention, there may be provided a computer readable storage medium. The computer readable storage medium includes computer-executable instructions that, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which.

Figure 1:
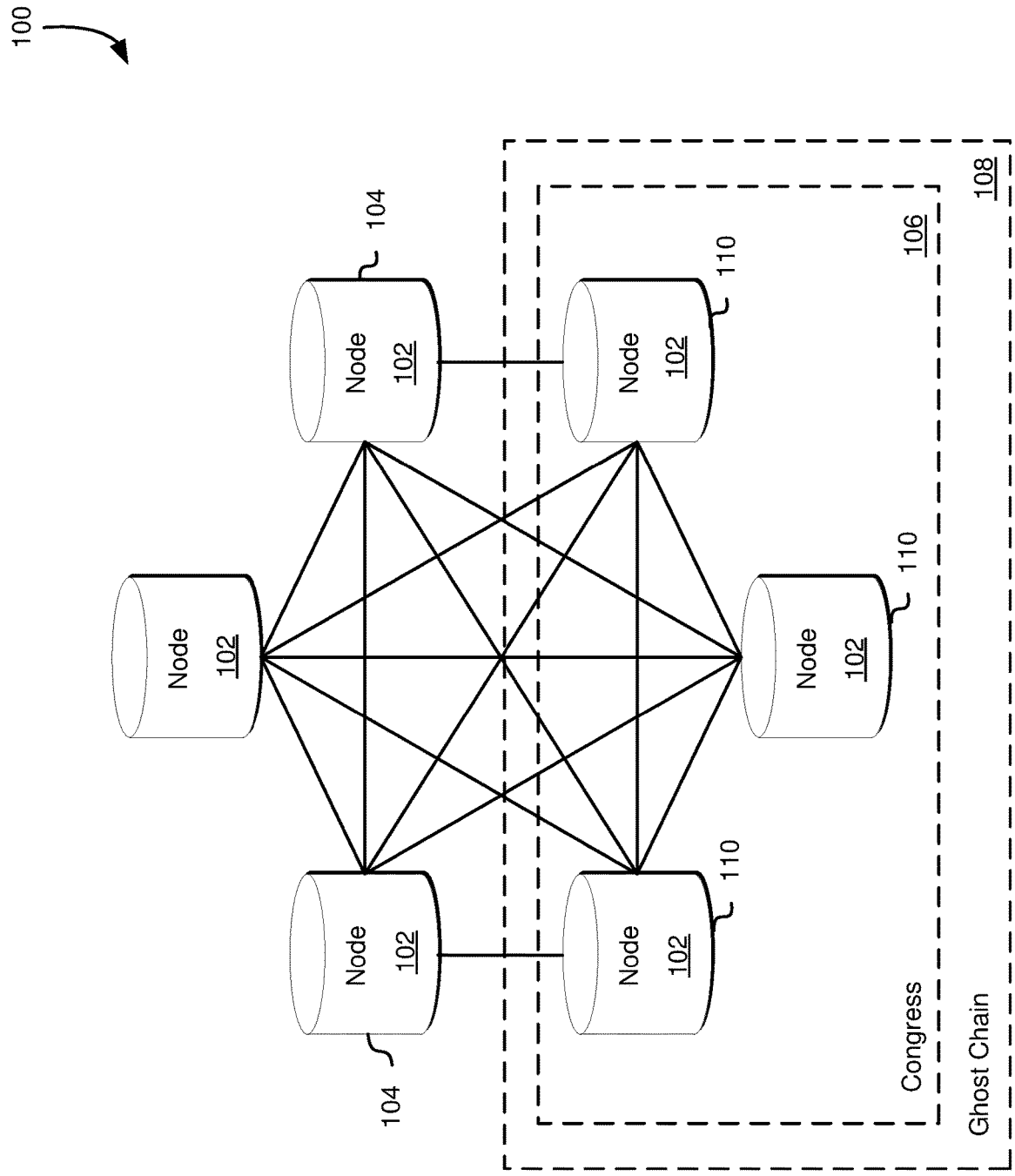
FIG. 1 illustrates a block diagram of an example blockchain network.

Reference will first be made to FIG. 1, which illustrates, in block diagram form, an example blockchain network 100 associated with a blockchain. The blockchain network may be a public blockchain network, which is a peer-to-peer open membership network that may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 may be coupled to one another using suitable communication technologies that may include wired and wireless communication technologies. Such communication adheres to the protocol associated with the blockchain. For example, where the blockchain is a Bitcoin blockchain, the Bitcoin protocol may be used.

Nodes 102 maintain a global ledger of all transactions on the blockchain. Thus, the global ledger may be a distributed ledger. Each node 102 may store a complete copy or a partial copy of the global ledger. In the case of a blockchain secured by proof-of-work, transactions by a node 102 affecting the global ledger may be verified by other nodes 102 so that the validity of the global ledger is maintained. When the blockchain is a proof-of-work based blockchain, blocks may be also verified by checking the proof-of-work submitted with the block.

At least some of the nodes 102 operate as mining nodes 104 of the blockchain network 100. The blockchain network 100 of FIG. 1 may be a proof-of-work blockchain in which mining nodes 104 perform expensive computations in order to facilitate transactions on the blockchain. For example, the proof-of-work blockchain may require miners to solve a cryptographic problem. In Bitcoin, the mining nodes 104 find a nonce such that a block header hashes, with SHA-256, to a number that is less than a value defined by the current difficultly. The hashing power required for the proof-of-work algorithm means that a transaction may be considered practically irreversible after a certain number of blocks have been mined on top of it. A mining node 104 who solves the cryptographic problem creates a new block for the blockchain and broadcasts the new block to other nodes 102. The other nodes 102 verify that the mining node 104 has, in fact, solved the cryptographic problem and has, therefore, demonstrated sufficient proof-of-work before accepting that the block should be added to the blockchain. The block may be added to the blockchain (i.e., to the distributed global ledger) by consensus of the nodes 102.

The block created by the mining node 104 may include transactions that had been broadcast to the blockchain by nodes 102. For example, the block may include transactions from an address associated with one of the nodes 102 to an address associated with another of the nodes 102. In this way, the block serves as a record of a transaction from one address to another. The party that requested that the transaction be included in the block proves that they are authorized to initiate the transfer (e.g., in the case of Bitcoin, to transfer the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets, to or from a public key (e.g., transferring to the public key) and transferring digital assets to or from the address associated with that public key refer to a common operation.

Some of the nodes 102 may not operate as mining nodes and may, instead, participate as validating nodes. Validation of transactions may involve checking signature(s), confirming reference to valid UTXO, etc.

The example of FIG. 1 includes six nodes 102, two of which are participating as mining nodes 104. In practice, the number of nodes 102 or mining nodes 104 may be different. In many blockchain networks, the number of nodes 102 and mining nodes 104 may be much greater than the number illustrated in FIG. 1.

As will be explained below, various nodes 102 may cooperate to form a group, referred to herein as a congress 106. In the example illustrated, three nodes 102 are shown as taking part in the congress 106. However, the actual number of congress 106 members may be much larger.

The congress 106 may be an open-membership group that may be joined by any nodes 102 upon submission of sufficient stake to a pool associated with the congress 106. For example, a node may join a congress through transfer of a digital asset, such as digital currency (such as Bitcoin), tokens or other stake or value, to an account associated with the congress 106. A node 102 joining a congress may be any node in the blockchain network including both mining and non-mining nodes. In at least some applications of a congress, a node acting as a congress member monitors the blockchain in the sense that they download (but not necessarily retain) the full blockchain. Techniques for joining, leaving and participating in a congress 106 will be discussed in greater detail below.

As will be described in greater detail below, members of the congress may form a temporary ghost chain network 108. The ghost chain first blockchain network creates and maintains a distributed ledger, referred to herein as a ghost chain. The ghost chain network 108 may be deployed during the method described herein to verify reliability or to arbitrate when a challenge has been raised to a Proposer string that was generated in response to a request. For example, the ghost chain network 108 may be deployed to verify the integrity of processor-generated work product, which may be work product submitted by a node 102 of the blockchain network 100. For example, the ghost chain network 108 may be deployed to arbitrate an algorithmic-related dispute generated on the blockchain network 100. Such a dispute may exist where the reliability of processor-generated work product of one node has been challenged by another node.

The ghost chain may be a temporary blockchain. Unlike a traditional blockchain, the ghost chain may be configured to terminate once it has achieved its purpose as described herein. That is, the ghost chain may be a single-purpose blockchain that ceases to exist once its purpose has been achieved. The ghost chain includes a first block, referred to as a genesis block, may only be created when the ghost chain is deployed for its purpose (e.g., to verify the integrity of processor-generated work product).

While the blockchain associated with the blockchain network is a proof-of-work blockchain, the ghost chain may be a proof-of-stake blockchain. The proof-of-stake based ghost chain network 108 provides an alternative mechanism for achieving consensus. In the proof-of-stake ghost chain, the blockchain may be secured by proof-of-stake rather than proof-of-work. Under proof-of-stake, the mining nodes 110 of the ghost chain deposit a deposit of digital assets and, the probability of being selected as the node to mine a block may be proportional to the quantum of the digital assets provided as deposit. Proof-of-stake blockchain systems can be used to avoid the computational expense and energy required to mine on proof-of-work blockchains. Further, proof-of-stake blockchains can allow for higher frequency and more regular block creation than proof-of-work blockchains.

A plurality of nodes 102 function as mining nodes 110 of the ghost chain network 108. At least some of the mining nodes 110 of the ghost chain network 108 may not serve as mining nodes 104 of the blockchain network 100. Since the ghost chain network 108 may be a proof-of-stake blockchain network, the mining nodes 110 deposit digital assets in order to be included as mining nodes. More particularly, the mining nodes 110 for the ghost chain form a bonded validator set in order to mine on the ghost chain network 108. These mining nodes 110 may also be members of a congress 106 associated with the blockchain network 100. That is, nodes 102, which may be part of both the proof-of-work blockchain network 100 and the ghost chain network 108, act as mining nodes 110 for the ghost chain network 108 and as members of a congress 106 established on the proof-of-work blockchain network 100. These mining nodes 110 join the congress 106 and take part in the congress 106 according to methods described below. Their deposit of digital assets into a congress pool may be made in the proof-of-work blockchain. That is, the congress members deposit their "stake" on the proof-of-work first blockchain network 100 to become congress members, which allows them to act as mining nodes 110 on the ghost chain by forming a bonded validator set. The congress 106 may be an open-membership group that may be joined by any nodes upon submission of sufficient stake to a pool associated with the congress 106.

It should be noted that the computer-implemented method described herein describes a computational marketplace that may be implemented on Bitcoin (or some other such blockchain) that lacks a sufficiently-rich scripting language rather than a blockchain-based computational marketplace that may be implemented on a blockchain that has a sufficiently-rich scripting language (i.e., a scripting language that may be used to implement the blockchain-based computational marketplace). More specifically, a scripting language that may be used to implement the blockchain-based computational marketplace may be sufficiently rich to perform the functionality for adjudicating between a Proposer and a Challenger (e.g., to determine the winner) in the event that the Proposer string is challenged, as described herein. In the case where there is no challenge, a computational marketplace may be executed from start to finish on Bitcoin (or some other similar blockchain) without invoking additional protocols and without additional functionality such as the congresses and ghost chains described herein. For example, Ethereum has a sufficiently-rich scripting language such that it may be used to implement a blockchain-based computational marketplace (e.g., it has a scripting language that is sufficiently rich to perform the functionality for adjudicating between a Proposer and a Challenger). See, for example, a description of Truebit at https://people.cs.uchicago.edu/~teutsch/papers/truebit.pdf, which describes such a system).

The computer-implemented method described herein describes how a computational marketplace can be implemented on a more limited platform such Bitcoin (or some other such blockchain) using additional temporary proof-of-stake blockchains (e.g., ghost chains) and congress protocols for resolving challenges to Proposer strings. In the computer-implemented method described herein, the distributions layer (e.g., Bitcoin) retains the security associated with its restricted scripting language. For example, using the computer-implemented method described herein (i.e., using ghost chains and congresses in concert with a network such as Bitcoin), it may be more difficult (and, in some embodiments, impossible) to create complex blockchain-based computer programs such that their behaviour is difficult or even impossible to predict. However, one could create complex blockchain-based computer programs such that their behaviour may be difficult or even impossible to predict on a blockchain protocol with such a sufficiently-rich scripting language (e.g., Ethereum). By implementing the additional functionality for the computational marketplace on top of a protocol such as Bitcoin (e.g., using ghost chains and congresses) the security of the underlying blockchain (on which funds reside) may be unaffected and it may be thus more difficult (and, in some embodiments, impossible) to create complex blockchain-based computer programs such that their behaviour may be difficult or even impossible to predict.

Figure 2:
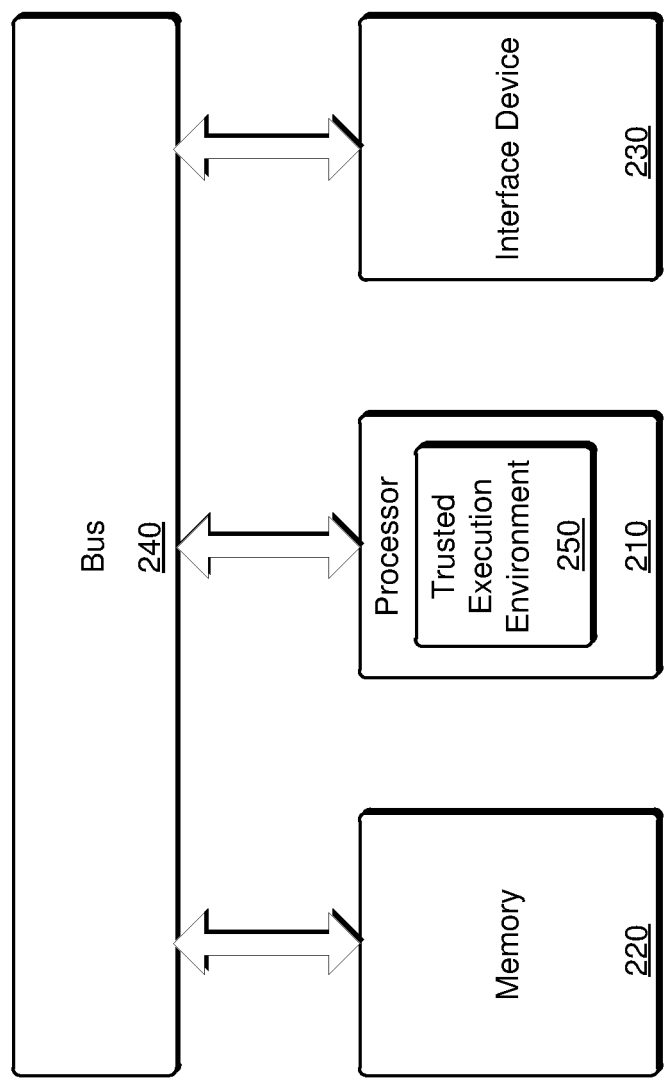
FIG. 2 illustrates a block diagram of an example electronic device that may function as a node in a blockchain network.

FIG. 2 illustrates, in block diagram form, an example electronic device 200 that may function as a node (e.g. a node such as one of the nodes 102 illustrated in connection with FIG. 1) in a blockchain network as described in connection with FIG. 1 and in accordance with an embodiment (e.g., a blockchain network such as the blockchain network 100 illustrated in connection with FIG. 1). The example electronic device 200 may function as a node such as one of the nodes 102 illustrated in connection with FIG. 1 in a blockchain network such as the blockchain network 100 illustrated in connection with FIG. 1. In an embodiment, the blockchain network is a peer-to-peer blockchain network.

FIG. 2 is a block diagram illustrating components of an example electronic device 200 that may serve as a node 102 in a peer-to-peer blockchain network 100. The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions that, when executed by the processor 210, cause the electronic device to perform a method described herein. The processor-executable instructions may include instructions that, when executed by the processor 210, cause the electronic device to implement a protocol associated with the blockchain network 100. For example, the instructions may include instructions for implementing the Bitcoin protocol.

The memory 220 may store the global ledger of the blockchain network 100 or a portion thereof. That is, the memory 220 may store all blocks of the blockchain or a portion of the blocks, such as the most recent blocks, or a portion of the information in some blocks.

Further, while a ghost chain is deployed, the memory 220 may store the ghost chain, or a portion thereof.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a Trusted Execution Environment (TEE) 250. The TEE 250 may be an isolated execution environment that provides additional security to the electronic device 200 such as isolated execution, integrity of Trusted Applications and asset confidentiality. The TEE 250 provides execution space that guarantees that the computer instructions and data loaded inside the TEE 250 may be protected in terms of confidentiality and integrity. The TEE 250 may be used to protect the integrity and confidentiality of important resources, such as keys. The TEE 250 may be implemented, at least in part, at a hardware level so that instructions and data executed within the TEE 250 may be protected against access and manipulation from the rest of the electronic device 200 and from external parties such as the owner of the electronic device. The data and computations within the TEE 250 may be secured from the party operating the node 102 that includes the TEE 250.

The TEE 250 may operate to instantiate an enclave and then add pages of memory one at a time, while cumulatively hashing. As used herein, an enclave may be an isolated memory region of data within the TEE 250 that is protected from outside access. Application code and data may be put into an enclave using special instructions. An enclave is generally protected from outside access using hardware security. As used herein and unless otherwise made clear from context, an enclave may be the same as and may be instantiated within the TEE 250.

A similar operation to instantiate an enclave may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it may be locked down. It is possible to run the code in the TEE 250 and to send secrets to the code, but the code may not be changed. A final hash may be signed by an attestation key and may be made available to a data owner to verify it before the data owner sends any secrets to the enclave.

The TEE 250 may be used to protect the confidentiality and integrity of a private key share associated with a congress public key used by the congress 106 (described above in connection with FIG. 1). For example, the TEE 250 may be used for the generation and storage of private key shares. The TEE 250 may be intended to ensure that no member is able to directly obtain the private key share held within the TEE 250 enclave, or information about other private key shares from inter-member communication or inter-enclave communication. The protocol may also be robust against the compromise of a threshold of enclaves. Further, the TEE 250 may enable remote attestation, which may be used by a node 102 to prove to other nodes 102 that a TEE 250 is authentic and is running approved computer executable instructions for a protocol that is implemented by a congress 106. Remote attestation may be provided by the TEE 250 by running a particular piece of code and sending a hash of the code, internal to the enclave, signed by an internal attestation key for the enclave.

The TEE 250 may be used to attest to secure deletion of the private key share when a member of a congress 106 who has previously used the private key share on the electronic device 200 has chosen to leave the congress. The electronic device 200 may signal attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

The TEE 250 may be equipped with a secure random number generator, which may be internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given hash of member known as a quote. A third-party attestation service such as Intel Attestation Service (IAS) may certify that these signed statements originate from authentic CPUs conforming to the SGX specification.

The electronic device 200 acts as a node 102 (FIG. 1) in the blockchain network 100 (FIG. 1) and may join and otherwise take part in a congress 106. A congress 106 may be formed when a group of digital asset bearers pool digital assets, such as digital currency, tokens or other stake or value supported by the blockchain network 100.

The congress 106 may be a permissioned or non-permissioned group. That is, the congress 106 may be joined by any node 102 (FIG. 1) in the blockchain network 100 (FIG. 1) (i.e., by any node that monitors and stores at least a portion of the information in the blockchain). To join the congress 106, a node 102 transfers one or more digital assets to a digital asset pool associated with the congress 106 (i.e., to a public group address associated with one or more digital assets that are, in turn, associated with other members of the congress). This digital asset pool may be referred to as a congress pool. For example, a node 102 may join a congress 106 by transferring (i.e., depositing) such digital assets to an address associated with the congress pool (i.e., to a "congress address" that may also be referred to as a public group address). The digital assets may be placed under the control of a group threshold signature with a single public key, referred to as a congress public key. Congress members hold private key shares that may be distributively generated. The number of shares held may be in proportion to the amount deposited in the pool.

The digital assets that are controlled by the congress 106, which include any digital assets transferred to the congress address, may be placed under the control of a threshold signature scheme. Under the threshold signature scheme, a group of members whose total private key shareholdings exceed a threshold may be needed to produce a valid signature that allows the digital assets to be transferred away from control of the congress 106. That is, at least a threshold number of private key shares must be used to generate a valid signature for any outgoing transfer of digital assets controlled by the congress 106.

The congress public key encumbers the digital assets deposited in the congress pool by the members of the congress 106 in return for private key shares, and any digital assets deposited to the address associated with the congress pool (i.e., placed under full, partial or conditional control of the congress) by members or non-members of the congress 106 that have been deposited for reasons other than obtaining private key shares. Non-members or members may deposit digital assets to the address associated with the congress for various reasons.

Since the same congress public key may encumber both member deposits (i.e., digital assets provided by congress members in return for private key shares) and digital assets provided by members or non-members for other purposes, at least some deposits to the address associated with the congress may be specially flagged to indicate the type of deposit. For example, a transaction that transfers the digital asset to the congress address may include a flag, identifier or other attribute that indicates the nature of the deposit being made. By way of example, a transaction that transfers the digital asset to the congress address that may not be made for the purpose of joining a congress or boosting a stake in congress membership may include a special identifier to indicate that the deposit is being made for another purpose. Such identifiers may be used by nodes 102 associated with the congress 106 when managing private key generation. More particularly, nodes 102 that deposit digital assets for the purpose of joining the group may be allocated private key shares for the congress 106 (e.g., as a result of making the deposit of digital assets) while other nodes 102 that deposited digital assets for other purposes (e.g., to transfer to an altchain) may not hold congress private key shares for the congress (i.e., corresponding to the congress public key).

The congress 106 may act as a self-governing group in which cooperative behaviour is enforced through the threat of confiscation of all or part of the member deposit. Non-cooperative or malicious members may have such digital assets confiscated by participation in a cooperative protocol by a number of honest members. Further, when a congress member wishes to leave the congress 106, they may withdraw their member deposit (i.e., request that the congress 106 transfer the member deposit back to that member's personal address). However, withdrawal of funds may only be performed if a number of private key shares exceeding a threshold required to generate a valid digital signature are used by members of the group (i.e., the congress) to approve the withdrawal.

The threshold signature scheme implemented by the congress 106 may be of various types. The threshold signature scheme allows sharing of signing power between n parties as long as at least a threshold number of private key shares have contributed towards generating a valid signature. Accordingly, any subset of private key shares that is smaller than the threshold may not be used to generate a valid signature. More particularly, each of the parties controls a share of a private signing key and a threshold number of key shares must be used to generate a valid signature through the combining of partial signatures. Any subset of key shares that is less than the threshold may not be used to generate a valid signature through the combination of partial signatures.

The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme", 2003 EIII 46th Midwest Symposium on Circuits and Systems, 1:276-280 (2003). This threshold signature scheme may be an extension of a digital signature scheme, which is an elliptic curve cryptography based algorithm in which t+1 key shares from a party of n key shareholders may be required to reconstruct a private key. The scheme may be used to construct a valid signature without having to reconstruct a private key and without any party having to reveal their key share to another party.

Since t+1 key shares may be sufficient to reconstruct the secret, the maximum number of permissible adversaries according to this technique is t. An adversary, in the model of Ibrahim et al., may be an entity that has corrupted a party holding a secret share and has access to that secret share. Adversaries can be of various types. For example, a Byzantine adversary is an adversary who may pretend to participate in a protocol while they are, in fact, sending incorrect information. The ECDSA scheme proposed by Ibrahim may be robust against up to $t<=n/4$ malicious adversaries. This robustness could rise to $t<=n/3$, but at the cost of greater complexity.

The ECDSA scheme of Ibrahim et al. may be robust against halting $t=n/3$ halting adversaries. A halting adversary may be able to prevent a corrupted party from participating in a protocol or halt participation part-way through.

This ECDSA scheme includes various mechanisms that could be used by the nodes 102 to identify a malicious or uncooperative party. For example, verifiable secret sharing (VSS) may be used to share a polynomial required for Shamir's Secret Sharing (SSS). SSS may be a form of secret sharing in which a secret is divided into parts and provided to each participant in its own unique part. These parts may be used to reconstruct the secret. VSS may be used, by the nodes 102, to identify a malicious node 102 or member if inconsistent shares may be provided to different nodes 102 or if a share is secretly sent to a node that is different than the blinded share that is broadcast to all nodes. Inconsistent shares may be identified by any one of the nodes 102. The sharing of the secret may be made verifiable by including auxiliary information that allows nodes 102 to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of Publically Verifiable Secret Sharing (PVSS). Such techniques may avoid a possible delay in the identification of a cheating sender that might occur where PVSS is not used and a recipient of an incorrect share is off line or cut off from a substantial fraction of the network when the incorrect share is sent.

Misbehaviour, such as providing inconsistent shares to different nodes, may be addressed by a congress 106 to deter malicious behaviour. For example, when a node 102 (FIG. 1) is identified by other nodes 102 as a malicious party, a number of nodes 102 (i.e., nodes associated with congress members) exceeding a threshold (e.g., t+1) may cooperate to penalize the malicious party. For example, the nodes 102 may take action involving a digital asset (such as digital currency, tokens or other stake or value) deposited to the congress by the malicious party. For example, the congress may burn the digital currency, tokens, stake or value by transferring them to a return address or the congress may confiscate such digital assets by refusing to authorize their return to the malicious party. The nodes 102 that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, the manufacturer could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it may be useful to contemplate the robustness of the protocol to "corrupted nodes". A corrupted node may be a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key may be as trustworthy as the enclave itself. Hence, a corrupted node may not send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim, et al. may be robust against 2t corrupted nodes. Because a signature can be produced if $n-2t>=2t+1$, any qualified subset of key shares of size $2t+1<=(n+1)/2$ may be sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets via a New DSA/ECDSA threshold signature scheme", (2015). This protocol allows t+1 parties to produce a valid signature. Consequently, the number of key shares an adversary has to control to produce a valid signature may be equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of t+1 players out of n. Thus, for large values of both n and t, a large number of key shares may need to be stored. To mitigate such storage requirements, standard Bitcoin multi-signatures could be combined with threshold signatures. In particular, digital assets could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen et al., *Efficient Multiparty Protocols via Log-Depth Threshold Formulae* (2013), Advances in Cryptology—CRYPTO 2013 pp 185-202.

Other threshold schemes may be used including non-ECDSA signature schemes. For example, a threshold scheme based on a Schnorr scheme may be used by the nodes 102 to implement the congress 106.

Nodes in the blockchain network may implement a congress protocol based on the selected threshold signature scheme. Such nodes may include computer-executable instructions stored in memory such as the memory 220 described in connection with FIG. 2, which implement the congress protocol. Such instructions, when executed by a processor such as the processor 210 described in connection with FIG. 2, cause a node such as an electronic device 200 of the type described in connection with FIG. 2 to perform one or more methods of the congress protocol. Such methods may include any one or combination of the example processes described herein. Thus, the congress protocol may include one or more of the example processes such as those described herein. The example processes may be performed by a node cooperatively with other nodes associated with other congress members.

Figure 3:
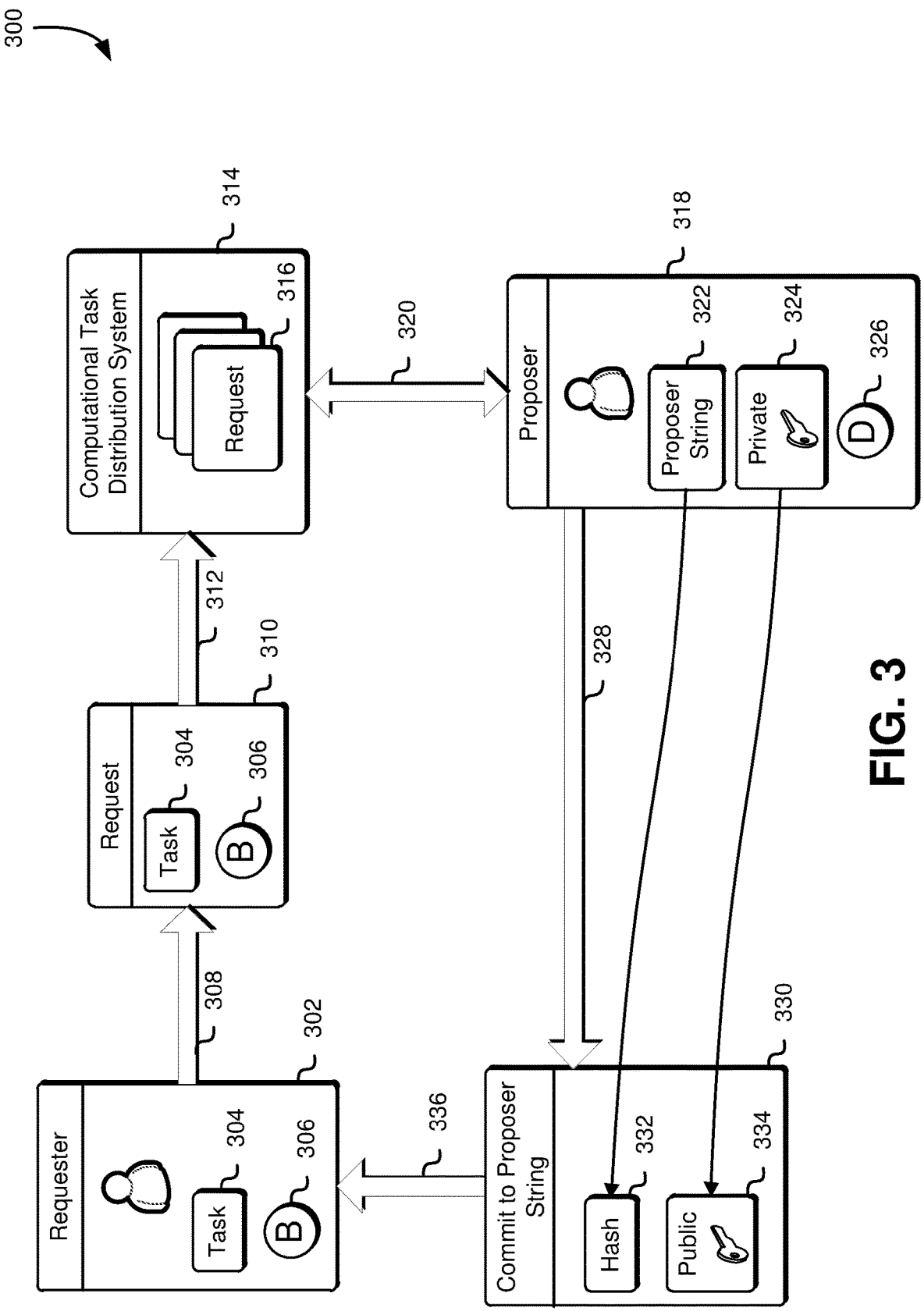
FIG. 3 illustrates a block diagram of an example environment where a task request may be generated and a solution may be proposed for a computational task distribution system associated with a blockchain network.

FIG. 3 illustrates, in block diagram form, an example environment 300 where a task request may be generated and a solution may be proposed for a computational task distribution system associated with a blockchain network as described in connection with FIG. 1 and in accordance with an embodiment. In the example environment 300 illustrated in FIG. 3, a Requester 302 with a task 304 initiates 308 a request 310 that includes the task 304 and a proposed distribution 306 for completing the task 304. The task 304 may be a task to solve some problem that requires a certain amount of computational power to solve. In an illustrative example, the task 304 is task to determine whether a certain number is factorable and, if so, what the factors for that number are. Other examples of tasks may be tasks to determine an optimal solution to a problem, to determine a solution to within a certain prescribed threshold value, or other such tasks. The task 304 may be a single computationally intensive tasks or may be a combination of a large number of tasks that, while not individually computationally intensive, may require a great deal of computational power to solve in the aggregate.

The proposed distribution 306 may be an amount of a digital asset that is significant enough to attract an entity to determine a solution to the task (i.e., to attract an entity to expend enough computational power to determine a solution). As may be contemplated, if the proposed distribution 306 is too low, few (or no) solutions may be provided to the Requester and/or the solutions may be low quality. Conversely, if the proposed distribution 306 is unreasonably high, too many solutions may be provided to the Requester and while a larger number of solutions may provide an increased confidence in the answer or answers, an excessively large number of solutions may be difficult to process.

In the example environment 300 illustrated in FIG. 3, the request 310 may be posted to a computational task distribution system 314 that may include a plurality of such requests 316. In an embodiment, the computational task distribution system is associated with a blockchain network (e.g., Bitcoin), such as those described in connection with FIGS. 1 and 2, and is implemented as a webpage where Requesters post requests for solutions as described herein. In such an embodiment, the computational task distribution system 314 may include one or more webservices and/or one or more application programming interfaces ("APIs") usable to, for example, post requests for solutions, post notifications of Proposer strings in response to such requests, and/or post notifications of challenges to Proposer strings. In such an embodiment, the blockchain network is used to enable the parties to request solutions, to provide solutions, and to challenge solutions in a trustless environment (i.e., in an environment where there is no central party to ensure the integrity of transactions and transaction integrity is achieved using the blockchain network).

In an embodiment, the blockchain network serves as an append-only public notice board (i.e., notices may not be removed from the notice board, they can only be added). This is because, once a block of the blockchain is confirmed, every node of the blockchain network can see the information contained in the block and every piece of information in a block is timestamped and immutable. By using a blockchain network to request solutions, to provide solutions, and to challenge solutions as described herein, parties can be assured that the requests, the solutions, and the challenges may be immutable. It should be noted that in an embodiment, the computational task distribution system 314 does not require the blockchain network to post requests for solutions, post notifications of Proposer strings in response to such requests, and/or post notifications of challenges to Proposer strings (e.g., to advertise requests such as the request 310) to the computational task distribution system 314.

In an embodiment, the computational task distribution system 314 is implemented on the blockchain network (e.g., Bitcoin) such as those described in connection with FIGS. 1 and 2. In such an embodiment, the request 310 is mined to the blockchain network of the computational task distribution system 314 as a transaction, as described in detail below. In such an embodiment, the Requester 302 may operate as a node of the blockchain network.

A Proposer 318, which may also operate as a node of the blockchain network that the blockchain network is associated with or where the computational task distribution system 314 is implemented, may monitor 320 the computational task distribution system 314 to identify any requests that include distributions that the Proposer deems sufficient to interest the Proposer 318 to expend computing power to solve the associated task. In the example illustrated in FIG. 3, the Proposer has identified the request 310 as having a proposed distribution 306 that is sufficient to interest the Proposer to generate a solution to the task 304 (referred to herein as a "Proposer string"). It should be noted that, unless explicitly stated or made clear by context, any proposed solution from a Proposer is a Proposer string (which may also be referred to herein simply as a "solution") so that, for example, a proposed solution (e.g., a Proposer string) from a Proposer may be referred to simply as a "proposed solution" or as a "Proposer string" rather than as a "proposed Proposer solution" or as a "proposed Proposer string."

Although not illustrated in FIG. 3, the Proposer 318 may be one of a plurality of Proposers that propose solutions in hopes of claiming the proposed distribution. For example, one task (i.e., one request) may generate dozens, hundreds, thousands, or more Proposer strings. In an embodiment, a solution is chosen from the plurality of Proposers based at least in part on a timestamp associated with the solution. For example, in an embodiment, a solution may be chosen because it is the first received solution (i.e., because the timestamp associated with the solution is earlier than other timestamps of other solutions of other Proposers).

If the Proposer 318 is able to generate a Proposer string 322 (i.e., using computation that, in an embodiment, is off the blockchain network), the Proposer 318 generates a commit to the Proposer String using a hash 332 of the Proposer string 322, generates a private key 324 signing the solution, and generates 328 the commit to the Proposer string 330 (which includes the hash 332 of the Proposer string 322) and a public key 334 (corresponding to the private key 324) so that the commit to the Proposer string 330 may be securely sent 336 to the Requester 302. As used herein, a Proposer string may be a piece of data generated by the Proposer and sent to the Requestor, which the Proposer asserts is the output of the requested computational task. Similarly, as used herein, a Challenger string may be a piece of data generated by the Challenger and made available to the congress (described below) within the challenge period, which the Challenger asserts is the output of the requested computational task and that is different from the Proposer string (i.e., presents a different solution).

As used herein, a solution can be one of several different items, depending on the embodiment. In one embodiment, a solution is a Proposer string that has survived a challenge period. In one embodiment, a solution is either a Proposer string or a Challenger string where the corresponding string agrees with an on-chain computation that was triggered by a challenge to a solution as described herein. Also as used herein, a proposed solution may be either a Proposer string (if provided by a Proposer) or a Challenger string (if provided by a Challenger in response to a Proposer string). Also as used herein, a Commit to a solution may be a hash of a solution (as described above). A Commit to a solution may be used in contrast to a Commit to a Proposer string, which may be a hash of a Proposer string provided to a Requestor and in contrast to a Commit to a Challenger string, which may be a hash of a Challenger string provided to the congress.

It should be noted that the commit to the Proposer string using the hash 332 of the Proposer string 322 may be referred to herein simply as the "hash" such as, for example, the hash 332 in the commit to the Proposer string 330. In an embodiment, the commit to the Proposer string 330 may also be sent as a transaction on the blockchain network (as described herein). As used herein, a commit to the Proposer string contains a proposed solution (e.g., the Proposer string 322).

It should be noted that the solution commitment 330 does not include the Proposer string 322, but merely a hash 332 of the Proposer string 322 so that the Requester 302 can be assured that the Proposer actually has a solution to the task. In an embodiment, a purpose of sending the commit to the Proposer string 330 is so that the Requestor can be assured that the string that is later purchased (as, for example, the solution) is the same as the string that passed the challenge period (described below) and is therefore the solution to the task. The Requestor can verify this by comparing the hash values. However, the Proposer string 322 (i.e., the hash pre-image of the commit to the Proposer string) may be later mined to the blockchain network so that the Proposer 318 can collect the proposed distribution (i.e., the bounty that has been offered by the Requestor) when the solution is provided to the Requester 302. By using transactions on the blockchain network, the Requester may not access the solution without forfeiting the proposed distribution 306 and the Proposer may not claim the proposed distribution 306 until the Proposer string 322 is verified, both as described herein. Pursuant to that, in an embodiment, the Proposer provides a deposit 326 with the hash 332 of the Proposer string 322, which is sufficient to give for verifying the solution in the event of challenge (as described below) and that is returned to the Proposer if there is no challenge.

Implementation of the computational task distribution system 314 on a blockchain network prevents bad faith actions on the part of the Requester 302 (e.g., deciding not to recognize a valid solution by not accepting it or deciding to provide a distribution for a solution once it is received) or on the part of the Proposer (e.g., proposing a solution that is not verified (i.e., does not pass adjudication) or not providing the solution upon receiving a distribution) since the blockchain network facilitates transactions between mutually untrusted parties without requiring a central "escrow" agent while enabling fair exchange of solutions for distributions. If a valid Proposer string 322 to a task 304 is presented by the Proposer 318 (barring a challenge, as described herein), the proposed distribution 306 may be distributed by the Requester 302.

Although not illustrated in FIG. 3, there is one example case where a distribution may be distributed without a valid solution. If the task 304 is a task without a valid solution, then "no solution" may be the only valid solution. For example, if the task is to determine a prime number factorization of the number 51, the solution is 3 and 17 (i.e., two prime numbers that, when multiplied, equal 51). However, if the task is to determine a prime number factorization of the number 52 with exactly two factors, there is no solution (2, 2, and 13 may be a solution, but not a valid solution according to the task). Although these may be simple tasks, they illustrate the problem of how a Proposer can indicate that there is no solution while still obtaining the distribution. For a considerably more difficult task, determining that there is no solution may require a considerably amount of computational power.

As may be contemplated, if the Proposer indicates "no solution" by providing a hash of "no solution," the Requester may be able to easily recognize the hash and simply ignore the solution (i.e., not complete the transaction because the Requester would not need to complete the transaction to "know" the solution). Since the requestor could easily recognise this hash the Requester may have no reason to purchase the result from the Proposer.

One way to address this case may be to require a Proposer to concatenate an appropriate flag (for example, the words "no solution") with some other piece of information. In order to avoid the situation just described, the information may be something that only those who have performed the computation (and found that it has no solution) have access to. In an embodiment, the Proposer uses at least a portion of a transcript of the computation that resulted in no solution. The portion of the transcript may be used when the full transcript is very large since the hash pre-image (e.g., the solution) is mined into the blockchain for the Proposer to collect the bounty. Thus, a Proposer could use a sparse sample of the transcript, chosen according to an agreed formula as the pre-hash solution. This sample may then be concatenated with the flag indicating that no solution was found, hashed, and submitted to the requestor. Note that it would not be effective to send the sample of the transcript without a textual flag, since this could be mistaken for a solution to the computation.

Figure 4:
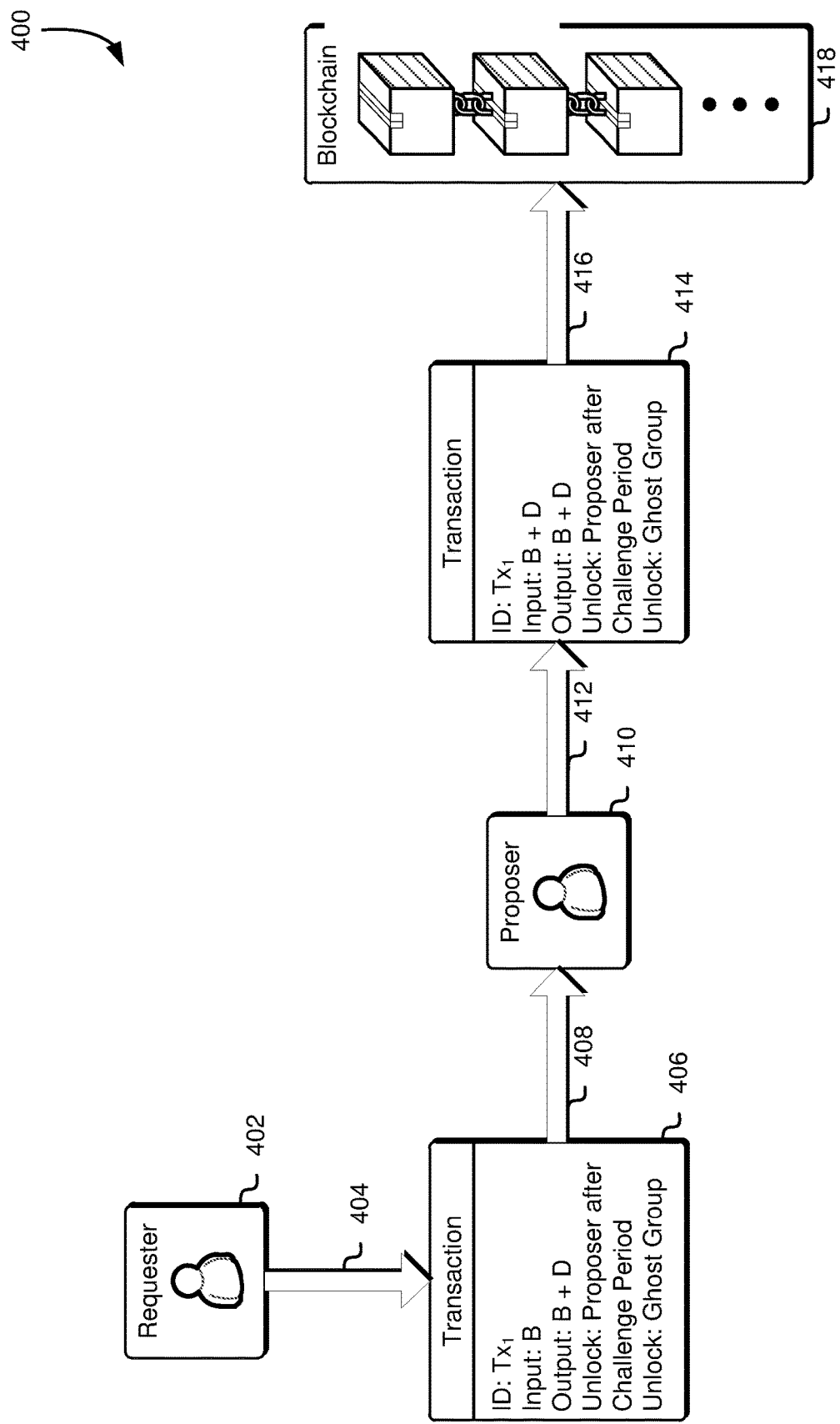
FIG. 4 illustrates a block diagram of an example environment where a blockchain transaction associated with a task request and a proposed solution may be generated for a computational task distribution system associated with a blockchain network.

FIG. 4 illustrates, in block diagram form, an example environment 400 where a blockchain transaction associated with a task request and a proposed solution may be generated for a computational task distribution system associated with a blockchain network as described in connection with FIG. 3 and in accordance with an embodiment. In the example environment 400 illustrated in FIG. 4, the Requester 402 provides 404 a first transaction 406 that has, as input, the proposed distribution ("B") and as its output, the proposed distribution plus the deposit of the Proposer ("D"). The output can be claimed by the Proposer after the challenge period (i.e., the period of time during which other nodes can challenge the solution of the Proposer, as described herein).

The first transaction 406 may be provided 408 to the Proposer 410 so that the Proposer 410 can add the deposit ("D") to the input to produce 412 the final first transaction 414, which may then be sent 416 to a blockchain 418 of the computational task distribution system (i.e., either the blockchain of the blockchain network that the computational task distribution system is associated with or the blockchain of the blockchain network where the computational task distribution system is implemented). It should be noted that the transactions where the Requester 402 provides 404 a first transaction 406, where the first transaction 406 is provided 408 to the Proposer 410, and where the Proposer 410 adds the deposit to the input to produce 412 the final first transaction 414 may all be performed using blockchain transactions of the blockchain 418 (e.g., on the Bitcoin blockchain) as described herein.

Figure 5:
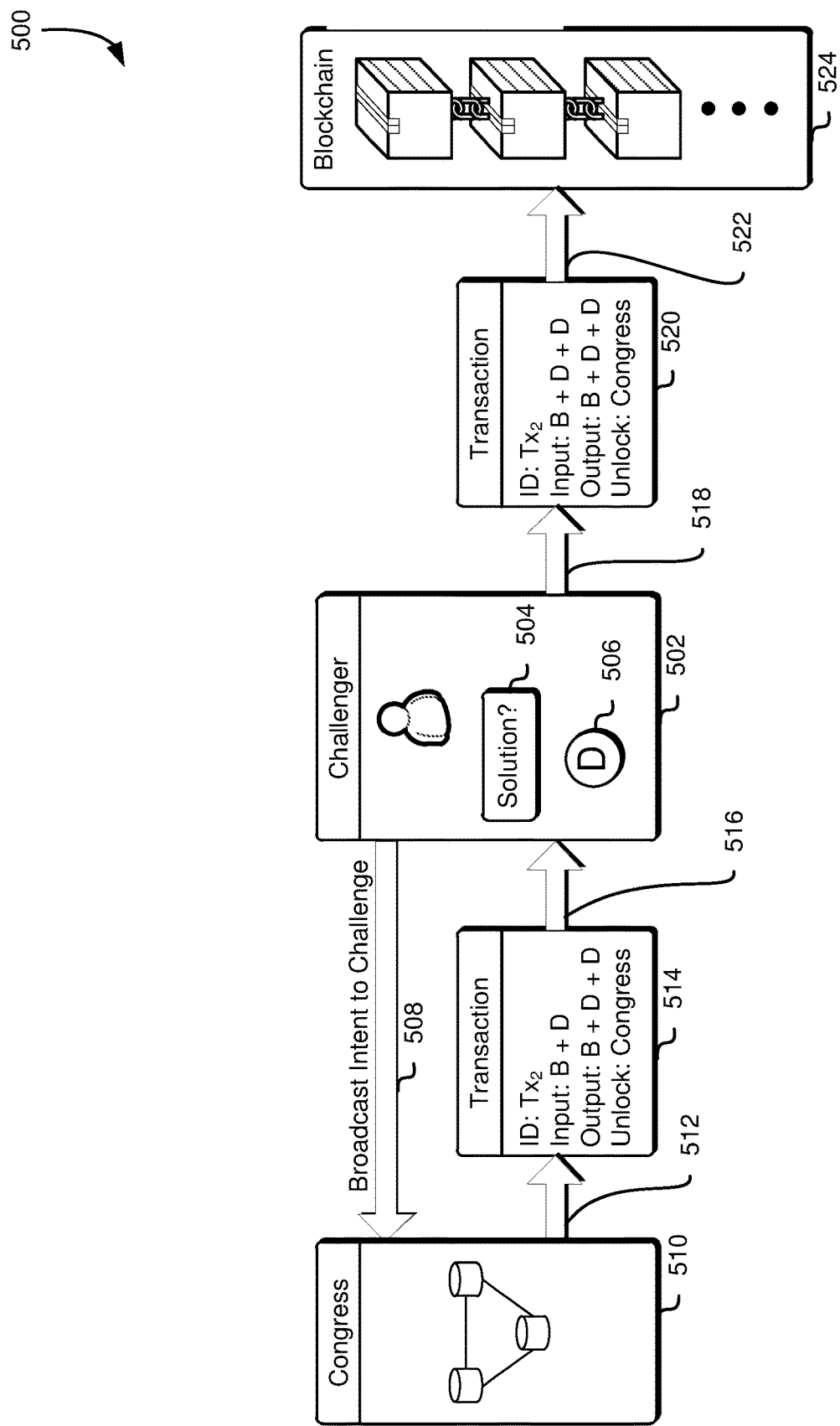
FIG. 5 illustrates a block diagram of an example environment where a blockchain transaction associated with a challenge to a proposed solution may be generated for a computational task distribution system associated with a blockchain network.

FIG. 5 illustrates, in block diagram form, an example environment 500 where a blockchain transaction associated with a challenge to a proposed solution may be generated for a computational task distribution system associated with a blockchain network as described in connection with FIG. 3 and in accordance with an embodiment. In the example environment 500 illustrated in FIG. 5, a Challenger 502 challenges the solution provided by the Proposer (as described herein) before the end of the challenge period.

In the example illustrated in FIG. 5, the Challenger 502 broadcasts 508 an intent to challenge the solution (i.e., by generating a blockchain transaction indicating an intent to challenge). The intent to challenge includes a deposit 506 that, in an embodiment, is enough to offset the effort in answering the challenge. In an embodiment, the deposit of the Proposer (described herein) and the deposit 506 of the Challenger are the same amount. In an embodiment, the Challenger also includes a hash of an alternate solution 504. The alternate solution 504 generated by the Challenger may be referred to herein as a "Challenger string." However, as with the Proposer string, it should be noted that, unless explicitly stated or made clear by context, any proposed solution from a Challenger (which may be referred to simply as a "solution") may be a Challenger string so that, for example, a proposed solution from a Challenger (e.g., a Challenger string) may be referred to simply as a "proposed solution" or as a "Challenger string" rather than as a "proposed Challenger solution" or as a "proposed Challenger string." In an embodiment, the Challenger 502 can challenge a proposed solution without a hash of an alternate solution 504 provided that the Challenger 502 provides the deposit 506.

In an embodiment, a transaction 514 may be generated 512 by the congress 510 in response to the challenge that includes the output of the previous transaction (the request transaction) as an input ("B+D") and the previous distribution plus the Proposer deposit and the Challenger deposit as an output ("B+D+D"). As with the first transaction, the second transaction may be provided 516 to the Challenger 502 so that the Challenger may add the Challenger deposit 506 to the input to produce 518 the updated transaction 520, which may in turn be mined 522 to the blockchain 524. As described above, each of the transactions illustrated in FIG. 5 may be performed using the blockchain. Although not illustrated in FIG. 5, the Challenger 502 may be one of a plurality of Challengers (i.e., each Proposer string may also generate dozens, hundreds, thousands, or more Challenger strings).

Figure 6:
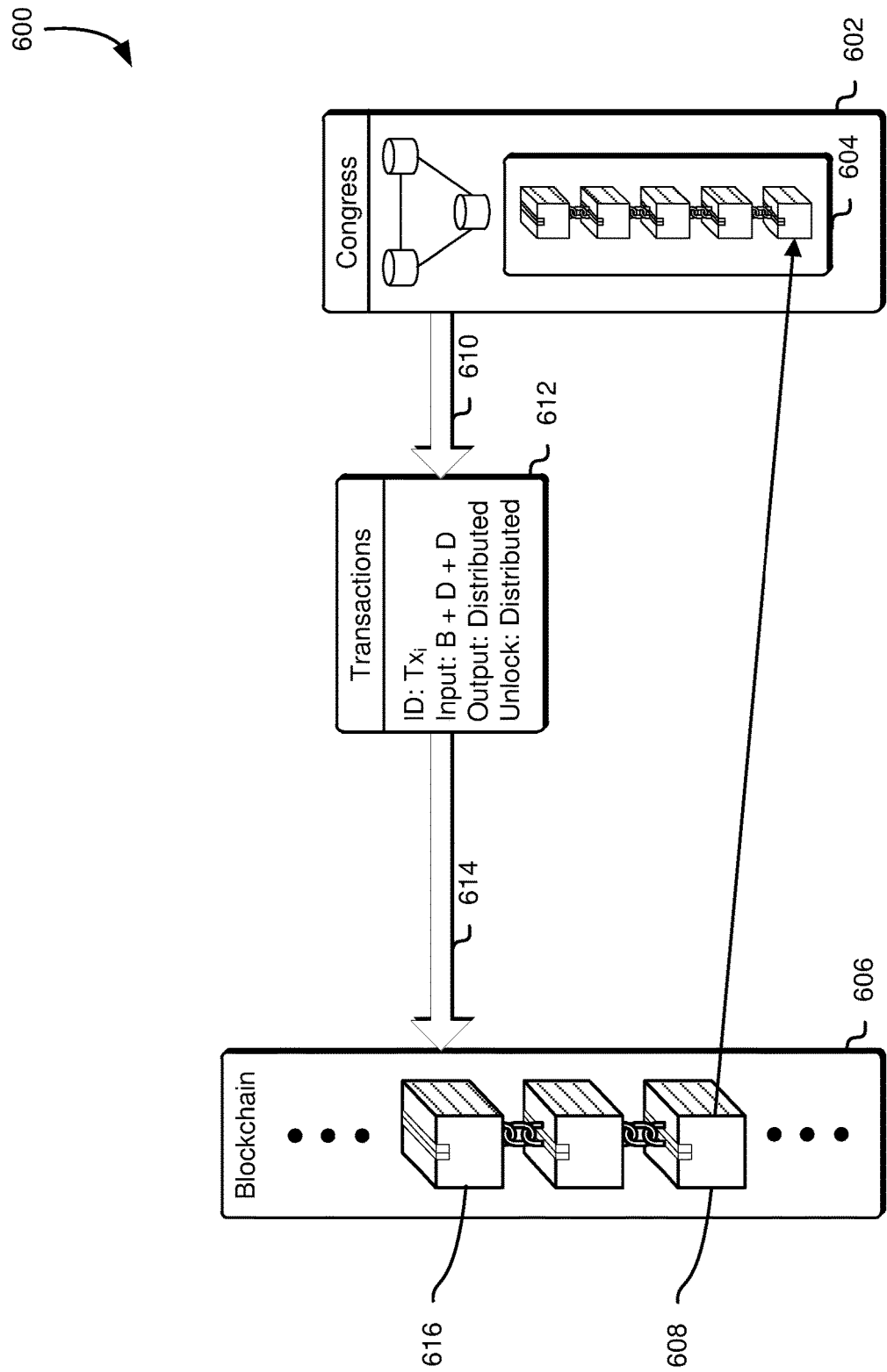
FIG. 6 illustrates a block diagram of an example environment where a challenge to a proposed solution may be resolved for a computational task distribution system associated with a blockchain network.

FIG. 6 illustrates, in block diagram form, an example environment 600 where a challenge to a proposed solution may be resolved for a computational task distribution system associated with a blockchain network as described in connection with FIG. 3 and in accordance with an embodiment. In the example environment 600 illustrated in FIG. 6, the congress 602 instantiates a ghost chain 604 (as described herein) starting from information in a source block 608 of the blockchain 606. The source block 608 may also be referred to herein as the block where the challenge occurs (e.g., the block of the challenge 1806 described in connection with FIG. 18). After the ghost chain resolves the challenge using a method described herein, the congress 602 creates 610 one or more transactions 612 to distribute the proposed distribution ("B") plus any deposits ("D") to one or more parties, as described herein. The one or more transactions 612 may then be mined 614 to the blockchain 606 at the current block 616.

In a first example of how the one or more transactions 612 are created to remit the proposed distribution ("B") plus any additional deposits ("D") to the one or more parties, if there is no proposed solution, then there may be no ghost chain instantiated to adjudicate the challenge and, accordingly, the Requester can just reclaim the UTXO of the original transaction ("B"). In an embodiment, if there is no proposed solution, there are no deposits and the bounty ("B") is never added to an input of a Proposer string.

In a second example of how the one or more transactions 612 are created to remit the proposed distribution ("B") plus any additional deposits ("D") to the one or more parties, if there is a proposed solution, but no Challenger, then there may also be no ghost chain instantiated to adjudicate the challenge and, accordingly, the Proposer may claim the UTXO of the original transaction ("B") if the solution may be accepted by the Requester and the Proposer may also reclaim the Proposer's deposit ("D"), less any costs to validate the solution. In an embodiment, if there is no challenge then the costs used to validate the solution are zero and the Proposer may claim the UTXO of the original transaction ("B") if the solution is accepted by the Requester and the Proposer may also reclaim the entirety of the Proposer's deposit ("D"). Conversely, the Requester may claim the UTXO of the original transaction ("B") if the solution is not accepted by the Requester and the Proposer may reclaim the Proposer's deposit ("D"). In an embodiment, the Proposer can claim the funds after the challenge period with the solution provided that the hash of the solution used to claim the funds is the same as the hash of the solution in the solution commitment, as described above.

In an embodiment, the Proposer can reject the proposed solution by challenging the solution as described above (i.e., by acting as a Challenger to the proposed Proposer string).

In a third example of how the one or more transactions 612 are created to remit the proposed distribution ("B") plus any additional deposits ("D") to the one or more parties, if there is a single Challenger and the ghost chain 604 may be instantiated to adjudicate the challenge, if the Proposer "wins" the challenge, the Proposer may claim the UTXO of the original transaction ("B"), the Proposer may also reclaim the Proposer's deposit ("D") minus any costs to validate the solution, and the Challenger may reclaim the Challenger's deposit ("D") minus any costs to challenge the solution. Conversely, if the Challenger "wins" the challenge, the Challenger may claim the UTXO of the original transaction ("B"), the Proposer may also reclaim the Proposer's deposit ("D") minus any costs to validate the solution, and the Challenger may reclaim the Challenger's deposit ("D") minus any costs to challenge the solution. In an embodiment, the losing party of a challenge (e.g., the Proposer or the Challenger) remits the entire cost of the challenge. In an embodiment, both parties of the challenge (e.g., the Proposer and the Challenger) evenly share the cost of the challenge. In an embodiment, both parties of the challenge (e.g., the Proposer and the Challenger) evenly share the cost of the validation as well. As may be contemplated, the examples of how the one or more transactions 612 may be created to remit the proposed distribution ("B") plus any additional deposits ("D") to the one or more parties are merely illustrative examples and, as such, other examples of how the one or more transactions 612 are created to remit the proposed distribution ("B") plus any additional deposits ("D") to the one or more parties may be considered as within the scope of the present disclosure.

It should be noted that it may be possible to greatly reduce the length of the computation to perform on the ghost chain using an arbitration procedure. In an embodiment, arbitration may be conducted without the need to rerun the entire calculation. In such an embodiment, the arbitration protocol requires the Proposer and the Challenger to provide intermediate results of the computation that led to their final answer. Since the input of the computation may be the same (that which was posted by the requestor) and the output may be different (the Proposer and Challenger arrived at different answers), there must be at least one transition between two intermediate values where the Proposer's and Challenger's computations diverge. Such a "transition point" can be identified using binary search on the two lists of values (i.e., on the differences between the two lists of values). The number of operations needed to perform this search is of order of the base two logarithm (i.e., $\log_2$) of the length of the two lists. For example, if the two lists of calculations have 1024 elements, the number of the operations needed to perform the search for the transition is ln 1024, or 10.

Once an intermediate step where the two computations diverge has been determined (i.e., the transition point has been located), the ghost chain may be used to recompute that single transition, thereby arbitrating between the two proposals. Note that, unlike arbitration by rerunning the computation on-chain (e.g., on the main chain), binary search techniques such as those described herein may eliminate one party as incorrect, but may not confirm the correctness of the other party. Therefore, in an embodiment, the solution of the party that was not been eliminated by the binary search may be subjected to another challenge period.

Figure 7:
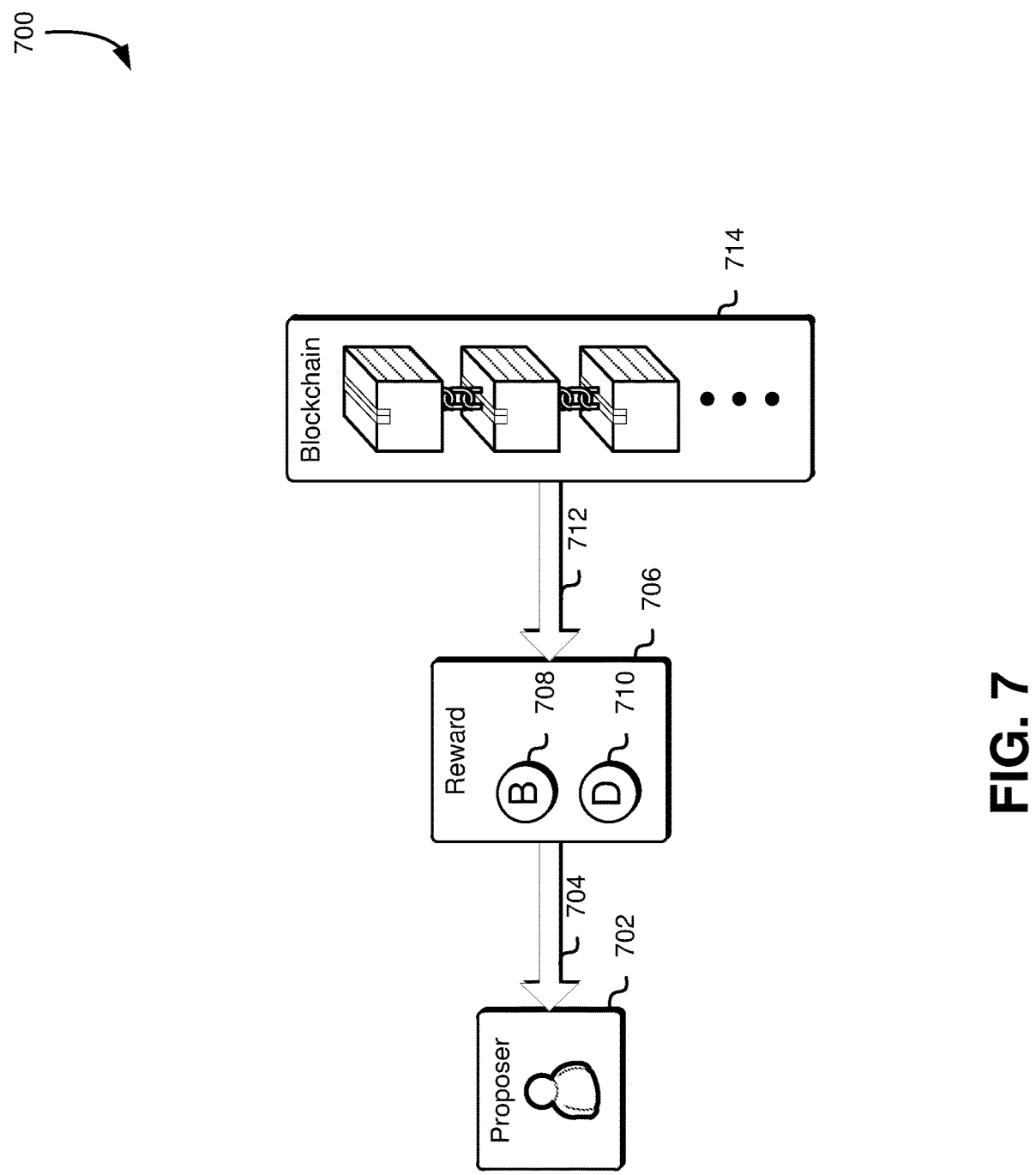
FIG. 7 illustrates a block diagram of an example environment where no challenge to a proposed solution may be received for a computational task distribution system associated with a blockchain network.

FIG. 7 illustrates, in block diagram form, an example environment 700 where no challenge to a proposed solution may be received for a computational task distribution system associated with a blockchain network as described in connection with FIG. 3 and in accordance with an embodiment. In the example environment 700 illustrated in FIG. 7, the Proposer 702 receives 704 the distribution 706, which includes the proposed distribution 708 ("B") and the Proposer's deposit 710 ("D") in a transaction generated 712 from the blockchain 714. In an embodiment, the distribution 706 includes the proposed distribution 708 ("B") and the Proposer's deposit 710 ("D"), minus any costs used to verify the solution of the Proposer 702. In an embodiment, if there is no challenge then the costs used to verify the solution of the Proposer 702 are zero and the distribution 706 includes the proposed distribution 708 ("B") and all of the Proposer's deposit 710 ("D").

Figure 8:
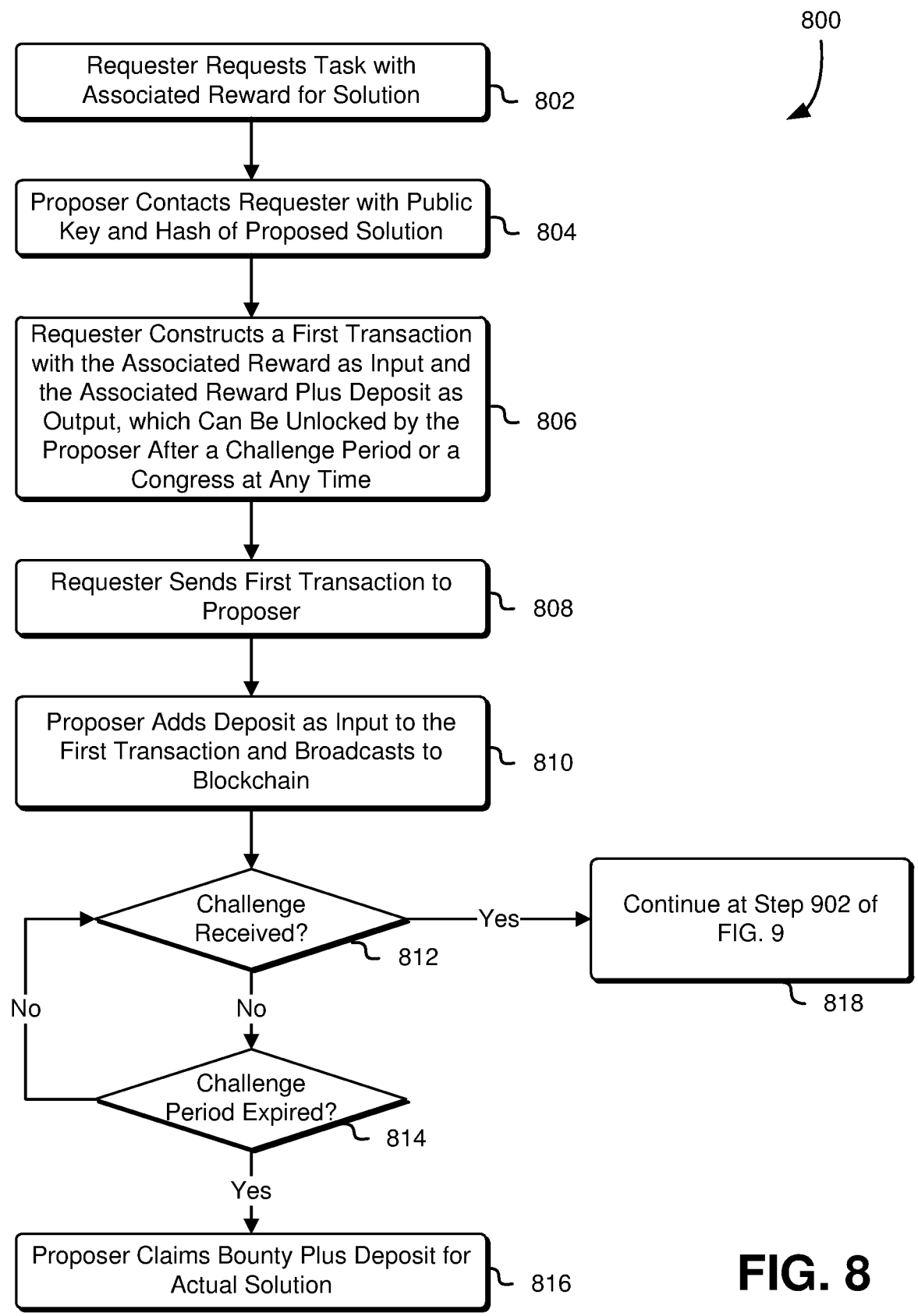
FIG. 8 illustrates a first part of a flowchart of an example process for resolving proposed solutions and challenges to tasks for a computational task distribution system associated with a blockchain network.

FIG. 8 illustrates, in flowchart form, a first part 800 of an example process for resolving proposed solutions and challenges to tasks for a computational task distribution system associated with a blockchain network as described in connection with FIG. 3 and in accordance with an embodiment. The first part 800 of the example process for resolving proposed solutions and challenges to tasks for a computational task distribution system associated with a blockchain network may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the first part 800 of the example process for resolving proposed solutions and challenges to tasks for a computational task distribution system associated with a blockchain network described in connection with FIG. 8.

In step 802 of the first part 800 of an example process for resolving proposed solutions and challenges to tasks for a computational task distribution system associated with a blockchain network the Requester requests completion of a task with an associated distribution for the solution as described herein.

In step 804 of the first part 800 of an example process for resolving proposed solutions and challenges to tasks for a computational task distribution system associated with a blockchain network the Proposer contacts the Requester with a public key and a hash of the proposed solution. Although not illustrated in FIG. 8, before step 804, the Proposer has received the task, determined that the associated distribution is sufficient, generated a solution, and generated a hash of the solution all as described herein. In an embodiment, the Proposer contacts the Requester with a public key and a hash of the proposed solution using a secondary secure channel. In an embodiment, the Proposer contacts the Requester with a public key and a hash of the proposed solution using the blockchain that implements the computational task distribution system. In an embodiment, there is a plurality of Proposers with solutions.

In step 806 of the first part 800 of an example process for resolving proposed solutions and challenges to tasks for a computational task distribution system associated with a blockchain network the Requester constructs a first transaction with the associated distribution as input and the associated distribution plus a deposit as output, which can be unlocked by the Proposer after a challenge period or by a congress at any time as described herein.

In step 808 of the first part 800 of an example process for resolving proposed solutions and challenges to tasks for a computational task distribution system associated with a blockchain network the Requester sends the first transaction to the Proposer so that the Proposer may add the Proposer's deposit to the input for the transaction as described herein, thus investing the Proposer in the task. By having the Proposer add a deposit to the transaction, Proposers may be restrained from flooding the Requester with false solutions.

In step 810 of the first part 800 of an example process for resolving proposed solutions and challenges to tasks for a computational task distribution system associated with a blockchain network the Proposer adds his or her deposit as input to the first transaction and broadcasts the first transaction to the blockchain as described herein.

In step 812 of the first part 800 of an example process for resolving proposed solutions and challenges to tasks for a computational task distribution system associated with a blockchain network it may be determined whether a challenge was received. In an embodiment, a challenge may be received from another node (e.g., a Challenger) as described herein. In an embodiment, a challenge is generated by a Challenger by mining a transaction to the blockchain as described above and, thus, received by the nodes in the blockchain including the Requester and the Proposer. In an embodiment, a plurality of challenges is received for each proposed solution. In an embodiment, the computational task distribution system is an off-chain system (e.g., a webservice) where tasks are listed, notifications of proposed solutions are posted, and challenges to those proposed solutions are posted. In such an embodiment, a blockchain associated with the computational task distribution system is used to provide solutions, provide distributions for a solution, and to manage challenges (via, for example, a ghost chain).

If in step 812, it may be determined that a challenge was received, the first part 800 of the example process for resolving proposed solutions and challenges to tasks for a computational task distribution system associated with a blockchain network continues at step 902 of the second part 900 of the example process for resolving proposed solutions and challenges to tasks for a computational task distribution system associated with a blockchain network.

If in step 812, it is not determined that a challenge was received, in step 814 of the first part 800 of an example process for resolving proposed solutions and challenges to tasks for a computational task distribution system associated with a blockchain network it may be determined whether the challenge period has expired. In an embodiment, the challenge period is set by the Requester. In an embodiment, the challenge period is set by the computational task distribution system. In an embodiment, the challenge period is determined based at least in part on a time period required to mine a number of blocks. For example, a blockchain network may be mined at a rate of one every ten minutes (e.g., the Bitcoin network). In such an example, the challenge period may be based on the time required to mine 288 blocks (e.g., six blocks per hour for 48 hours, or approximately two days).

If in step 814, it is not determined that the challenge period has expired, the first part 800 of an example process for resolving proposed solutions and challenges to tasks for a computational task distribution system associated with a blockchain network continues at step 812, to determine whether a challenge was received.

If in step 814, it is determined that the challenge period has expired, in step 816 of the first part 800 of an example process for resolving proposed solutions and challenges to tasks for a computational task distribution system associated with a blockchain network, the Proposer claims the bounty plus the Proposer's deposit for the unchallenged actual solution as described herein.

Note that one or more of the operations performed in the first part 800 of the example process illustrated in FIG. 8 may be performed in various orders and combinations, including in parallel.

Figure 9:
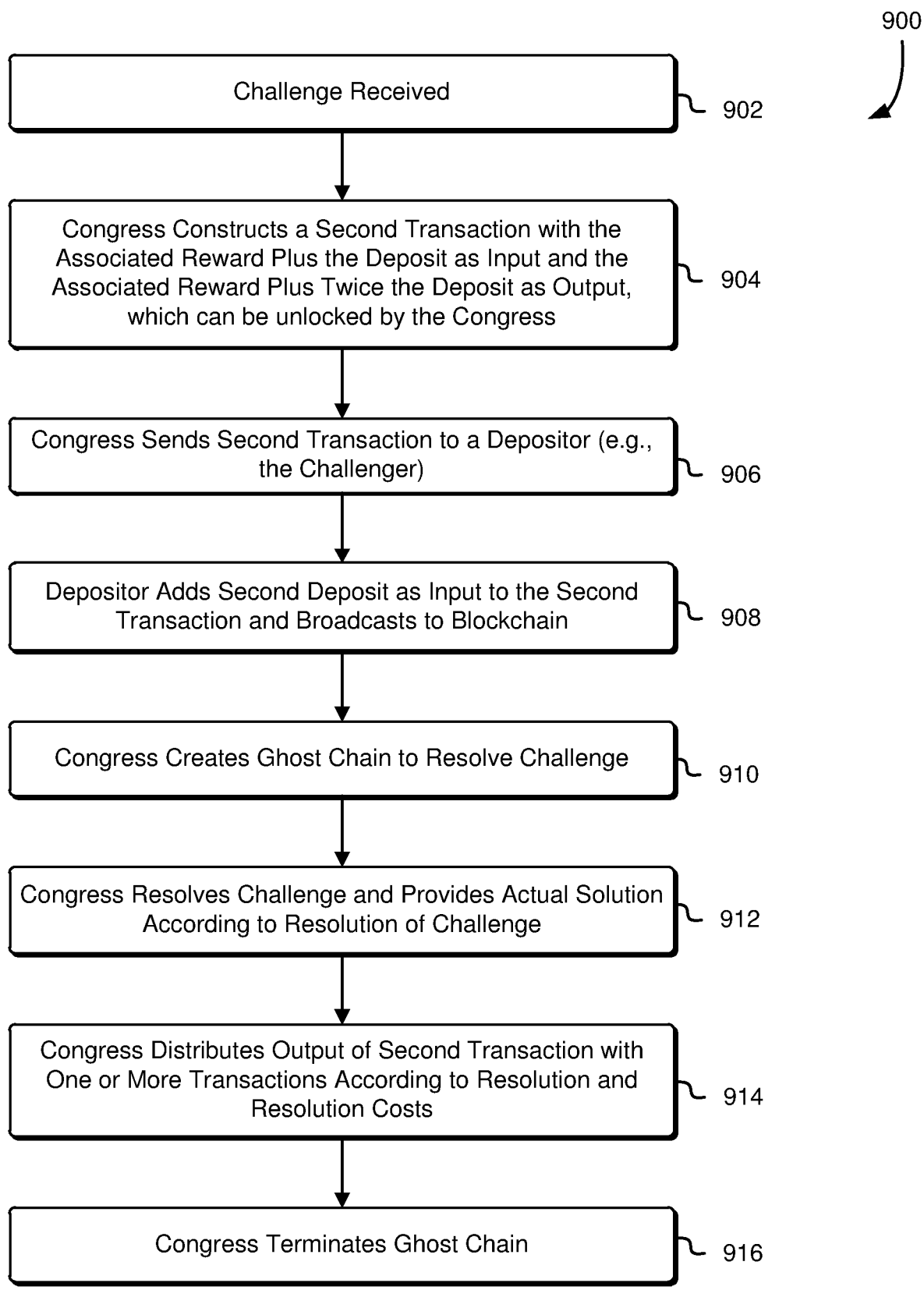
FIG. 9 illustrates a second part of a flowchart of an example process for resolving proposed solutions and challenges to tasks for a computational task distribution system associated with a blockchain network.

FIG. 9 illustrates, in flowchart form, a second part 900 of an example process for resolving proposed solutions and challenges to tasks for a computational task distribution system associated with a blockchain network as described in connection with FIG. 3 and in accordance with an embodiment. The second part 900 of the example process for resolving proposed solutions and challenges to tasks for a computational task distribution system associated with a blockchain network may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the second part 900 of the example process for resolving proposed solutions and challenges to tasks for a computational task distribution system associated with a blockchain network described in connection with FIG. 9.

At step 902 of the second part 900 of the example process for resolving proposed solutions and challenges to tasks for a computational task distribution system associated with a blockchain network a challenge may be received as described herein.

At step 904 of the second part 900 of the example process for resolving proposed solutions and challenges to tasks for a computational task distribution system associated with a blockchain network the congress constructs a second transaction with the associated distribution plus the deposit as input and the associated distribution plus twice the deposit as output, which can be unlocked by the congress at any time. In step 904, the associated distribution includes twice the deposit as it includes both the deposit from the Proposer and the deposit from the Challenger. However, in step 904, the deposit from the Challenger has not yet been added to the input for the transaction.

At step 906 of the second part 900 of the example process for resolving proposed solutions and challenges to tasks for a computational task distribution system associated with a blockchain network the congress sends the second transaction to a depositor (e.g., to the Challenger) so that the deposit for the Challenger can be added to the input for the transaction as described herein.

At step 908 of the second part 900 of the example process for resolving proposed solutions and challenges to tasks for a computational task distribution system associated with a blockchain network the depositor adds a second deposit as input to the second transaction and broadcasts the second transaction to the blockchain also as described herein.

At step 910 of the second part 900 of the example process for resolving proposed solutions and challenges to tasks for a computational task distribution system associated with a blockchain network the congress creates a ghost chain to resolve the challenge using a method described herein.

At step 912 of the second part 900 of the example process for resolving proposed solutions and challenges to tasks for a computational task distribution system associated with a blockchain network the congress resolves the challenge and provides an actual solution (i.e., from the one or more Proposer strings and/or the one or more Challenger strings) according to the resolution of the challenge. In step 912, the congress resolves the challenge using a ghost chain as described herein. In an embodiment, the congress resolves the challenge using on-chain computational methods. In an embodiment, the congress resolves the challenge using binary search techniques as described herein.

At step 914 of the second part 900 of the example process for resolving proposed solutions and challenges to tasks for a computational task distribution system associated with a blockchain network the congress distributes the output of second transaction with one or more transactions according to the resolution and the resolution costs as described herein.

At step 916 of the second part 900 of the example process for resolving proposed solutions and challenges to tasks for a computational task distribution system associated with a blockchain network the congress terminates the ghost chain. In an embodiment, the terminated ghost chain (e.g., the terminal block for the ghost chain) is used as the starter block for a subsequence ghost chain, as described herein.

In an embodiment, there are one or more solutions in a set of solutions that includes the Proposer strings and the Challenger strings. In an embodiment, the example process for resolving proposed solutions and challenges to tasks for a computational task distribution system associated with a blockchain network described in connection with FIGS. 8 and 9 includes resolving the challenge using a first blockchain network by at least selecting a solution from a set of solutions provided to the first blockchain network, the set of solutions at least including a Proposer string. In an embodiment, selecting a solution from a set of solutions includes selecting a correct solution based at least in part on one or more selection criteria. In an embodiment, selecting a solution from a set of solutions includes eliminating one or more incorrect solutions based at least in part on one or more selection criteria. In an embodiment, an algorithm such as a binary search algorithm is used to eliminate one or more incorrect solution until one solution is selected from the set of solutions.

In an embodiment where a plurality of solutions are received with the same hash (e.g., where each of the Proposer strings has the same hash value), the example process for resolving proposed solutions and challenges to tasks for a computational task distribution system associated with a blockchain network described in connection with FIGS. 8 and 9 includes selecting a solution from the set of solutions based at least in part on a timestamp associated with the Proposer string (i.e., the timestamp may be used to select a solution from a plurality of solutions with the same hash value so that, for example, the first received solution may be selected).

Note that one or more of the operations performed in second part 900 of the example process illustrated in FIG. 9 may be performed in various orders and combinations, including in parallel.

Figure 10:
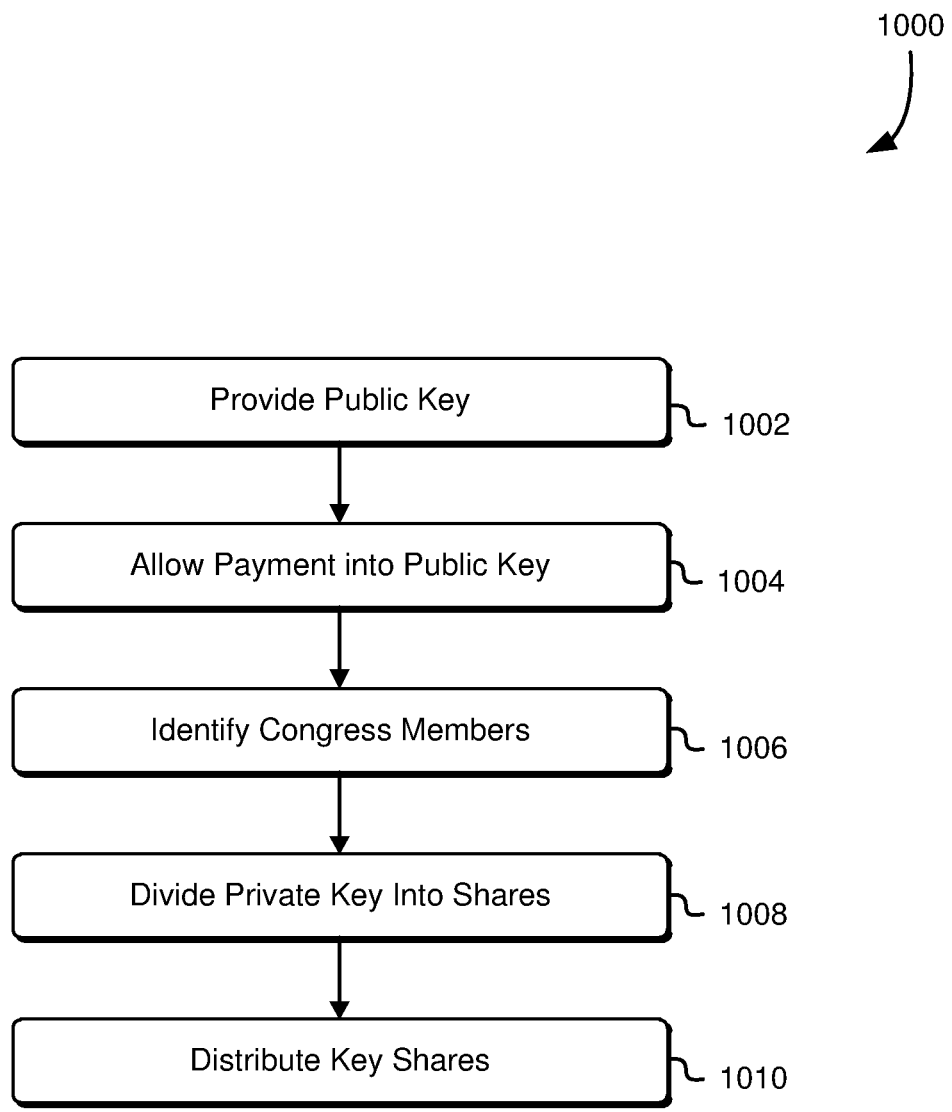
FIG. 10 illustrates a flowchart of an example process for initiating a congress for a computational task distribution system associated with a blockchain network.

FIG. 10 illustrates, in flowchart form, an example process 1000 for initiating a congress for a computational task distribution system associated with a blockchain network as described in connection with FIG. 3 and in accordance with an embodiment. The example process 1000 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1000 for initiating a congress for a computational task distribution system associated with a blockchain network described in connection with FIG. 10. In an embodiment, the process 1000 is performed by an initially trusted party to set up the congress.

The process 1000 includes, at step 1002, providing a congress public key. The congress public key may be provided to other nodes to allow the other nodes to deposit into the congress public key if they wish to join the congress. That is, others may transfer tokens to an address associated with the congress public key in order to join the congress.

The node performing the process 1000, at step 1004, may allow distribution to the public key until one or more conditions are satisfied. For example, the node may allow distribution to the public key for a determined period of time or for a determined number of blocks. After the condition is satisfied (e.g., after expiration of this period of time or mining of the number of blocks), the node performing the process 1000 identifies, at step 1006, initial members of the congress.

After the parties who will comprise the initial membership of the congress are identified, a private key may be divided into private key shares according to a threshold signature scheme at step 1008. The private key shares may then be distributed, at step 1010, from the node performing the process 1000 to the identified parties. The private key shares may be associated with a threshold signature scheme, which may be of the type described herein.

During step 1010, the nodes that are identified as congress members cooperate to generate new private key shares and a new public key. The original key shares that were sent to such nodes by the initially trusted party may be used to sign and broadcast a transaction to send all digital assets in the congress pool to the new public key, which then becomes the congress public key. That is, during step 1010, a new group public address may be established and the digital assets under control of the congress may be transferred to this new address, which becomes the new address for the group and which may be associated with the congress public key. After this transfer is confirmed, the congress can operate trustlessly. The new group public address may be formed into which deposits of digital assets may be received in the future from other nodes wishing to join the congress, or for other purposes as described above. The congress members may now be considered to be enrolled in the congress and these nodes can now operate without the aid of the initially trusted party. Moreover, the initially trusted party no longer plays any part in the operation of the congress.

Note that one or more of the operations performed in the example process 1000 illustrated in FIG. 10 may be performed in various orders and combinations, including in parallel.

Figure 11:
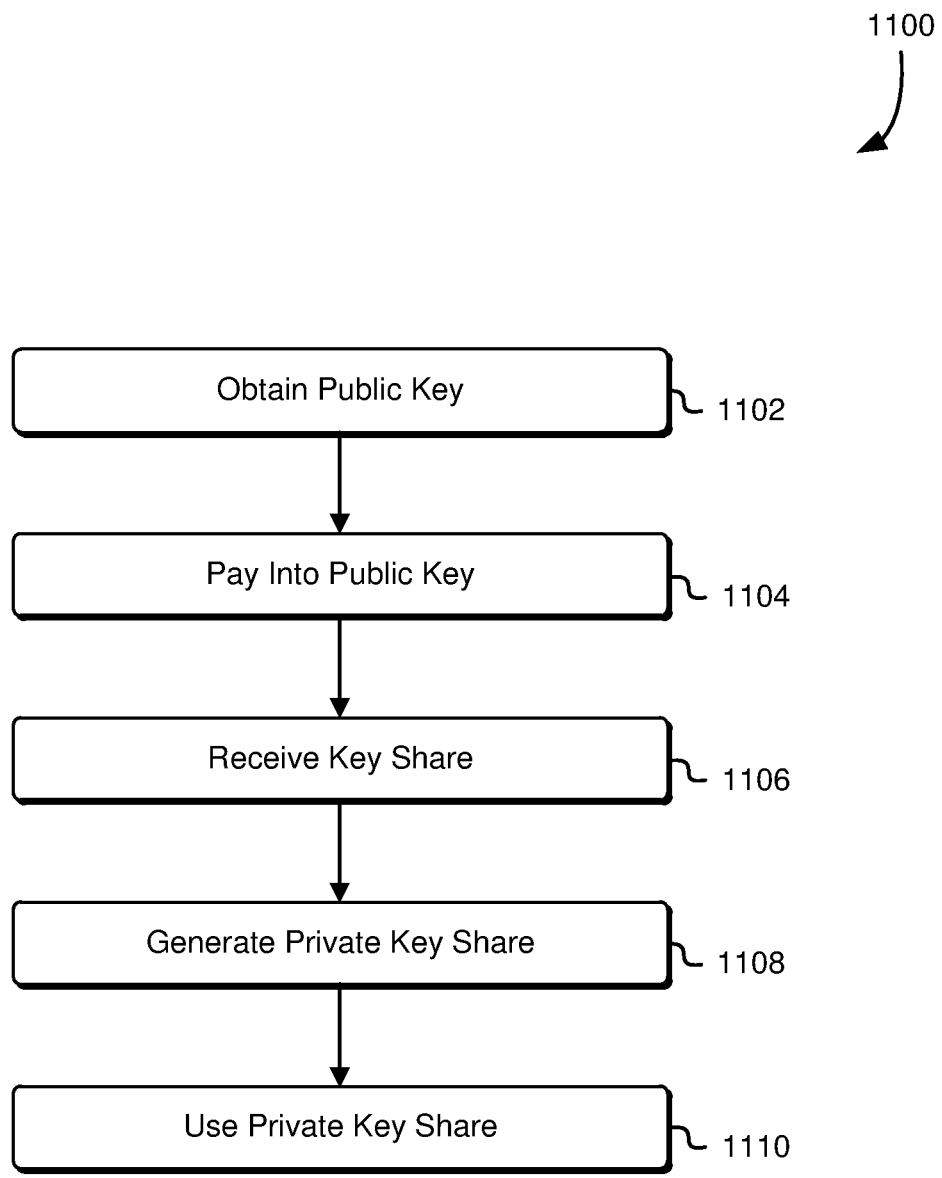
FIG. 11 illustrates a flowchart of an example process for joining a congress for a computational task distribution system associated with a blockchain network.

FIG. 11 illustrates, in flowchart form, an example process 1100 for joining a congress for a computational task distribution system associated with a blockchain network as described in connection with FIG. 3 and in accordance with an embodiment. The example process 1100 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1100 for joining a congress for a computational task distribution system associated with a blockchain network described in connection with FIG. 11.

The example process 1100 illustrated in FIG. 11 may operate in conjunction with the example process 1000 described in connection with FIG. 10. In an embodiment, the example process 1100 is performed by a different node of the nodes (e.g., the nodes such as the node 102) operating in the same blockchain network 100 (FIG. 1) in which the node performing the example process 1000 operates. The example process 1100 includes, at step 1102, obtaining a congress public key. The congress public key may be obtained directly from the party initiating the congress, such as the node performing the example process 1000 of FIG. 10, or it may be obtained from a third party including, for example, a third party system operating outside of the blockchain network. For example, the congress public key may be obtained from a public web server accessible over the public Internet.

The node performing the example process 1100 deposits to the congress public key at step 1104 by broadcasting a transaction of digital assets from a private account associated with the node to a congress address (i.e., an address associated with the congress public key). More particularly, the node may broadcast a transaction to transfer one or more digital assets to a public group address that is associated with the congress public key. The public group address may be the address for a congress pool. The congress pool includes other digital assets associated with the other members of a congress. Thus the transaction at step 1104, once added to a block by a miner (e.g., a mining node 104 described in connection with FIG. 1) transfers the digital asset to the congress pool that includes digital assets from other members. The public group address may receive both transfers from parties wishing to join the congress and transfers from parties not wishing to join the congress. The parties who do not wish to join the congress transfer the digital assets to the congress pool so that such digital assets may be placed under total, partial or conditional control by the congress using a threshold signature scheme employed by the congress.

The transaction at step 1104 may include a flag, identifier or other attribute that indicates that the party transferring the digital asset wishes to join the congress and that the deposit is being made for such purpose.

After depositing the digital assets with the congress pool, the node performing the example process 1100 receives, at step 1106, a private key share. Then, the node regenerates the private key share at step 1108 by running a single instance of the protocol. The generation of a private key share may be performed within a TEE of the node.

At step 1108, the node generates a private key share that may be to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective digital assets to the public group address.

To regenerate the private key shares, at step 1108, the existing congress members may cooperate to update the key shares. For example, a node may generate a random polynomial of order t and with the constant term zero $f_{n+1}^0(x)$. The node may then calculate the point $f_{n+1}^0(n+1)$ and set this as their private key share. The node may then distribute the points on this polynomial $f_{n+1}^0(i)$ to each of the existing congress members, i=1, . . . , n. Each existing congress member (i=1, . . . , n) then adds the received value to their existing private key share to obtain the new private key share. The node then has a private key share equivalent to all other members and the corresponding public key remains unchanged. As described above, the threshold signature scheme may be of various types including an Elliptic Curve Digital Signature Algorithm or a threshold scheme based on a Schnorr scheme.

The private key share may be generated within a TEE (describe above at least in connection with FIG. 2) and may be securely stored on the node. For example, the private key share may be stored in the TEE.

After the private key share is generated by respective nodes, funds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares.

After the private key share is generated at step 1108, it may be used at step 1110 of the example process 1100. The private key share may be used to cooperatively generate a valid signature for a transaction from the public group address that may be broadcast by a member. That is, the private key share may be used in the threshold signature scheme to contribute towards signature generation. Under the threshold signature scheme, a threshold number of private key shares of the congress may be required to be used by respective members to produce a valid signature that allows the digital assets to be transferred away from the congress. The node performing the example process 1100 may retrieve the private key share from storage and use the private key share in order to contribute towards signature generation. If a sufficient number of other congress members also use their respective private key to contribute towards signature generation, the signature may be generated and a valid outgoing transaction may be broadcast. When a mining node of the blockchain network adds the transaction to a mined block that is added to the blockchain by consensus of the nodes in the blockchain network and the block is confirmed, the outgoing transaction may be complete. At this point, the digital assets represented in the transaction may no longer be under the control of the congress. That is, such digital assets may no longer be encumbered by the congress public key.

The use of the private key share at step 1108 may be performed within a TEE of the node. The TEE protects the private key share such that other parts of the system or the member themselves may not access any data stored in an enclave, such as the private key share. Further, the TEE protects the private key in that it may not retain a copy of the private key if the member wants their deposit back and receive their deposit back since it must attest to the deletion of the private key before the member deposit may be returned.

The example process 1100 of FIG. 11 may be performed during or after the initial setup phase. That is, the example process 1100 may be performed before the initial key shares may be distributed (e.g., during step 1010 of the example process 1000) or afterward (e.g., during rebalancing, which will be discussed in greater detail below).

The transaction at step 1110 may transfer the digital asset back to the party which originally deposited those digital assets to the congress pool. That is, the transfer may return digital assets to a depositor. The transfer may also transfer the digital asset elsewhere. For example, the digital asset may be transferred to a third party or to a return address.

Note that one or more of the operations performed in the example process 1100 illustrated in FIG. 11 may be performed in various orders and combinations, including in parallel.

Figure 12:
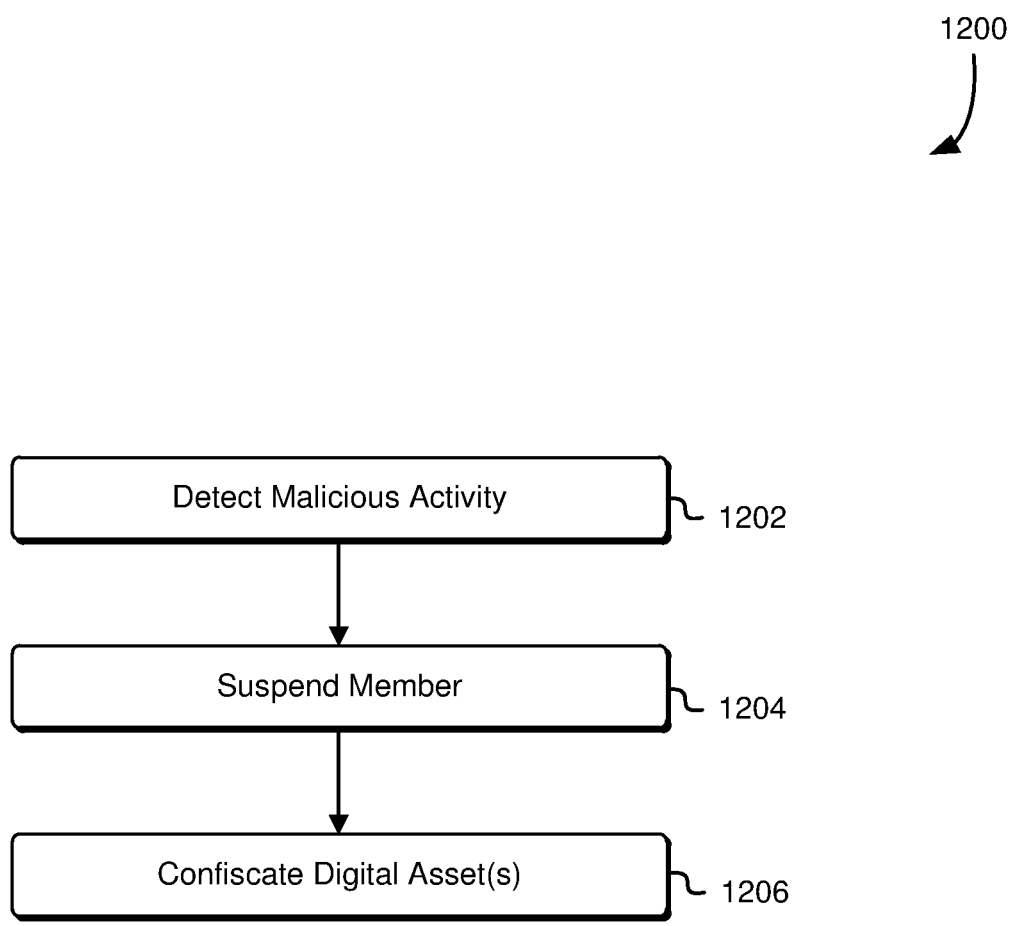
FIG. 12 illustrates a flowchart of an example process for confiscating a digital asset for a computational task distribution system associated with a blockchain network.

FIG. 12 illustrates, in flowchart form, an example process 1200 for confiscating a digital asset for a computational task distribution system associated with a blockchain network as described in connection with FIG. 3 and in accordance with an embodiment. The example process 1200 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1200 for confiscating a digital asset described in connection with FIG. 12. In an embodiment, the node performing the example process 1200 illustrated in FIG. 12 is the same node as the node performing the example process 1100 described in connection with FIG. 11. The example process 1200 may be performed after step 1108 of the example process 1100 so that the node performing the example process 1200 already has access to a private key share when the example process 1200 is performed.

At step 1202, the node detects malicious activity by a malicious party. The malicious party may be another member of the congress. Malicious activity may be detected when the node determines that a member of the congress is in breach of a pre-defined protocol or criteria. For example, when a node that is a member in the congress reports faulty information (i.e., false, inconsistent or otherwise unacceptable information) to other members of the congress, the member may be deemed to be a malicious member.

At step 1204, in response to detecting malicious activity, the node, in cooperation with other nodes in the congress, may suspend the member that is the malicious party. That is, the congress may exclude the malicious party from further participation in the congress.

To ensure that all nodes operate in conformity with the pre-defined protocol or criteria, member deposits into the congress pool may be subject to confiscation. Confiscation means permanently preventing the return of a member deposit that is deemed confiscated. The digital asset(s) that form the member deposit that are not returned due to the malicious activity may be left in the congress pool but not returned, transferred immediately or in the future to another return address, or otherwise confiscated and the nature of confiscation may depend on whether the congress functions as a bonded validator set for an altchain. For example, at step 1206, in response to detecting malicious activity by a malicious party, the node performing the example process 1200 may use the private key share to provide a partial signature on a confiscation transaction. That is, the node cooperates with other nodes of the congress to confiscate at least a portion of the digital assets that were previously transferred to the public group address (i.e., to the congress pool) by the malicious party. That is, in response to observing that the group member is in breach of the pre-defined protocol or criteria, the private key share may be utilized to contribute to the authorization of a transaction of one or more digital assets that may be associated with that group member and that are held in the congress pool.

Since a threshold signature scheme may be used with the congress public key, an individual node acting alone may not transfer another congress member's deposit of digital assets away from the congress pool (e.g., to a return address). Rather, the digital assets can only be confiscated by transfer when a threshold number of private key shares are used by their respective members to generate a valid signature to transfer the digital asset(s) to another address or when a group of members having at least a threshold number of private key shares reach consensus to suspend a member (at step 1204), which causes any withdrawal request from the suspended member to be automatically ignored. When digital assets are confiscated by transfer, the other address to which the digital asset(s) may be transferred may be associated with a return address. For example, the other address may be an address for which no private key exists so that no party can access the digital assets bound by the public key for the address. When the digital assets are transferred to the return address they may be considered to have been burned, since they may no longer be redeemable by any members of the congress or indeed by any nodes in the blockchain network.

Accordingly, at step 1206, the node may confiscate the digital asset by using the private key share in cooperation with other members of the congress to generate a valid signature for the transaction to the return address.

Further, in some implementations, a congress may serve as a bonded validator set, securing a proof-of-stake altchain, and this altchain may be used as a broadcast channel. For example, a consensus may be reached by the congress members on the altchain that a member has acted maliciously. This consensus could correspond to confirmation of an altchain transaction containing incriminating evidence of the malicious activity. When consensus is reached, any request to withdraw a member deposit, made by the malicious member, may be denied and the deposit may be considered to be confiscated. All or a portion of the confiscated digital assets may be burnt at some time in the future. That is, at some time later, a threshold of members (not including the malicious member) may collaborate to authorize transfer of the confiscated digital assets to a return address. Some or all of the digital assets may, instead, be sent as a distribution to a node that provided evidence of a member's wrongdoing.

Since the congress may be an open group that may be joined by any node of the blockchain network through deposit of digital assets, the group membership may periodically change. When such changes occur, the private key share distributions may be updated.

Note that one or more of the operations performed in the example process 1200 illustrated in FIG. 12 may be performed in various orders and combinations, including in parallel.

Figure 13:
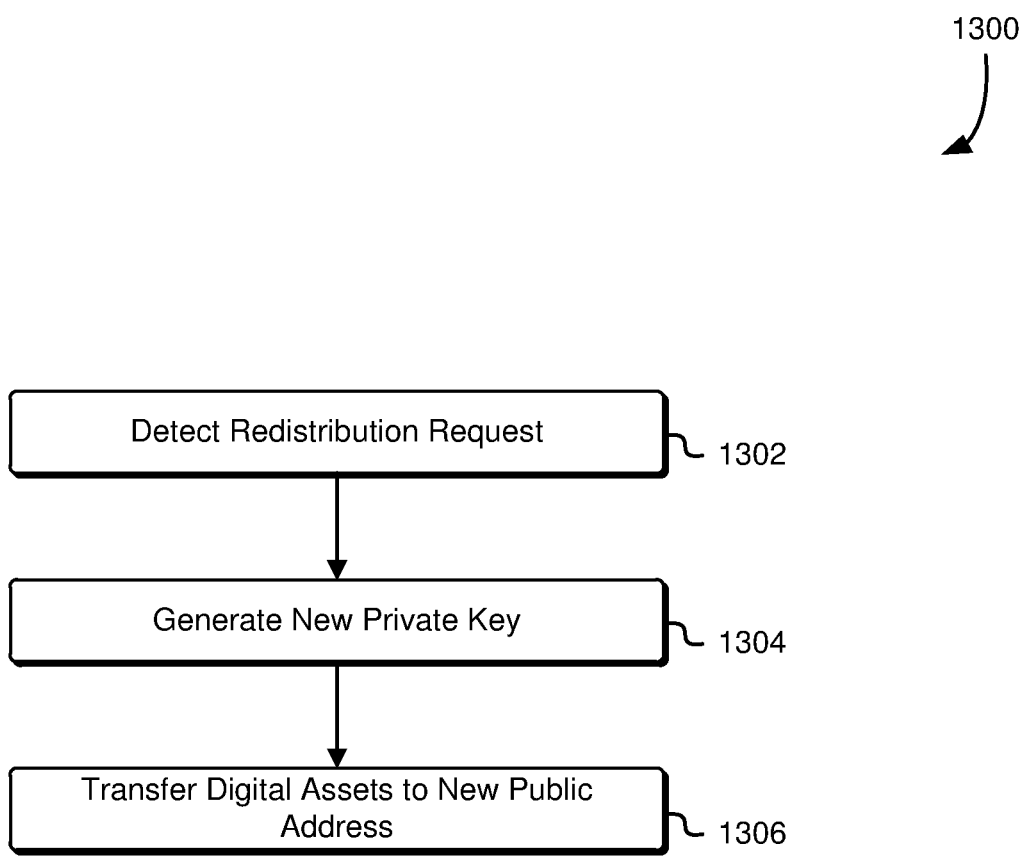
FIG. 13 illustrates a flowchart of an example process updating private key share distributions for a computational task distribution system associated with a blockchain network.

FIG. 13 illustrates, in flowchart form, an example process 1300 for updating private key share distributions for a computational task distribution system associated with a blockchain network as described in connection with FIG. 3 and in accordance with an embodiment. The example process 1300 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1300 for updating private key share distributions described in connection with FIG. 13.

At step 1302 of the example process 1300, the node detects a redistribution request, which is a request upon which fulfillment entails a redistribution of key shares. For example, the node may detect that a prospective new member has transferred digital assets into the public group address or that an existing member has requested withdrawal of a member deposit Digital assets may be transferred to the public group address (i.e., to the congress pool) by nodes requesting to join the congress or increase their participation in the congress and by other nodes who are not requesting to join the congress but are instead transferring the digital assets to the congress for another purpose (such as to transfer the digital assets to an altchain, as will be described below). At step 1302, the node may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at step 1302, the fulfilment of which entails the redistribution of key shares, at step 1304, a new private key share may be generated by the node in a manner similar to the manner that the private key share was generated as described above. Other member nodes of the congress also generate respective private key shares. These private key shares may be used with the threshold signature scheme for the new congress public key. Members who leave the congress at this point may not generate new private key shares during step 1304 and, since they may not be allocated a private key share for use with the new congress public key, they lose the capacity to take part in the congress and may no longer be considered congress members.

Further, in response to detecting a redistribution request (which may be a request, the fulfilment of which, entails the redistribution of key shares), at step 1306, the node collaborates with other congress members to transfer all digital assets in the public group address to a new public address associated with a new public key (which may then become the new congress public key).

Thus, according to the example process 1300 of FIG. 13, when the distribution of deposits changes or when a request is received from a member to withdraw a deposit, private key shares may be regenerated and all of the digital assets under control of the congress may be moved to a new public key. The frequency with which memberships of a congress can be updated may be limited by the block time of the blockchain network. Many applications may only require rebalancing at low frequencies.

Note that one or more of the operations performed in the example process 1300 illustrated in FIG. 13 may be performed in various orders and combinations, including in parallel.

Figure 14:
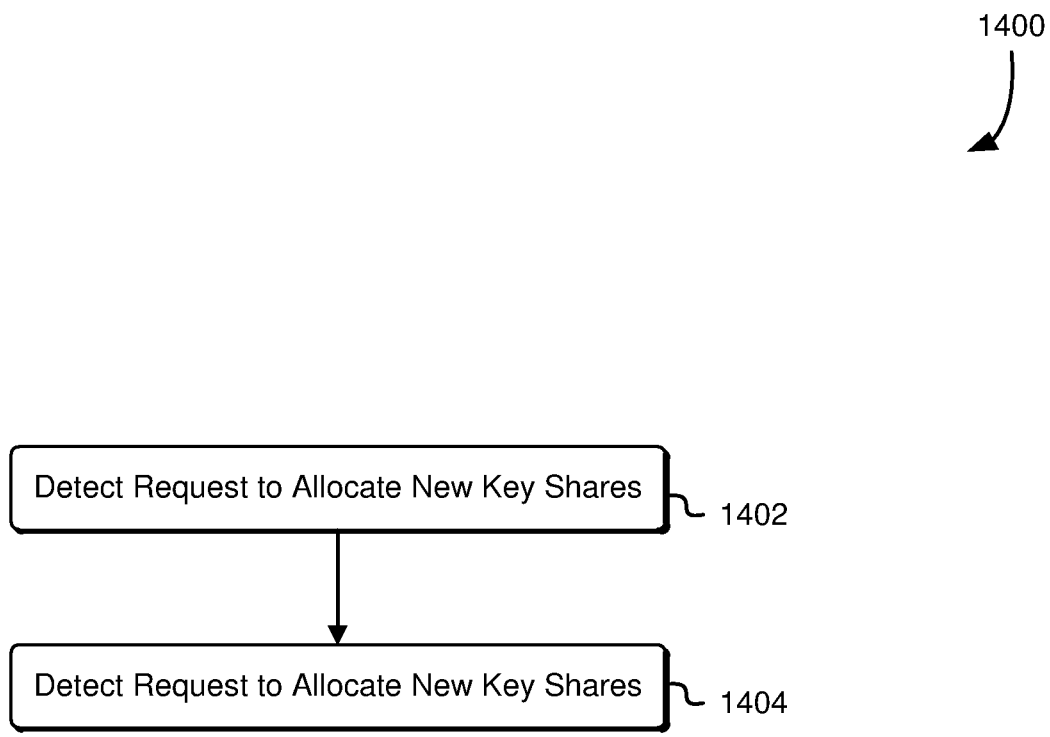
FIG. 14 illustrates a flowchart of an example process for updating private key share distributions for a computational task distribution system associated with a blockchain network.

FIG. 14 illustrates, in flowchart form, an example process 1400 for updating private key share distributions for a computational task distribution system associated with a blockchain network as described in connection with FIG. 3 and in accordance with an embodiment. The example process 1400 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1400 for updating private key share distributions described in connection with FIG. 14.

In the example process 1400 of FIG. 14, the congress public key does not change each time the distribution of member deposits changes. When a request to allocate a new key share is detected (at step 1402, which may occur through deposit of digital assets to the public group address), the node collaborates with other members of the congress to issue (at step 1404) new private key shares for the same public key to the new members of the group.

The number of nodes that collaborate may be at least the threshold number of nodes required to generate a digital signature under the threshold signature scheme. At step 1404, an additional key share may be allocated while other key shares remain the same. This may entail a change in threshold (of the threshold signature scheme), although the change may in practice be small. Alternatively, at step 1404, an additional key share may be allocated while other key shares are renewed. Such renewal may be required to be accompanied by the attestation to deletion of any key shares of the previous generation. In this case, new shares may be allocated while maintaining the same threshold (in the context of SSS, this involves sharing on a new polynomial, of increased order).

At step 1402, the node may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress that uses the example process 1400, they may securely delete their private key share. In order to ensure that private key shares of old members are unusable, the members of the congress may be required to use nodes having a special TEE. The TEE may be an architecture implemented at the hardware level that guarantees that instructions and data executed within them are protected against access and manipulation from the rest of the system as described above. The TEE may employ hardware mechanisms to respond to remote attestation challenges that can be used to validate the system's integrity to an external party, such as the other nodes in the congress.

Each member node may use a certified TEE configured to generate one or more random secret values that remains inaccessible to the host system without compromising the hardware at the integrated circuit level. Secret values generated in this way would be used in distributed generation of private key shares as described above. This secret value could also be used to establish the shared public key in the set up phase of the congress. Computations associated with the set up protocol may be performed within the TEE enclaves so that no member or former member can derive any information about their own or others private key shares from inter-member communication or any other method. The enclaves within the TEEs enable a remote attestation protocol to be performed that may be used to prove to other nodes that the TEE enclave is authentic and that it is running approved computer-readable instructions.

Computations associated with group changes may be performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a member deposit can be returned. More particularly, in order to have a member deposit returned, an attestation protocol may require that the TEE enclave attests to the deletion of a key share. Each node may interpret such an attestation as a confirmation that the required deletion has occurred on other nodes through the remote attestation protocol. Thus, the example process 1400 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

It should be noted that the example process 1300 and the example process 1400 each offer various benefits when implemented. For example, the example process 1300 does not rely on secure deletion and does not need to rely on trusted hardware. However, the example process 1300 may benefit from such hardware since, in some circumstances, such hardware may, for example, make the malicious pooling of key shares more unlikely. In another example, the example process 1400 avoids having to relock digital assets under a new congress public key each time the membership changes. Further, in some circumstances the example process 1400 may update membership faster than the example process 1300 since, under the example process 1400 a transaction does not need to be added to the blockchain to move all digital assets to a new public key because digital assets are not moved to a new public key. That is, the membership may be updated using the example process 1400 without having to wait for several blocks (e.g., six blocks) to be generated to confirm transfer of the digital assets to the new public key since the public key does not change Note that one or more of the operations performed in the example process 1400 illustrated in FIG. 14 may be performed in various orders and combinations, including in parallel.

Figure 15:
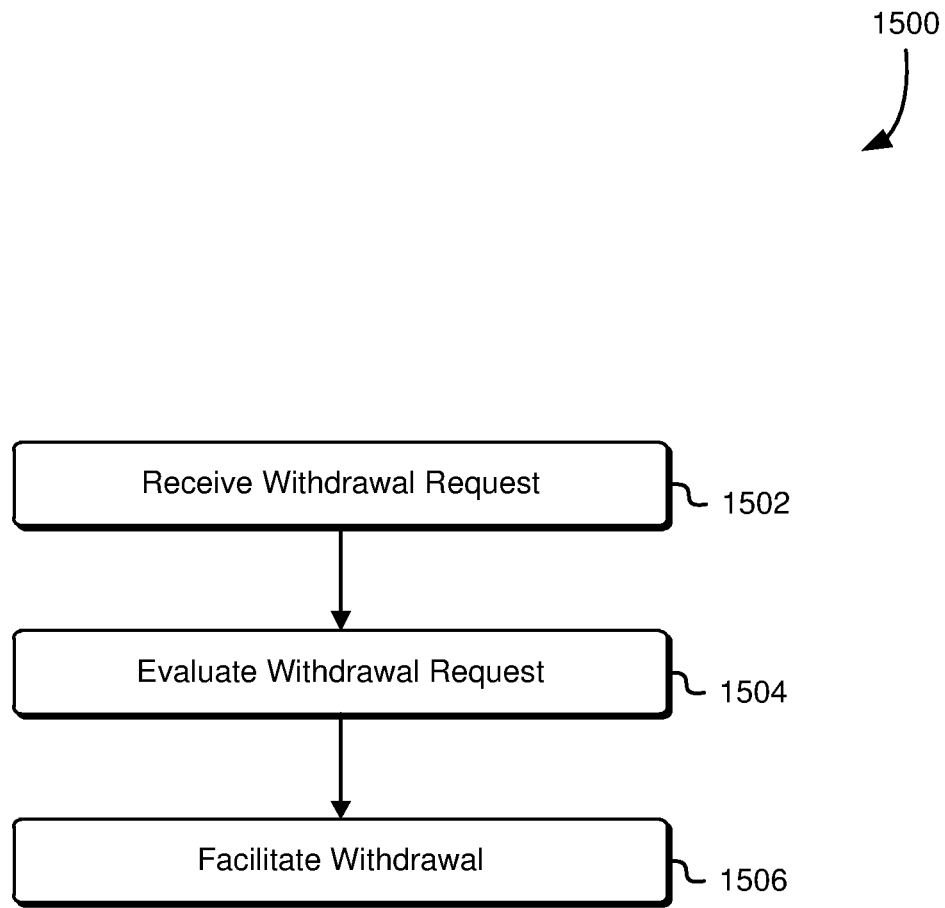
FIG. 15 illustrates a flowchart of an example process for returning a deposit for a computational task distribution system associated with a blockchain network.

FIG. 15 illustrates, in flowchart form, an example process 1500 for returning a deposit for a computational task distribution system associated with a blockchain network as described in connection with FIG. 3 and in accordance with an embodiment. The example process 1500 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1500 for returning a deposit for a computational task distribution system associated with a blockchain network described in connection with FIG. 15. As noted above, group members may occasionally request to leave the congress and, when a group member disenrolls from a congress, the digital assets were deposited to the congress pool may be returned to them.

At step 1502 of the example process 1500, the node may receive a withdrawal request from a requestor who is a congress member. The withdrawal request may also be referred to as a disenrollment request. The withdrawal request may be a request to withdraw digital assets previously deposited by the requestor and currently controlled by the congress. The request may have been broadcast, by the requestor to all congress members.

In response to receiving the request, the node, at step 1504, evaluates the request against determined criteria. Such criteria may be predetermined criteria. If the congress operates according to a congress protocol in which the congress public key is not changed each time group membership changes, then at step 1504, the node may confirm that a private key share has been deleted by the requestor. Such confirmation may be obtained using a remote attestation protocol associated with a TEE.

If the congress protocol is one in which the congress public key is changed when membership changes, the node may not confirm deletion of the private key share since the private key share is no longer effective. Instead, a new congress key may be used and other digital assets under congress control may be transferred to the new congress key.

At step 1504, the evaluation may also consider whether a ghost chain is currently deployed. If a ghost chain is deployed, the withdrawal request may be denied until operation of the ghost chain ceases. That is, the congress members who are mining on the ghost chain are prevented from withdrawing their "stake" of tokens at least until the ghost chain terminates.

If the node approves the withdrawal request based on the evaluation, at step 1506 the node facilitates withdrawal of the digital assets. That is, the node uses its private key share to cooperatively generate a digital signature and uses the digital signature to transfer the digital assets previously deposited by the requestor back to the requestor. For example, the digital assets may be sent back to the address from which they were previously received. Step 1506 may be performed in accordance with the threshold signature scheme so that the withdrawal only occurs if at least the threshold number of congress members authorizes the withdrawal. Step 1506 may be performed after the member who desires to disenroll is suspended from activity for a period of time. This waiting period prevents the member from engaging in misbehaviour while the protocol for return of their member deposit is being performed.

The congress protocol may be used for a number of different purposes. The congress provides a secure mechanism for performing various functions. The congress may operate trustlessly and provides control of ownership over a digital asset.

The congress protocol may, for example, be used to implement a ghost chain as described herein, in which case, the congress protocol may be referred to as a ghost chain protocol.

Note that one or more of the operations performed in the example process 1500 illustrated in FIG. 15 may be performed in various orders and combinations, including in parallel.

Figure 16:
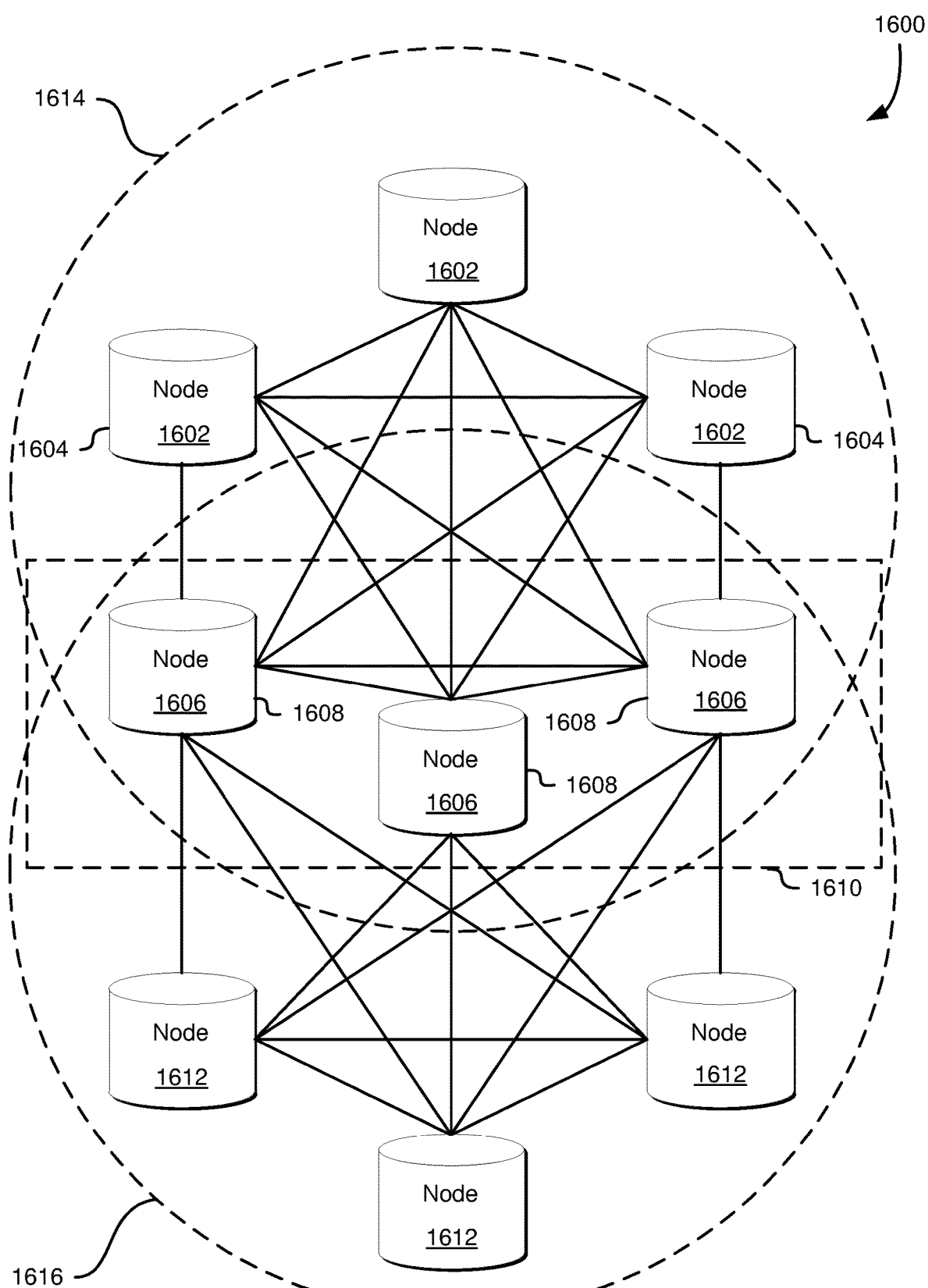
FIG. 16 illustrates a block diagram of an example environment where first and second blockchain networks may be implemented for a computational task distribution system associated with a blockchain network.

FIG. 16 illustrates, in block diagram form, an example environment 1600 where first and second blockchain networks may be implemented for a computational task distribution system associated with a blockchain network as described in connection with FIG. 3 and in accordance with an embodiment. The first blockchain network 1614 may be of the type described above with reference to FIG. 1. The first blockchain network 1614 includes a number of nodes 1602, 1606 that may be coupled to one another using suitable communication technologies that may include wired and wireless communication technologies The nodes 1602, 1606 of the first blockchain network 1614 maintain a global ledger of all transactions on a first blockchain (which may be referred to herein as the "mainchain"). At least some of the nodes 1602, 1606 operate as mining nodes 1604 of the first blockchain network 1614 as described herein.

A second blockchain network 1616 may be a proof-of-stake blockchain network. The second blockchain network 1616 includes a plurality of nodes 1612, 1606 that may be coupled to one another and that maintain a global ledger for the second blockchain network 1616. The global ledger for the second blockchain network 1616 may be separate and distinct from the global ledger of the first blockchain network 1614. The global ledger for the second blockchain network 1616 may be referred to herein as an "altchain."

The proof-of-stake based second blockchain network 1616 provides an alternative mechanism for achieving consensus. In a proof-of-stake blockchain network, the blockchain may be secured by proof-of-stake rather than proof-of-work. Under proof-of-stake, the mining nodes 1608 deposit a security deposit of digital assets and, the probability of being selected as the node to mine a block may be proportional to the quantity of the digital assets provided as a security deposit. Proof-of-stake blockchain systems can be used to avoid the computational expense and energy required to mine on proof-of-work blockchains. Proof-of-stake blockchains may allow for higher frequency and more regular block creation than proof-of-work blockchains.

The second blockchain network 1616 also includes a number of nodes 1606, 1612 that may be together using suitable communication technologies. These nodes 1606, 1612 maintain the global ledger for the second blockchain network 1616.

A plurality of nodes 1606 function as mining nodes 1608 of the second blockchain network 1616. Since the second blockchain network 1616 may be a proof-of-stake blockchain network, the mining nodes 1608 deposit digital assets in order to be included as mining nodes. More particularly, the mining nodes 1608 for the altchain form a bonded validator set in order to mine on the second blockchain network 1616. These mining nodes 1608 may also be members of a congress 1610 associated with the first blockchain network 1614. That is, nodes 1606, which may be part of both the first blockchain network 1614 and the second blockchain network 1616, act as mining nodes 1608 for the second blockchain network 1616 and as members of a congress 1610 established on the first blockchain network 1614. These mining nodes 1608 join the congress 1610 and take part in the congress 1610 according to methods described above. Their deposit of digital assets into a congress pool may be made in the mainchain. That is, the congress members deposit their "stake" on the proof-of-work first blockchain network 1614 to become congress members for the first blockchain network 1614 and also act as mining nodes 1608 on the second blockchain network 1616 by forming a bonded validator set. The member deposits on the first blockchain network 1614 serve as security deposits for the second blockchain network 1616.

It should be noted that, since the quantity of private keys shares that a member holds may be based on the amount of that member's security deposit and since such deposits are subject to confiscation for malicious behaviour, members having a greater influence on congress activity (i.e., members holding more private key shares) have more to lose than less influential members. The congress 1610 may be an open-membership group that may be joined by any nodes upon submission of sufficient stake to a pool associated with the congress 1610. Since the congress members may be mining nodes on the second blockchain network 1616, they can create new digital assets on the second blockchain network 1616 to effectively transfer digital assets from the first blockchain network 1614 to the second blockchain network 1616. The congress 1610 may be used to provide a two-way peg between the proof-of-work and proof-of-stake blockchains as described herein at least in connection with FIG. 17.

The nodes 1602, 1606, and 1612 illustrated in FIG. 9 may be electronic devices such as the electronic devices 200 described in connection with FIG. 2.

Figure 17:
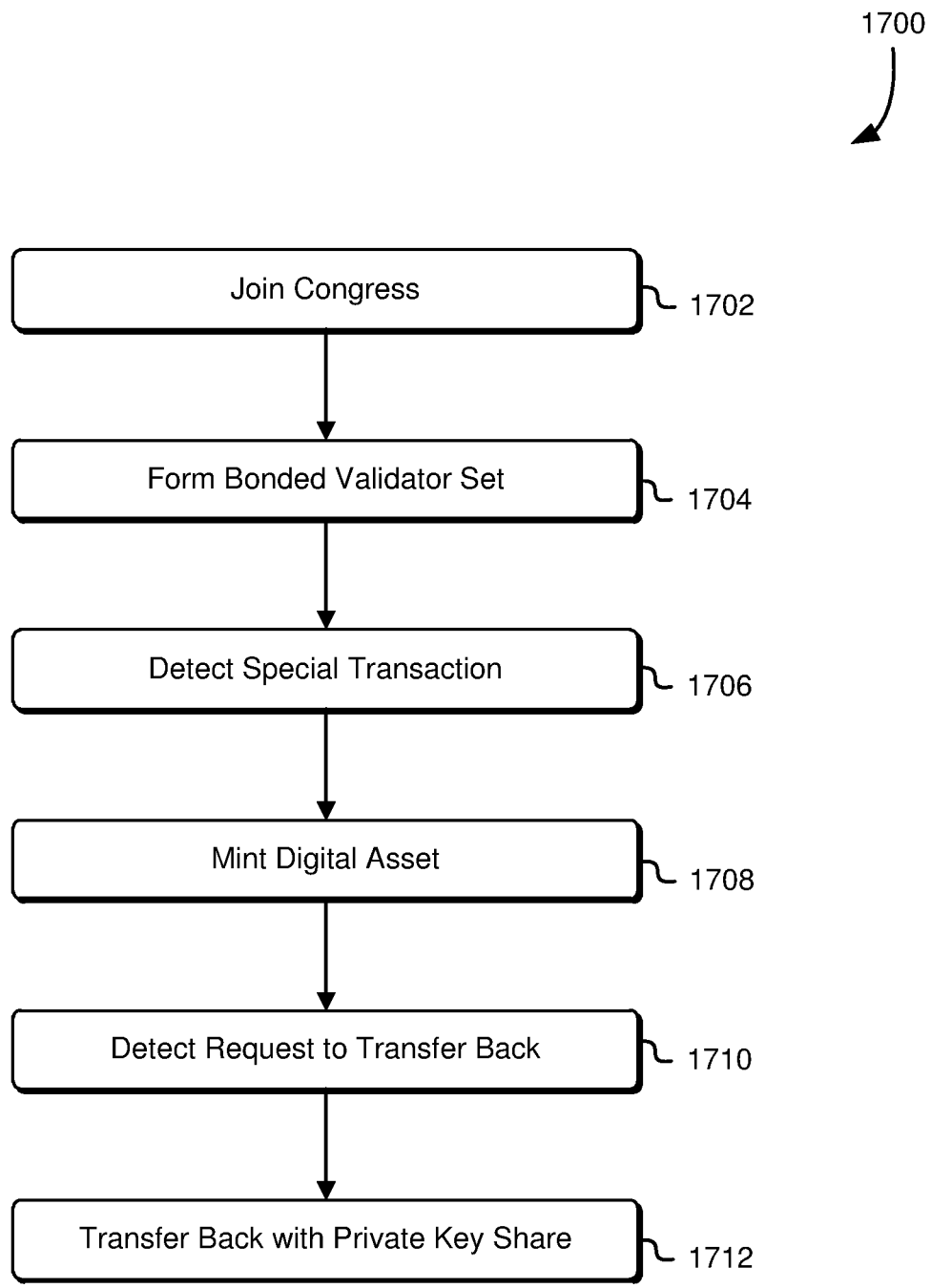
FIG. 17 illustrates a flowchart of an example process for providing a two-way peg or a computational task distribution system associated with a blockchain network.

FIG. 17 illustrates, in flowchart form, an example process 1700 for providing a two-way peg for a computational task distribution system associated with a blockchain network as described in connection with FIG. 3 and in accordance with an embodiment. The example process 1700 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1700 for providing a two-way peg or a computational task distribution system associated with a blockchain network described in connection with FIG. 17.

In an embodiment, the example process 1700 is performed by a node such as the node 1606 described in connection with FIG. 16), which operates in both the first blockchain network 1614 (i.e., in the proof-of-work blockchain network) and the second blockchain network 1616 (i.e., in the proof-of-stake blockchain network), both described above in connection with FIG. 16. Computer-readable instructions may be stored in a memory of such a node and these instructions, when executed by a processor of the node, configure the processor to perform the example process 1700.

At step 1702, the node (e.g., a node 1606) joins a congress. The congress may be joined in the manner described above with reference to FIG. 4. For example, the node may transfer one or more digital assets to a public group address associated with a congress public key. The public group address has one or more other digital assets associated with other members of a congress (e.g., other nodes such as the node 1606). When the node joins the congress, the node generates a private key share for use in a threshold signature scheme in which at least a threshold of private key shares must be used to generate a valid signature on behalf of the congress. As described above, the threshold signature scheme may be of various types including an Elliptic Curve Digital Signature Algorithm or a threshold scheme based on a Schnorr scheme.

Other holders of the private key shares may be the other members of the congress who have joined the congress on a permissioned or non-permissioned basis by transfer of respective digital assets to the public group address.

At step 1704, the node that joined the congress forms a bonded validator set on the proof-of-stake blockchain network (e.g., on the second blockchain network 1616) together with other members of the congress. That is, after deposit of digital assets as security (the deposit of which may be referred to herein as "bonding"), the members of the congress (which was formed through deposit on the first blockchain network 1614) now act as mining nodes on the second blockchain network (e.g., the second blockchain network 1616), periodically generating new blocks for the second blockchain network.

After the congress has been formed, a node that is a congress member may detect, at step 1706, confirmation of a special transaction of digital assets on the proof-of-work blockchain network to the group public address. The transaction may be determined to be special if it satisfies predetermined criteria that distinguish the transaction from a transaction that is used to join the congress. For example, the transaction may be determined to be special if it includes a particular flag, variable or attribute.

After detecting the special transaction, the node may wait until at least a threshold number of blocks have been added to the blockchain of the proof-of-work blockchain network. This waiting period may reduce the risk of a possible reorganization of the blockchain on the proof-of-work blockchain network that could void the transaction at step 1706. Thus, while not illustrated in FIG. 17, the method may include an operation of determining that at least a threshold number of blocks have been added to the blockchain of the proof-of-work blockchain network after detection of the special transaction.

After the threshold number of blocks have been added to the proof-of-work blockchain, the node generates (at step 1708) corresponding digital assets on the proof-of-stake blockchain network. These digital assets may be generated in response to detecting the special transaction and may be generated in a quantity that corresponds to the quantity of digital assets in the special transaction detected at step 1706.

The generated digital assets may be placed on the proof-of-stake blockchain network into an account associated with the owner of the public key that made the special transaction detected at 1706. Thus, the party transferring the digital assets to the congress on the proof-of-work blockchain network resumes control of the digital assets on the proof-of-stake blockchain network. This party may now be free to use these digital assets in various ways including, for example, transferring these digital assets to other accounts.

The generating may be performed by a selected congress member. More particularly a congress member who also acts as a mining node for the proof-of-stake blockchain network (e.g., a miner such as the mining node 1608 described in connection with FIG. 16) may be selected to generate a block by the proof-of-stake blockchain network. The probability of a node being selected may be based on the quantity of digital assets that that node has staked. The probability may be proportional to the quantity of digital assets that the node has deposited to the congress public key.

At some point, an owner of the digital assets may wish to transfer them back to the proof-of-work blockchain network (i.e., to the mainchain). To do so, the owner may issue a request to transfer the digital assets back to the proof-of-work blockchain network. Such a request may be issued in the form of a special transaction on the proof-of-stake blockchain network. This transaction may be special in that it is a transaction to a special return address, which is an address to which funds should be sent when the sender wishes to transfer these funds back to the mainchain. That is, transaction may be special in that the address is a special address. At step 1710, the node may detect a request to transfer digital assets on the proof-of-stake blockchain network back to the proof-of-work blockchain network. For example, at step 1710 there may be a mining of a transaction sending funds to the special address.

To guard against reorganization, the node may wait until at least a threshold number of blocks are added to the blockchain of the proof-of-stake blockchain network after detection of the request at step 1710. Thus, while not illustrated in FIG. 17, the example process 1700 may include an operation of determining that at least a threshold number of blocks have been added to the blockchain of the proof-of-stake blockchain network after detection of the request.

In response to detecting such a request and determining that the threshold number of blocks has been added to the proof-of-stake blockchain, the node, at step 1712, uses its private key share for the congress to cooperatively generate a valid signature for a transaction from the public group address. For example, the transaction may be circulated, either directly or via the altchain by including the required information in transactions on the altchain, between the members of the congress and members may add their partial signature until a valid signature is obtained, at which point the transaction may be broadcast to the mining nodes of the proof-of-work blockchain network (e.g., the mining nodes 1604 described in connection with FIG. 16). The transaction transfers the digital assets to an address on the proof-of-work blockchain network which may be an address associated with the node who issued the request detected at step 1710.

The special address into which digital assets are transferred at step 1710 may be a return address. Thus, transfer of the digital assets at step 1710 burns (i.e., destroys) the digital assets on the proof-of-stake blockchain to prevent the duplication of the digital assets over the two blockchains.

To enhance security at least a portion of the operations of the transfer may be performed in a trusted execution environment in a node. For example, the determination that at least a threshold number of blocks have been added to the blockchain of the proof-of-stake blockchain network may be performed within a trusted execution environment on the node. The node may also, prior to using the private key share, confirm the validity of the request detected at step 1710 within the trusted execution environment. Generation and use of the private key share may also be performed within the trusted execution environment.

Note that one or more of the operations performed in the example process 1700 illustrated in FIG. 17 may be performed in various orders and combinations, including in parallel.

It should be noted that to further enhance security of the protocols described herein, the protocols may include one or more safeguards to protect against a "one-way bet attack." An example of a one-way bet attack occurs when a fraudster (i.e., a node associated with a malicious party) constructs a transaction on the mainchain that transfers all or a portion of the digital assets under control of the congress (i.e., encumbered by the congress public key). The fraudster may provide the transaction to other members to add partial signatures. If a threshold number of private key shares associated with members participate, then a valid signature can be generated. If the threshold signature scheme that is used in a protocol is not an aggregate signature scheme (e.g., if ECDSA is used), then it may be difficult to identify members that contributed a partial signature. A member, who may be due for a distribution if the fraud succeeds, could add their partial signature to the transaction and pass the transaction on without risking exposure as a party to the fraud. Adding a partial signature could then be viewed as a one-way bet since the worst that can happen may be that insufficient partial signatures are collected to obtain a full signature.

A protocol may, therefore, include one or more features for securing the protocol against the one way bet. For example, the TEE of each node may be configured to periodically attest to all transactions that they have partially signed and/or they may be required to broadcast such an attestation before their deposit may be reclaimed. If a node attests to having added a partial signature to a transaction later judged (by a threshold of congress members) to be a fraudulent transaction then such malicious activity may be detected by other honest member nodes as described herein. When such malicious activity is detected, the honest member nodes may cooperate to suspend the member as described herein and/or to confiscate the digital asset(s) of the member also as described herein. This technique, while useful in helping to secure the protocol against the one-way bet, can introduce overhead when periodic attestation is used. Further, where attestation is required prior to return of a deposit, fraud may not be detected for a long period of time.

The protocol may include other security measures in order to safeguard against the one-way bet. For example, an aggregated signature scheme, such as the Boneh, Gentry, Lynn and Shacham "BGLS" scheme (*Aggregate and Verifiably Encrypted Signatures from Bilinear Maps*. International Conference on the Theory and Applications of Cryptographic Techniques, EUROCRYPT 2003: Advances in Cryptology—pp 416-432), may be used. Aggregate signatures allow different signers to sign different messages while only producing one signature, which can be validated in a "single shot."

In order to use BGLS, the TEE for each member may hold a single private key share for the threshold signature scheme used on the mainchain and a BGLS private key. The public key that corresponds to the BGLS private key may be referred to as the Share ID ("SID"). The BGLS private key may be a random number generated using a secure random number generator within the TEE. The private key share for the threshold signature scheme may be a share that has been computed inside the TEE using a multi-party key generation protocol.

BGLS can provide a safe guard against the one-way bet in the following way. When a node distributes to the congress public key for the purposes of enrolment as described herein, the enrolment transaction may include the number and hash of the most recent block on the mainchain that the enclave has seen, and the number and hash of the most recent block on a second blockchain (i.e., the altchain), that may be used as a broadcast channel for communication between members and a quote (a hash of the initial contents of the memory within the enclave signed by the TEE's attestation key and bound to the SID).

Before requesting that a TEE provide data required for an enrolment transaction, a member must send all blocks on the mainchain and the second blockchain sequentially into their TEE, beginning with the genesis blocks for each blockchain. The TEE may be configured to check the proof-of-work on the mainchain and to retain a record of the current membership, which may be obtained by analysing the enrolment and disenrollment transactions. This allows the TEE to, independently (of its owner, for example), establish SIDs that are current. That is, it allows the TEE to establish SIDs that correspond to all current members of the congress.

To enroll, the (prospective) member may construct, sign, and broadcast the enrolment transaction, transferable to the public group address for the congress, to the blockchain network that is the mainchain (e.g., to the first blockchain network 1614). The enrolment transaction references UTXO sufficient for at least one key share. When the enrolment transaction is confirmed on the mainchain, the members of the congress may collaborate to issue a new key share to the enrolled members' TEE as described herein.

When the congress wishes to initiate a transaction of digital assets encumbered by the congress public key, a node in the congress may propose a transaction (denoted as transaction "T(M)" herein), on a second blockchain network (i.e., on an altchain). The transaction T(M) is, at this point, an unsigned transaction intended to transfer digital assets on the mainchain, M, which may be proposed on the altchain, A. That is, the second blockchain network (i.e., the altchain) may be used as a broadcast channel. When one member wishes to communicate some information to all other members, they may put it on a transaction and send it to the altchain.

The transaction T(M) may be deemed ratified on the second blockchain network (e.g., the altchain) when at least a threshold number of blocks are mined on top of it. When the TEEs observe that the transaction is ratified (i.e., proposed and confirmed) on the second blockchain network (i.e., on the altchain), they broadcast a precommit. The precommit may be comprised of a BLGS signature on the transaction T(M) and the SID corresponding to the BLGS signature. The precommit may be sent to the second blockchain network, so that it is shared with other congress members. That is, the precommit may be encapsulated in a transaction on the second blockchain network.

Once a threshold of precommits are observed by the nodes and, more particularly, by the TEEs into which the blocks of both the mainchain and the second blockchain network are input, the node may output a commit (a partial signature) on the transaction T(M) that has been precommitted to. The threshold may, for example, be set at a simple majority of all current SIDs. The commit may be sent, contained in a transaction, on the second blockchain network containing a partial signature of T(M), which references T(M).

When at least a threshold number of commits are observed in the second blockchain network to construct a full signature, the signed transaction T(M), may be constructed and broadcast to the first blockchain network (e.g., to the mainchain).

The use of the pre-commits can provide additional security since the properties of the aggregate signature scheme mean that a member may not contribute a precommit without revealing their identity. That is, their identity may be revealed in the form of the SID, which is associated with the member deposit during the enrolment procedure.

In addition to the measures described above, the TEEs associated with the nodes may be further configured so that a transaction is only committed or precommitted to if it has been ratified on the second blockchain network. For example, all blocks could be constructed within TEEs that are configured such that blocks may always contain precommits or commits to ratified transactions that require them (corresponding to the SID of the TEE in which they were constructed). Consequently, a member may not refrain from sending commits or precommits to ratified transactions and continue to mine on the altchain.

A node that observes a precommit to an unratified transaction on the second blockchain network may report such malicious behaviour to other members of the bonded validator set. The malicious member (identified by their SID) may be penalized through suspension and/or confiscation of the member deposit as described above. For example, in response to observing a precommit to an unratified transaction, the membership may cooperate to immediately suspend the SID so that it is no longer accepted for any further precommits and the guilty member is suspended from participation in the protocol. Further, once the transaction containing the incriminating evidence may be confirmed in the second blockchain network, the guilty member's deposit may be confiscated and their deposit burned. The honest members may cooperate to compensate the node that reported the malicious behaviour (e.g., by transferring at least a portion of the confiscated digital asset(s) to the node that reported the malicious behaviour). Thus, the application of the aggregate signature scheme in a precommit phase may strengthen the security of the protocol, for example, by preventing the one-way bet attack.

To safeguard against a member attempting to fool a TEE into determining that the current difficulty for the proof-of-work in the mainchain may be less than its current difficultly, the TEE may be configured to take action when a sharp reduction in difficulty is observed. More particularly, if blocks are submitted to the TEE as they arrive, then the difficulty may be established from the time intervals between blocks. Any reduction in difficulty may be expected to be gradual and a sharp reduction (a reduction may be determined to be "sharp" based on predetermined criteria) may be caused by a member attempting to fool the TEE by not providing blocks as they arrived, to make it appear as though the difficulty had dropped so that it would be easier to fake blocks of the proof-of-work mainchain. To provide further security, the TEE may be configured to respond to an observed sharp reduction in the difficulty on the mainchain by outputting a precommit to the new difficulty (along with a hash of the block and the block number) to be mined to the second blockchain network. The hash of the block may be included to allow verification that the block corresponds to the new difficulty and the block number may be included to allow other members to quickly compare the claimed difficulty/block hash with the block at the same height on their copy of the blockchain.

Only when it is provided with blocks for the second blockchain containing a threshold of precommits to that same difficulty, which correspond to other members that had their deposits in place before the sharp reduction in difficulty, may it recalibrate the mainchain difficulty and accept any new members enrolled on the mainchain since the sharp drop in difficulty was observed.

Where an aggregate signature scheme such as BGLS is used, the procedure for return of a member deposit may include additional requirements. For example, the node requesting a return of deposit may be required to attest (through its TEE) to deletion of both the private key share and the BGLS private key. Other member nodes may be configured to only include their precommit or partial signature in the transaction returning a member deposit to a withdrawing member if that withdrawing member has attested to deleting both the private key share and the BGLS private key.

The node for the withdrawing member may also be required to attest, through its TEE, to all transactions to which it has precommitted or committed. Other member nodes may be configured to only include their precommit or partial signature in the transaction returning a member deposit to a withdrawing member if that withdrawing member has not precommitted to any transactions that are determined to have been unratified.

Due to the procedures noted above, a malicious member may be highly unlikely to benefit from withholding blocks from a TEE. The only precommits that a TEE could consider valid, other than those corresponding to confirmed SIDs, may be those that correspond to BLGS private keys that no longer exist (and the only way this might occur with appreciable probability may be if the member had not provided the TEE with up-to-date blocks and the TEE registered some members as current when, in fact, they had left the congress, deleted their key shares and reclaimed their member deposit). Further, as a consequence of the above, a member may not convince their TEE to provide a precommit to a fraudulent (i.e., unratified) transaction and subsequently be granted return of their deposit by the congress. Thus, the member may be motivated to ensure the TEE has up-to-date copies of the blockchains (i.e., the mainchain and alt-chain).

Thus, the protocol may be secured by configuring the nodes to operate according to a protocol that includes one or more of the following features: a TEE may be configured to require a threshold of precommits to be observed on a second blockchain network (e.g., a proof-of-stake altchain) before it may output a partial signature on the precommitted transaction; a member deposit may only be returned if the TEE for that member attests to the deletion of the private key shares and the BGLS private key and all transactions to which it has precommitted and none of these is judged, (by consensus on the second blockchain network) to have been unratified; any block constructed within a TEE may always contain (pre)commits to ratified transactions that require them (i.e. those ratified/precommitted transactions that are yet to gather a threshold of (pre)commits); and the TEE may be configured to respond to an observed sharp reduction in the difficulty on the mainchain by outputting a precommit to the new difficulty (along with a hash of the block) to be mined to the second blockchain network. Only when it is provided with blocks for the second blockchain containing a threshold of precommits to that same difficulty, which correspond to other members that had their deposits in place before the sharp reduction in difficulty, may it recalibrate the mainchain difficulty and accept any new members enrolled on the mainchain since the sharp drop in difficulty was observed.

The protocol that supports the second blockchain network described herein may be layered on top of an existing proof-of-work public blockchain protocol, such as Bitcoin, without permission since it interacts through the construction of digital signatures via a multiparty protocol external to the mainchain (e.g., Bitcoin), meaning that it may operate without requiring the consent of the mainchain miners or developers. The protocol may, therefore, by implemented "over" an existing public proof-of-work blockchain and may not be contingent on modification to the protocol of that public proof-of-work blockchain. In this sense, the protocol may be added to a blockchain permissionlessly (i.e., without requiring permissions) since the blockchain protocol itself need not be modified to accommodate the further protocol.

It should be noted that the example processes described herein have been generally described as being performed at a node, but features of the example processes described herein rely on cooperation with other nodes and could be performed by other computing devices such as those described herein. Additionally, while the description above generally describes a congress being implemented on a proof-of-work blockchain network, the congress may, instead, be implemented on a proof-of-stake blockchain network.

In addition to certain benefits and features already mentioned, techniques described herein may provide additional benefits. For example, the two-way peg may allow Turing complete blockchain-based computer program functionality to be added to a binary blockchain system that consists of an existing proof-of-work blockchain (such as Bitcoin) and a proof-of-stake altchain. More particularly, such functionality may be realized by endowing the proof-of-stake altchain with a Turing-complete scripting language. Further, at least some of the techniques described herein can provide a proof-of-stake blockchain that does not suffer from the nothing-at-stake problem of previous suggestion implementations of proof-of-stake blockchains, the advantages of faster and more regular block creation associated with traditional proof-of-stake schemes. Further, at least some techniques described herein provide a reason for miners of a proof-of-stake mainchain to hold significant number of digital assets that increases the security of the proof-of-work mainchain.

Figure 18:
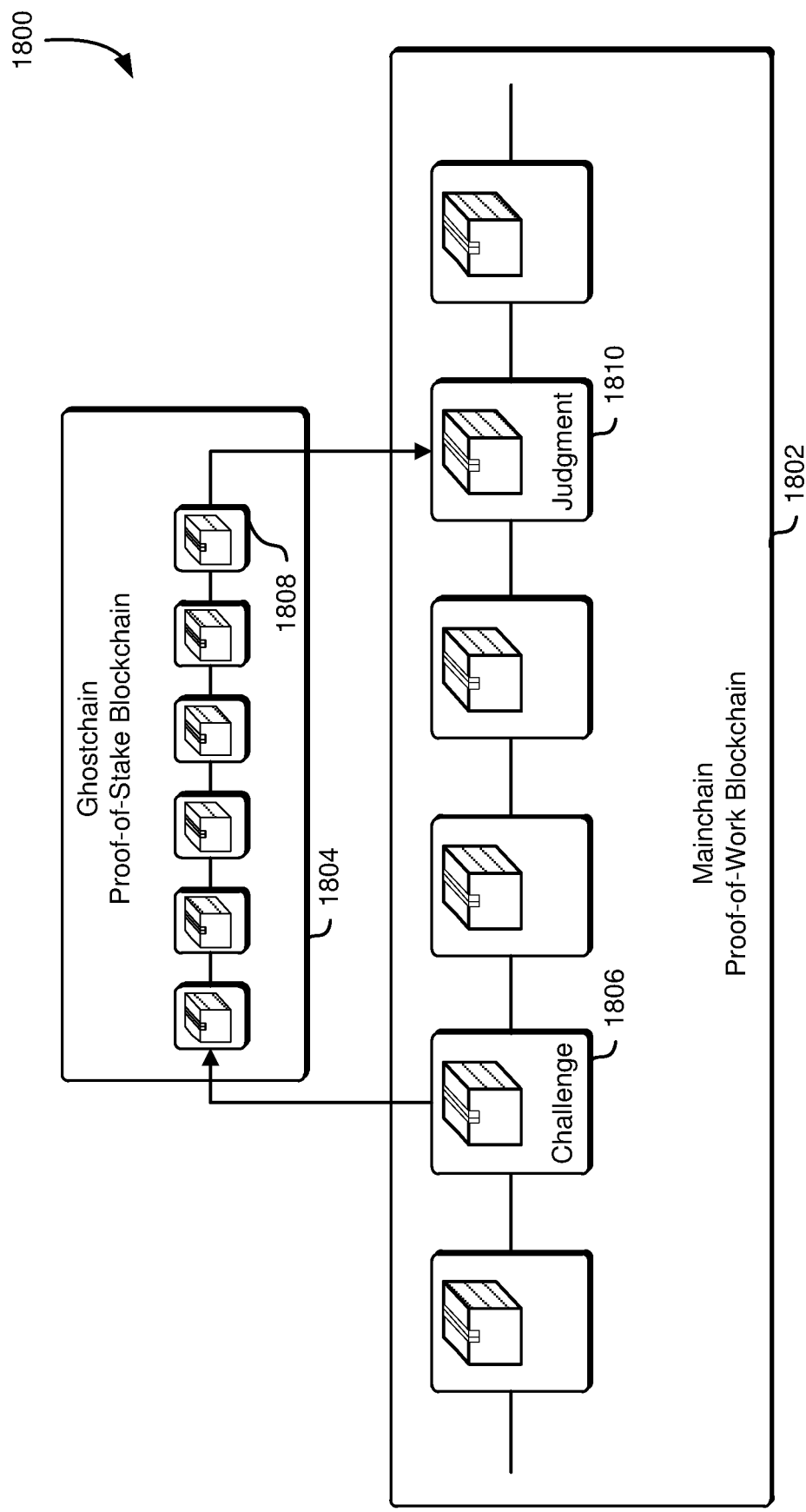
FIG. 18 illustrates a block diagram of an example environment where a blockchain and a ghost chain may be implemented for a computational task distribution system associated with a blockchain network.

FIG. 18 illustrates, in block diagram form, an example environment 1800 where a blockchain and a ghost chain may be implemented for a computational task distribution system associated with a blockchain network as described in connection with FIG. 3 and in accordance with an embodiment.

The blockchain 1802 may be a block-based distributed proof-of-work ledger as described herein. The ghost chain 1804, also as described herein, may be a block-based distributed proof-of-stake distributed ledger that may be used, for example, to arbitrate a dispute between nodes in a blockchain network. For example, the blockchain may include a challenge 1806 in which one node challenges work product submitted by another node. The challenge 1806 may occur, for example, when a node (i.e., a Challenger) indicates that a result proposed in fulfillment of a request is invalid.

When the challenge 1806 is issued by a node, a ghost chain 1804 may be deployed. The ghost chain may be instantiated after the challenge 1806 occurs in response to the challenge. The ghost chain may be instantiated with a genesis block that is the final block (also referred to as a terminal block) from a previous instantiation of the ghost chain. A number of blocks may be added to the ghost chain by mining nodes to resolve the digital dispute until the ghost chain reaches a judgment 1808.

When a judgment 1808 is reached, a transaction (referred to below as a final transaction or settlement transaction) may be constructed and signed (as will be described in greater detail below). This transaction may be a transaction whose effect may be to distribute funds on the main blockchain 1802 in accordance with the judgment 1808, distribute funds to mining nodes of the ghost chain, etc. The transaction may also communicate the results of the judgment back to the main blockchain 1802 (e.g., the transaction may be mined into the judgment block 1810). More particularly, the results may be encapsulated in the transaction.

After judgment has been reached and the final transaction constructed and signed, the ghost chain 1804 may terminate and the constructed transaction may be mined into the main blockchain 1802 at the judgment block 1810. Since the ghost chain 1804 terminates, it may be unlike a typical blockchain in that it has a terminal block. This terminal block, which may be the last block in the ghost chain 1804, occurs when the judgment is determined (e.g., the judgment 1808 block of the ghost chain 1804) and the resulting transaction, which distributes funds on the main blockchain 1802 in accordance with the judgement, distributes funds to mining nodes of the ghost chain, etc., is validly signed.

Accordingly, nodes in the blockchain network may implement a Requester-Proposer-Challenger protocol and/or a ghost chain resolution protocol. Such nodes may include computer-executable instructions stored in memory such as the memory 220 described in connection with FIG. 2, which implement such protocols. Such instructions, when executed by a processor such as the processor 210 described in connection with FIG. 2, cause a node (such as an electronic device 200 of the type described in connection with FIG. 2) to perform one or more methods associated with the Requester-Proposer-Challenger protocol and/or a ghost chain resolution protocol. Such methods may include any one or combination of the example processes 1900, 2000, 2100, or 2200 described herein.

Reference will now be made to FIGS. 19-22, which illustrate methods that may be included in a Requester-Proposer-Challenger protocol and/or a ghost chain resolution protocol. A Requester method (e.g., the method of example process 1900 illustrated in FIG. 19) may be performed by a Requester of a task in a computational task distribution system. That is, a node that requests completion of a task may perform the Requester method illustrated in FIG. 19. In an embodiment, the node is a node in a blockchain network and the node may be referred to as a Requester.

A Proposer method (e.g., the method of example process 2000 illustrated in FIG. 20) may be performed by a Proposer of a solution to the task. That is, a node that claims to have completed the task may perform the Proposer method illustrated in FIG. 20. The node may be node in the blockchain network and the node may be referred to as a Proposer.

A Challenger method (e.g., the method of example process 2100 illustrated in FIG. 21) may be performed by a Challenger of the solution to the task. That is, a node that challenges the solution put forward by the Proposer may perform Challenger method illustrated in FIG. 21. The node may be a node in the blockchain network and the node may be referred to as a Challenger.

An arbitrator method (e.g., the method of example process 2200 illustrated in FIG. 22) may be performed by a node of blockchain network, in cooperation with other nodes of the blockchain network. A node performing the arbitrator method in cooperation with other nodes may be referred to as an arbitrator.

The methods described in example processes 1900, 2000, 2100, and 2200 of FIGS. 19-22 may be performed cooperatively to collectively provide a Requester-Proposer-Challenger protocol in which a ghost chain in used to determine the validity of the Proposer string (and/or to determine the validity of the Challenger string when the Proposer string is subject to challenge) as described herein.

Figure 19:
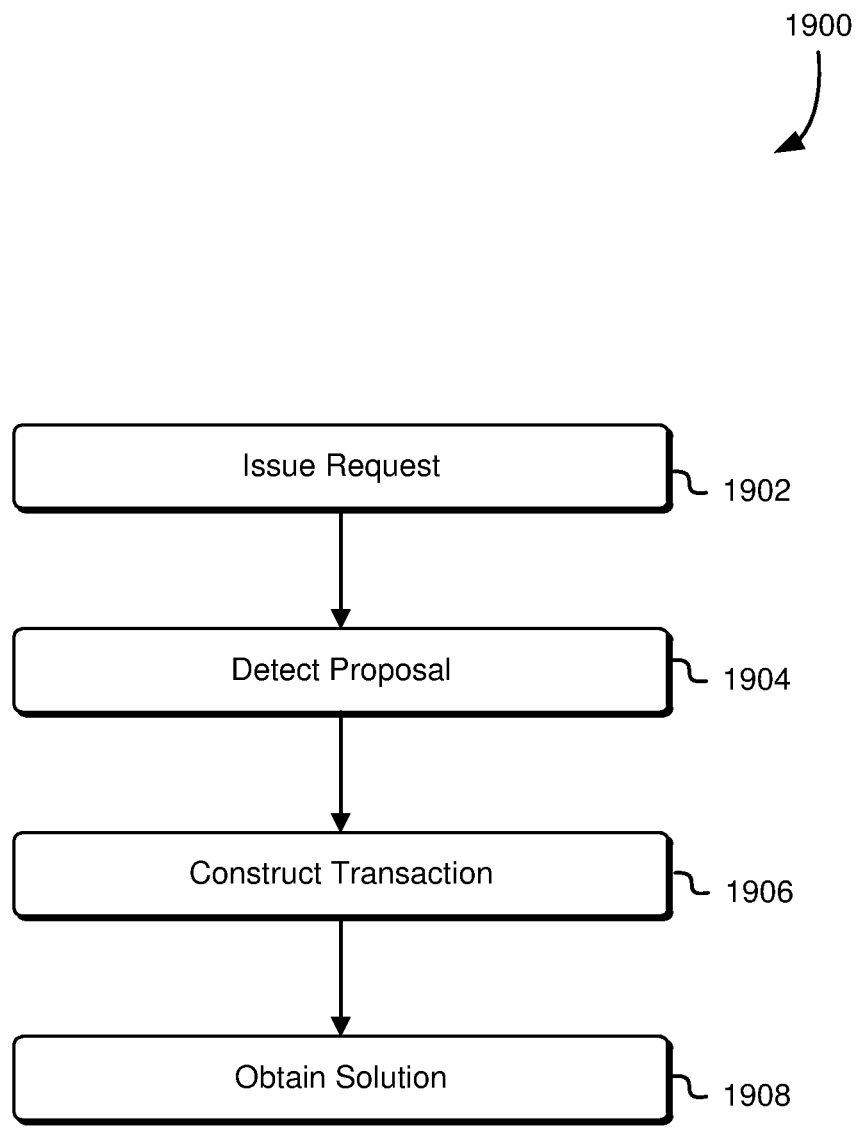
FIG. 19 illustrates a flowchart of an example process for requesting completion of a task for a computational task distribution system associated with a blockchain network.

FIG. 19 illustrates, in flowchart form, an example process 1900 for requesting completion of a task for a computational task distribution system associated with a blockchain network as described in connection with FIG. 3 and in accordance with an embodiment. The example process 1900 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1900 for requesting completion of a task for a computational task distribution system associated with a blockchain network described in connection with FIG. 19. Note that one or more of the operations performed in the example process 1900 illustrated in FIG. 19 may be performed in various orders and combinations, including in parallel.

Figure 20:
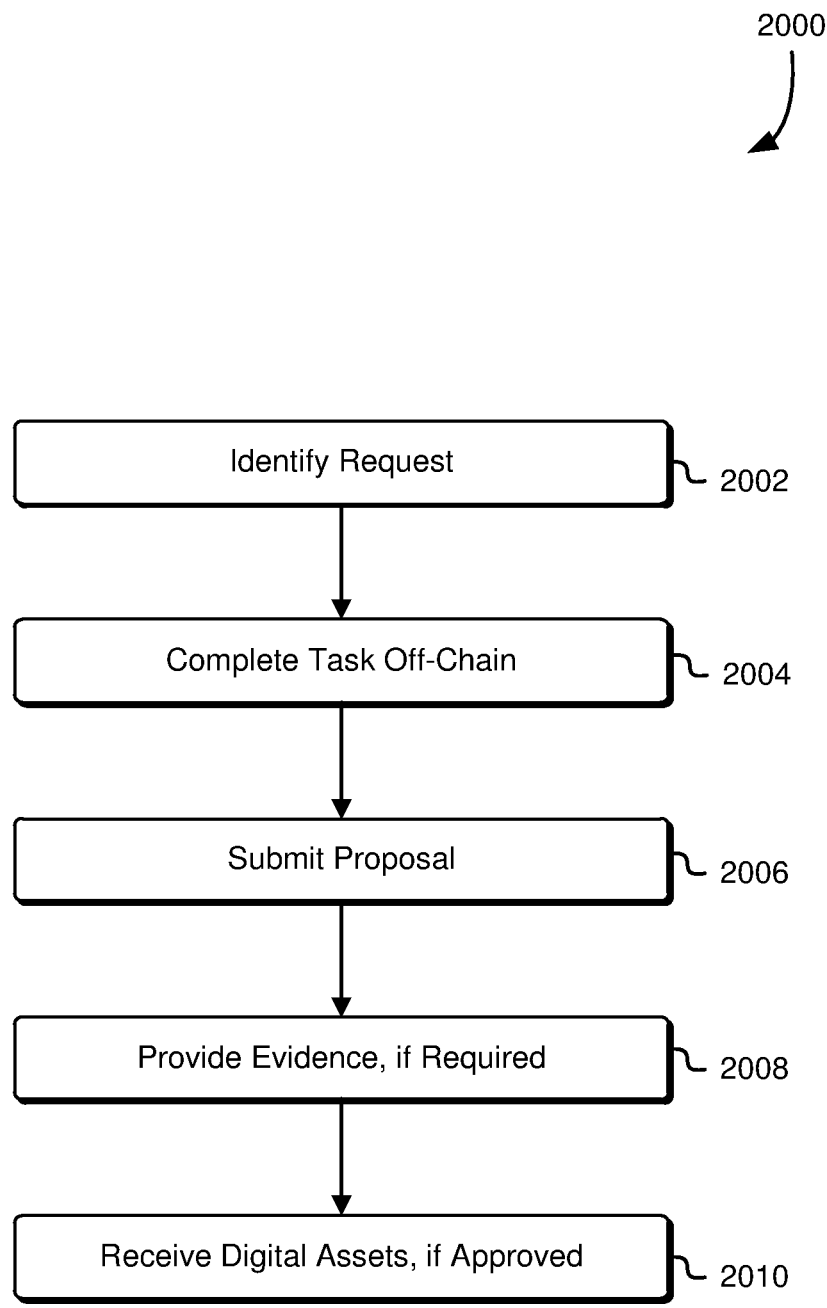
FIG. 20 illustrates a flowchart of an example process for proposing a solution to a task for a computational task distribution system associated with a blockchain network.

FIG. 20 illustrates, in flowchart form, an example process 2000 for proposing a solution to a task for a computational task distribution system associated with a blockchain network as described in connection with FIG. 3 and in accordance with an embodiment. The example process 2000 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 2000 for proposing a solution to a task for a computational task distribution system associated with a blockchain network described in connection with FIG. 20. Note that one or more of the operations performed in the example process 2000 illustrated in FIG. 20 may be performed in various orders and combinations, including in parallel.

Figure 21:
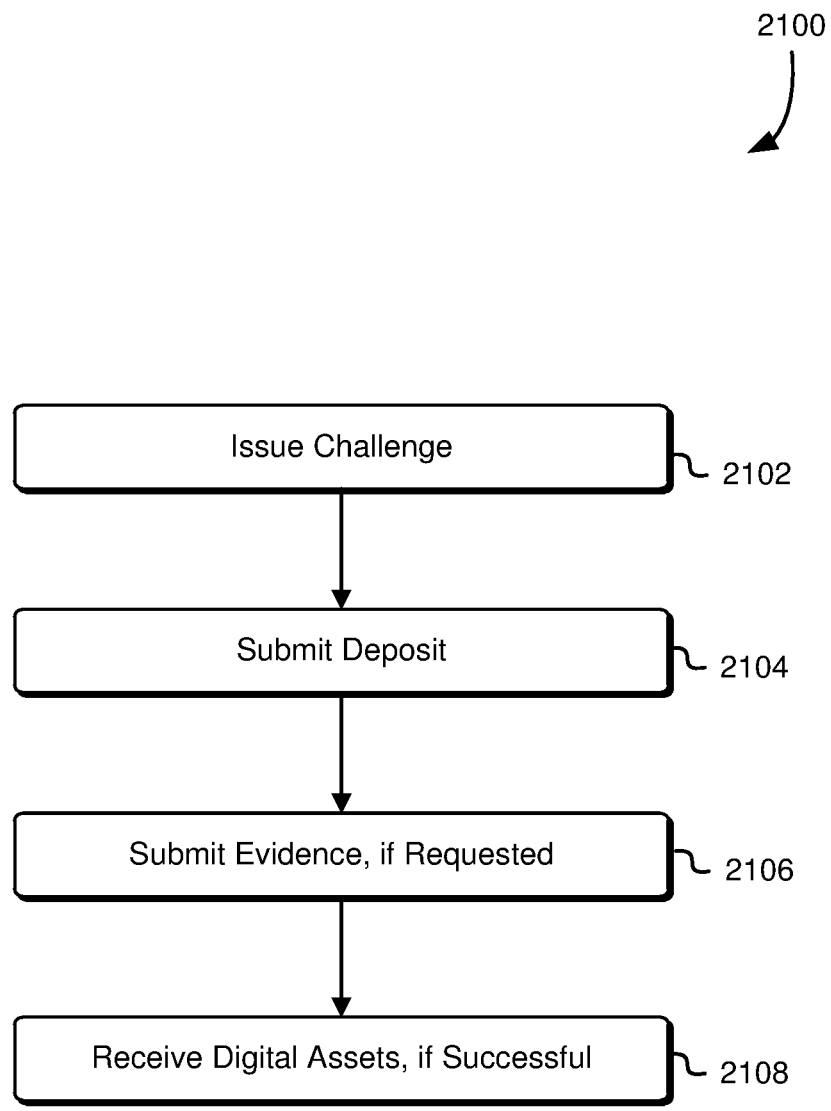
FIG. 21 illustrates a flowchart of an example process for challenging a solution to a task for a computational task distribution system associated with a blockchain network.

FIG. 21 illustrates, in flowchart form, an example process 2100 for challenging a solution to a task for a computational task distribution system associated with a blockchain network as described in connection with FIG. 3 and in accordance with an embodiment. The example process 2100 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 2100 for challenging a solution to a task for a computational task distribution system associated with a blockchain network described in connection with FIG. 21. Note that one or more of the operations performed in the example process 2100 illustrated in FIG. 21 may be performed in various orders and combinations, including in parallel.

Figure 22:
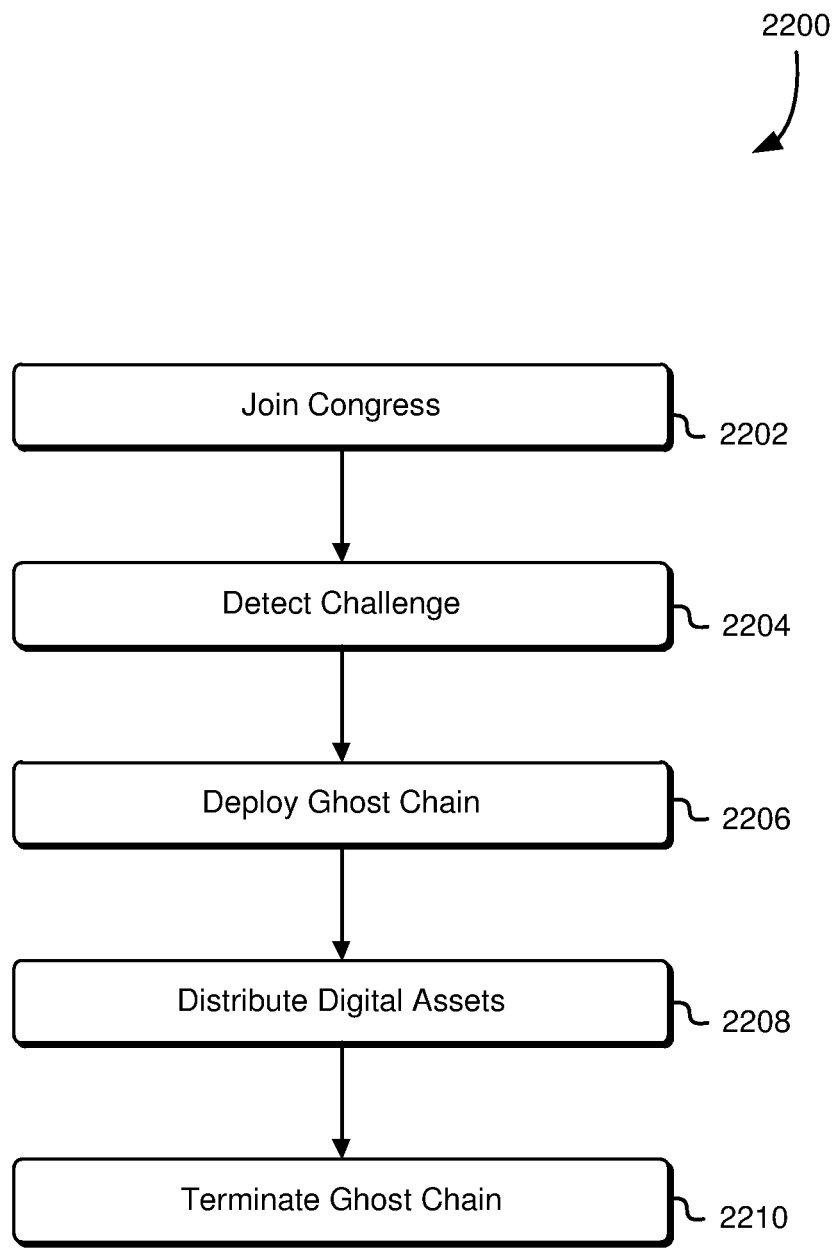
FIG. 22 illustrates a flowchart of an example process for arbitrating a Challenger to a solution to a task for a computational task distribution system associated with a blockchain network.

FIG. 22 illustrates, in flowchart form, an example process 2200 for arbitrating a Challenger to a solution to a task for a computational task distribution system associated with a blockchain network as described in connection with FIG. 3 and in accordance with an embodiment. The example process 2200 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 2200 for arbitrating a Challenger to a solution to a task for a computational task distribution system associated with a blockchain network described in connection with FIG. 22. Note that one or more of the operations performed in the example process 2200 illustrated in FIG. 22 may be performed in various orders and combinations, including in parallel.

At step 1902 of the example process 1900 a node (which may be referred to herein as the "Requester") issues a request. The request may be a request to complete a task. For example, the task may be a request for work product. More particularly, it may be a request for processor work product (i.e., for a processor to generate defined work product, such as an output for a computation). The task may be an expensive computation, a task that requires input from an external source such as a financial contract, or a task to produce data having specific properties, such as an algorithm or document. The request offers a bounty in the form of digital assets associated with a blockchain network (e.g., the blockchain network 100 described in connection with FIG. 1) in exchange for successful completion of the task. The request may be issued off of the blockchain (i.e., "off chain"). For example, the request may be issued on a web server accessible via the Internet. The request may be defined to be successfully completed either when a candidate solution to the request goes unchallenged for a fixed period of time (which may be referred to herein as a "challenge period") or, in the case of a challenge that may be resolved by rerunning the computation on the ghost chain, when a candidate solution is found to match the result of an on-chain computation.

The request (at step 1902) may be issued in a computational task distribution system. The computational task distribution system may include a collection of tasks that are requested by various Requesters. For example, a plurality of tasks may be published in the computational task distribution system. The tasks may be published by the same Requester or by different Requesters. The computational task distribution system allows nodes to offload computations or the performance of algorithms to other nodes.

At step 2002 of the example process 2000, a node, referred to herein as the Proposer, identifies the request. The node then proceeds (at step 2004) to complete the task off-chain. For example, an algorithm, data, or other result requested by the Requester may be obtained as work product by a processor.

The Proposer may then submit a proposal at step 2006 of the example process 2000. The proposal may be a claim to have completed the task associated with the request issued by the Requester at step 1902 of the example process 1900. To submit the proposal, the Proposer may send their public key for the blockchain network to the Requester. The Proposer may also commit to the solution to the task. This commit could be in the form of a hash of the solution (i.e., a hash of the work product, such as the output of a computation or a solution of another type).

The Requester receives the proposal at step 1904 of the example process 1900. For example, the Requester may receive the Proposer's public key and the "commit" (e.g., the hash of the purported work product).

In response to receiving the proposal, at step 1906 of the example process 1900, the requestor may construct a transaction, T1. The transaction T1 includes the bounty as input. The transaction includes the bounty and also a Proposer deposit as output (i.e., the output of T1, T1_out=bounty+ Proposer_deposit). The transaction T1 may be signed to allow a Proposer to add their own input. For example, the transaction T1 may be signed SIGHASH_ALL|SIGHASH_ANYONECANPAY. SIGHASH_ALL may be a default signature hash type that signs the entire transaction except any signature scripts, preventing modification of the signed parts. SIGHASH_ANYONECANPAY may be a signature hash type that signs only the current input.

The transaction T1 may be constructed to be unlocked in two ways. After the expiration of a challenge period (described below) it may be unlocked with a signature of the Proposer (i.e., a signature corresponding to the public key that the Proposer provided to the Requester) and the solution corresponding to the commit. For example, the operation code OP_CHECKSEQUENCEVERIFY may be used to lock the transaction for the challenge period but to allow unlocking by the Proposer if there is no challenge within this period. The transaction T1 may also be constructed to be unlocked with the group signature of the congress as described above at any time. That is, the transaction T1 can be unlocked before or after expiration of the challenge period when nodes that are members of the congress cooperate using their respective private key shares to unlock the transaction T1 in accordance with the threshold signature scheme for the congress.

The transaction T1 may also include information about the alleged solution such as the commit. For example, the hash of the purported work product may be added to the transaction T1 using the OP_PUSHDATA operation code. More particularly, the hash of the purported work product may be added to a locking script of the transaction T1. This locking script may be configured to be unlocked (after expiration of the challenge period) by an unlocking script that provides a solution that hashes to the hash of the purported work product contained in the locking script.

While not illustrated in FIGS. 19 and 20, the Proposer may receive the transaction, T1, constructed at step 1906 and may add the Proposer deposit as an input to the transaction T1. The Proposer broadcasts the transaction to other nodes of the blockchain network. The transaction T1 may then be mined onto the blockchain (i.e., added to a block) so that it is publicly visible.

Once the transaction T1 is mined onto the blockchain, a challenge period may be initiated during which any node may challenge the proposal submitted by the Proposer. If no challenge is issued during the challenge period, the Proposer may claim the bounty and the Proposer deposit from the transaction T1. The Proposer may initiate a timer to track the amount of time remaining in the challenge period and may automatically take action once the challenge period has expired. For example, the Proposer may provide work product (which may be referred to herein as the solution) to the Requester and may unlock the transaction.

The Proposer may not provide the solution directly to the Requester. Instead, the Proposer may provide the solution by embedding the solution in a transaction on the main blockchain network. For example, the Proposer may provide the solution in an unlocking script, which unlocks a locking script (in the transaction T1) that encumbers the bounty and the Proposer deposit (e.g., in an unlocking script that causes the locking script of T1 to evaluate to TRUE). As noted above, the locking script may be configured to check that the proposed solution in the unlocking script hashes to the value that the Requester was previously given by the Proposer (i.e., in the "commit"). When the unlocking script successfully unlocks the locking script that encumbers the digital assets previously encumbered by the locking script of transaction T1 (i.e., the UTXO of transaction T1), the transaction that contains the unlocking script unlocks the transaction by encumbering the digital assets (i.e., the Proposer deposit and bounty) with a new locking script (which may, for example, use the Proposer's public key to encumber the digital assets so that the Proposer now has complete control over the digital assets).

As noted above, the transaction T1 may be constructed to lock the bounty and Proposer deposit using the OP_CHECKSEQUENCEVERIFY code. This permits the Proposer to automatically claim the bounty and Proposer deposit after expiration of the challenge period without further approval from the Requester.

It can be noted that, if there is no challenge to the Proposer's solution, the complete transaction can be performed on the proof-of-work main blockchain without need for execution of a challenge protocol or of a ghost chain protocol.

However, a Challenger may issue a challenge during the challenge period. For example, at step 2102 of the example process 2100, a Challenger issues a challenge. The Challenger may have performed operations similar to step 2002 and step 2004 in the example process 2000. That is, the Challenger may have identified the request and may have completed the task off-chain prior to issuing the challenge at step 2102. The Challenger may also have determined that the challenge should be issued by determining that the Challenger's solution differs from that of the Proposer. The Challenger may, for example, perform a hash of their solution and compare that hash to the hash of the Proposer's solution and, if the hashes differ, the Challenger may issue the challenge.

At step 2102 of the example process 2100 of FIG. 21, the Challenger issues a challenge within the challenge period. The Challenger may do so by broadcasting an intention to challenge to the blockchain network. When a challenge is issued, a group of nodes may assist in determining validity of solutions.

For example, a group of nodes may form a congress, which may be used to perform an arbitration when a challenge is raised. The congress is, as noted above, secured by deposit of digital assets on a proof-of-work blockchain network. At step 2202 of the example process 2200, an arbitrator performing the arbitrator example process 2200 may join a congress as described above. Accordingly, at step 2202, the arbitrator joins a group, which may be referred to as a congress, through deposit of digital assets to a public group address associated with the congress to become a group member. The arbitrator makes this deposit on a proof-of-work blockchain network. As described above, the group may be associated with a threshold signature scheme for which the node controls a private key share. The joining of the group (which may also be referred to as enrolment) may, for example, be performed during deployment of a ghost chain. Since FIG. 22 illustrates step 2202 (joining the congress) as being performed prior to step 2206 (deployment of the ghost chain), step 2202 may be performed by a node that joined the congress during a previous deployment of the ghost chain (i.e., not during the deployment at step 2206). However, step 2206, step 2208 and step 2210 may, for example, be performed by nodes that join the group during step 2206.

At step 2204, the arbitrator cooperates with other nodes of the group to detect the challenge issued by the Challenger at step 2102 of the example process 2100. More particularly, the arbitrator cooperates with other nodes of the group to detect a challenge, by the Challenger, to work product of a Proposer in response to the request made by the Requester.

Due to the transaction T1 discussed above, when a challenge is issued, the group assumes control of the bounty and Proposer deposit. That is, the transaction T1 may be constructed to be unlockable by the congress at any time. The bounty and deposit are, therefore, placed under and maintained under control of the group. Thus, regardless of whether a challenge occurs, the group has control of the bounty and Proposer deposit. In an embodiment, when a challenge is detected, the group collectively signs an unlocking transaction associated with the challenge to distribute the distribution and/or the deposit(s) as described herein. As described herein, the distribution and/or the deposit(s) may be redeemable by the group at any time, but may only be redeemable by the Proposer (or the Challenger, if successful) after the associated timeout periods.

After the group has control of the bounty and the Proposer deposit and in response to detecting the Challenger, the arbitrator may cooperate with other nodes of the group to facilitate deposit of digital assets by the Challenger. For example, in response to detecting the challenge, the congress may construct a transaction T2 with an input that is equal to the bounty and the Proposer deposit (e.g., T2_in =bounty+Proposer deposit) and an output that is equal to the sum of the bounty, the Proposer deposit, and the Challenger deposit (e.g., T2_out=bounty+Proposer deposit+Challenger deposit). The transaction T2 may be configured to distribute at any time to the group. That is, the transaction T2 may be configured to distribute to the congress public key. The transaction T2 may be signed SIGHASH_ALL|SIGHASH_ANYONECANPAY. The arbitrator, together with other arbitrators, may provide the transaction T2 to the Challenger for adding of the Challenger deposit as input. For example, the arbitrator, together with other nodes, may make the transaction T2 publicly available to other nodes.

After the transaction T2 is made publicly available, the Challenger adds a Challenger deposit as an input to the transaction T2. That is, the Challenger provides a deposit (at step 2104 of the example process 2100) of digital assets and places such deposit under control of the group. More particularly, the Challenger deposit may be placed under control of the congress public key. The bounty, Proposer deposit and Challenger deposit are, therefore, all placed under control of the group and encumbered by the congress public key. As described in greater detail in the description of congresses above, a threshold signature scheme allows a threshold number of members of the congress to use respective private key shares to cooperatively generate a valid signature for transactions involving the bounty, Proposer deposit and Challenger deposit. The Proposer deposit and the Challenger deposit may be of equal size.

The Challenger may also commit to their challenge solution. For example, the Challenger may add a hash of the solution to the transaction T2 using the operation code OP_PUSHDATA, for example.

The transaction T2 may be broadcast to the main blockchain network and may be mined onto the main blockchain network so that the Challenger deposit is encumbered by the congress public key. The bounty, Proposer deposit and Challenger deposit may now be placed under the exclusive control of the group.

Thus, the Challenger provides evidence of an alternative solution and a deposit to the arbitrator. After the transaction T2 is mined onto the main blockchain network, at step 2206 of the example process 2200, the arbitrator cooperates with other nodes of the group to deploy a ghost chain to resolve the challenge. As described above, the ghost chain may be a proof-of-stake blockchain in which mining nodes of the ghost chain are members of the group. That is, members of the congress may be permitted to mine on the ghost chain. Their member deposit on the proof-of-work blockchain network serves as their stake to allow them to mine on the ghost chain and the probability of any member being selected to mine may be proportional to the relative amount of their deposit.

While the ghost chain is deployed (at step 2206), a genesis block for the ghost chain may be created or obtained by the arbitrator in cooperation with other nodes of the group. The genesis block may be a final block from a last ghost chain deployment (e.g., the terminal block from the last instance that a ghost chain was run and the previous run may have been in response to a past challenge). This block may contain information regarding genesis distributions. Genesis distributions may be transfers of digital assets, which are yet to be made and that are due based on a previous deployment of the ghost chain.

Further, while the ghost chain is deployed, members may be permitted to enroll or may request to disenroll from the group. During the enrolment stage, new members may be enrolled so that they are allocated private key shares as described herein. The new members may be provided with the genesis block (which may be authenticated by a threshold of current members) and any subsequent blocks that were generated during the enrolment process.

A pre-disenrollment stage may also be included in the ghost chain run. During this pre-disenrollment stage, any member who has requested to be disenrolled may send attestation to deletion of certain private data. Such attestation may be required for the return of a member deposit. Any evidence of misbehaviour that may preclude the return of a member deposit may be sent at this stage (for example, a newly enrolled member may submit a genesis block that has been precommitted to by a current member or members, but is suspected to be fake). Techniques for disenrolling are described in greater detail above.

The deployment of the ghost chain may include, by the arbitrator in cooperation with other nodes of the group, an adjudication operation. The adjudication operation may include receiving evidence from the Proposer and Challenger and resolving the challenge based on the evidence. For example, the received evidence may include one or both of a final solution or an intermediate result. The intermediate result may be the result of a step or a series of steps required to perform the requested task. For example, the intermediate step may be partial work product for the task. The final solution may be the final work product that completes the requested task. Evidence may be submitted by the Proposer at step 2008 of the example process 2000 and by the Challenger at step 2106 of the example process 2100.

The arbitrator and other nodes of the congress may resolve the challenge by performing the task associated with the request to determine a correct solution. For example, the task (e.g., a computation or algorithm) may be performed on-chain (i.e., on the ghost chain itself). The group may determine which of the Proposer and Challenger strings is correct by comparing such solutions with its own solution, determined on the ghost chain. During this process, the group members (i.e., the ghost chain mining nodes) perform computations and/or analysis to arbitrate on the dispute. The group members reach consensus and sign blocks during this process.

To reduce computational requirements and time delays, the group may perform a binary search procedure while using the ghost chain to resolve the challenge. More particularly, the Proposer and the Challenger may each provide one or more intermediate results for their computation or analysis. Since the input of the computation or analysis may be the same for both the Proposer and Challenger (as it would have been specified by the Requester) and since the output may be different, there may be a transition between intermediate steps that diverges for the Challenger and Proposer. Once such a transition is identified, the group may use the ghost chain to perform only the single operation, step or procedure associated with the transition. Thus, the arbitrator, in cooperation with the other nodes may only perform a portion of the task on the ghost chain to determine that one of the Proposer or Challenger has erred in an intermediate step of a task associated with the request. Under this binary search technique, the group may not identify a correct solution, but may rather identify an incorrect solution. Since the group does not determine the correct solution, the solution that is not identified as being incorrect is not, necessarily, correct.

The arbitrator (in cooperation with other nodes of the group) reaches a judgment while the ghost chain is deployed. Judgment may be said to have been reached when the arbitrator and other nodes of the congress resolves the challenge (i.e., when such nodes form consensus on the resolution).

After judgment for an arbitration is reached on the blockchain, the arbitrator cooperates with other nodes of the group to construct a final transaction (to be mined to main blockchain network when fully signed). The final transaction, which may also be referred to as a settlement transaction, may contain various digital asset transfers; for example: bounty+deposit (which may be transferred to a node that has been deemed successful or vindicated in the course of the adjudication); mining distributions (for ghost chain mining already performed); genesis transfers (which may be digital asset transfers that are due based on a previous run of the ghost chain and which are determined from the genesis block); and/or return of member deposits of disenrolled members.

This transaction may also contain useful metadata; for example, the settlement transaction may transfer the solution back to the blockchain network. Accordingly, during this process, the group (i.e., the arbitrator in cooperation with other nodes of the group) may commit the result of the adjudication to the blockchain network. The group may also commit, to the blockchain network, a Merkle root hash of intermediate computational states as determined on-chain on the ghost chain.

Digital assets under group control may be distributed (at step 2208) by the arbitrator in cooperation with other nodes of the group. The distribution of such digital assets may be performed according to a threshold signature scheme defined for the congress (i.e., for the group). As noted in the discussion of congresses above, the threshold signature scheme may be configured such that at least a threshold number of members are required to generate a valid signature for the congress public key. Accordingly, the arbitrator, together with other nodes of the group (i.e., together with the other arbitrators), may consent to transfer digital assets by adding a partial signature to the final transaction using the arbitrator's private key share. Other nodes also add partial signatures using their respective private key shares until at least a threshold number of private key shares required under the threshold signature scheme are used to create a valid signature for the final transaction.

The particular method of distributing the digital assets in the final transaction may depend on the result of the arbitration. For example, when the challenge is successful, the arbitrator may cooperate with other nodes to transfer at least the Challenger deposit to the Challenger and to distribute the Proposer deposit to mining nodes of the ghost chain in proportion to the absolute number of blocks mined. When the challenge is successful and when the Challenger's solution is determined to be correct, the bounty may also be transferred to the Challenger. Thus, the Challenger may receive digital assets at step 2108 of the example process 2100. However, where a binary search is used so that a correct solution is not identified, the bounty may be returned to the Requester who may re-publish the request, allowing the Challenger to submit a proposal based on their answer. Alternatively, when the Proposer is eliminated through binary search, the Requester may treat the Challenger's commit as a proposal and may resume operations at step 1906 of the example process 1900. That is, the requestor may construct a new transaction T1 based on the Challenger's proposal. This transaction may be as described above with reference to step 1906 except that the node that was formerly considered to be the Challenger may now be considered to be the Proposer. Thus, a new transaction T1 may be constructed to be unlocked by the Challenger after expiration of the challenge period by providing a solution that corresponds to the hash of the solution as provided by the Challenger in the transaction T2 described above.

When the work product of the Proposer is determined to be valid, the arbitrator may cooperate with other nodes to transfer the bounty and the Proposer deposit to the Proposer and to distribute the Challenger deposit to mining nodes of the ghost chain in proportion to the absolute number of blocks mined. Thus, the Proposer may receive digital assets at step 2010 of the example process 2000.

If the Proposer's solution and the Challenger's solution are both incorrect, then half of the Challenger deposit and half of the Proposer deposit may be distributed to mining nodes in proportion to the absolute number of blocks mined. Any remaining deposit may be returned to the party from which it was received.

The Requester receives the solution at step 1908 of the example process 1900. The method by which the Requester receives the solution at step 1908 may depend on whether a challenge was issued. If, for example, no challenge was issued, the Proposer committed the solution to the blockchain using the transaction T1 described above with reference to step 1906 of the example process 1900. If, however, a challenge is issued and if the ghost chain determines a solution to the request, the ghost chain nodes may transmit the solution to the requestor on termination of the ghost chain (e.g., at step 2210 of the example process 2200). The ghost chain protocol may, therefore, cause the nodes participating in the ghost chain to automatically transmit the solution to the Requester upon determining the solution.

Further, after judgment is reached on the ghost chain and a transaction is constructed and validly signed, the ghost chain may terminate (at step 2210 of the example process 2200). That is, upon resolution of the challenge the ghost chain terminates. When the ghost chain is terminated, information pertaining to the resolution of the challenge may be transferred back to the proof-of-work blockchain network.

When the ghost chain terminates, no further blocks may be mined onto the ghost chain. That is, unlike a typical blockchain, the ghost chain has a terminal block. The ghost chain may be implemented as a proof-of-stake blockchain that does not fork. The absence of forks means that there may be a definite terminal block when the ghost chain terminates (i.e., a terminal block that is agreed upon by all nodes of the group). After this terminal block, the ghost chain has served its purpose and may not be added to.

As noted previously, when the arbitrators (i.e., the nodes of the congress) reach judgement, the nodes cooperate to construct a transaction that may be broadcast (at step 2208) on the mainchain once the transaction a valid signature has been generated through addition of partial signatures according to the threshold signature scheme as described above. Since this transaction is, itself, a multi-party computation, nodes that contribute towards this transaction may receive a distribution of at least a portion of a digital asset for taking part in this transaction. However, since the transaction is specified before it is signed, remuneration for taking part in the signing (which may include sending of partial signatures to the ghost chain by way of transactions as well as actually mining the blocks) may be deferred until further ghost chain deployment. Such deferral may be provided for in step 2210. More specifically, the terminal block may be constructed with information that allows genesis distributions to be processed during a future deployment of the ghost chain. Such information may be a record of mining distributions that may be due for blocks that were created after the final transaction was constructed, such as blocks that were created during the signing of the final transaction. That is, the genesis distributions may be designed to be distributed to nodes that contributed towards the signing of the final transaction. The terminal block of the ghost chain may become the genesis block of the next ghost chain run (i.e. the next time a ghost chain is deployed). A record is, therefore, created in the terminal block for future genesis distributions.

Note that, according to the implementation noted immediately above, members enroll/disenroll during a ghost chain run, which may be triggered by a challenge. An alternative implementation, would also allow enrolment/disenrollment at regular intervals or under other conditions. This may involve the scheduled run of a ghost chain specifically for this purpose, which would be similar to the ghost chain deployment described above except without the adjudication and judgment stages. In this case, the mining distributions could be distributed at least partially, from 'enrolment distributions' that may be required in return for enrolling.

Also note that the example process 2200 described above describes a ghost chain run that may not be a first ghost chain run. That is, the example process 2200 describes the deployment of a ghost chain that had been deployed at some point in the past such that a terminal block that contains genesis distributions already exists for the ghost chain. The example process 2200 may be modified to allow a first ghost chain to be deployed. For example, the first time that the ghost chain is deployed, the genesis block may be established in another way. For example, the genesis block may be provided by an initially trusted party.

By using a proof-of-stake based blockchain to arbitrate a challenge, the ghost-chain solution can provide faster resolution than performing such arbitrations on the proof-of-work blockchain network itself since proof-of-stake allows for more regular block generation and can be configured to allow for high-frequency block generation. Further, by performing such arbitration operations on the ghost chain rather than on the main blockchain itself, tasks may be pushed off of the main blockchain network so that the main blockchain network is less burdened.

Further, the transient nature of the ghost chain (i.e., the fact that the ghost chain is temporary in nature and terminates) may avoid or reduce the risk of the nothing-at-stake problem that typically affects proof-of-stake blockchain networks. The temporary nature of the ghost chain network allows the congress to require mining nodes of the ghost chain to leave their deposits in place until the ghost chain terminates. That is, the congress may be configured to not permit any congress members to withdraw their stake while the ghost chain is running.

It should be noted that, while the examples described above have referred to operation codes available in Bitcoin, the methods described herein may also be used with other types of blockchain networks.

Figure 23:
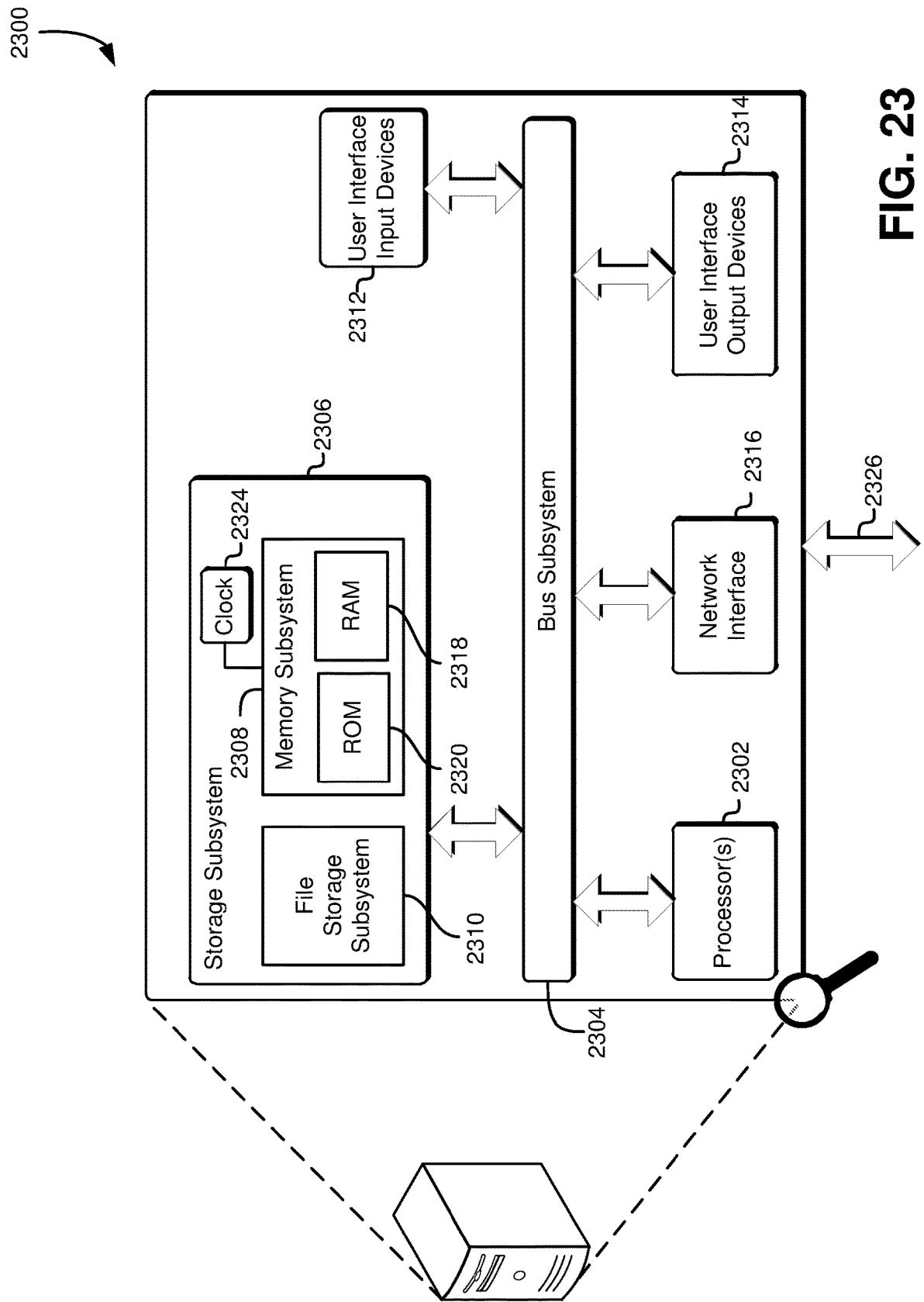
FIG. 23 illustrates a block diagram of an example environment where various embodiments can be implemented.

FIG. 23 illustrates, in block diagram form, an example computing device 2300 where various embodiments of the invention can be implemented. FIG. 23 illustrates a simplified block diagram of an example computing device 2300 that may be used to practice at least one embodiment of the present disclosure. In various embodiments, the example computing device 2300 may be used to implement any of the systems or methods illustrated herein and described above. For example, the example computing device 2300 may be configured for use as a data server, a web server, a portable computing device, a personal computer, or any electronic computing device. As shown in FIG. 23, the example computing device 2300 may include one or more processors 2302 that may be configured to communicate with, and are operatively coupled to, a number of peripheral subsystems via a bus subsystem 2304. These peripheral subsystems may include a storage subsystem 2306, comprising a memory subsystem 2308 and a file storage subsystem 2310, one or more user interface input devices 2312, one or more user interface output devices 2314, and a network interface subsystem 2316. Such storage subsystem 2306 may be used for temporary or long-term storage of information associated with transactions or operations described in the present disclosure.

The bus subsystem 2304 may provide a mechanism for enabling the various components and subsystems of the example computing device 2300 to communicate with each other as intended. Although the bus subsystem 2304 is shown schematically as a single bus, alternative embodiments of the bus subsystem may utilize multiple busses. The network interface subsystem 2316 may provide an interface to other computing devices and networks. The network interface subsystem 2316 may serve as an interface for receiving data from, and transmitting data to, other systems from the example computing device 2300. For example, the network interface subsystem 2316 may enable a user to connect the device to a wireless network or some other network such as those described herein. The bus subsystem 2304 may be utilized for communicating data associated with transactions or operations described in the present disclosure to the one or more processors 2302 and/or to other entities outside of the system via the network interface subsystem 2316.

The user interface input devices 2312 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 2300. The one or more user interface output devices 2314 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2300. The one or more output devices 2314 may be used, for example, to present user interfaces to facilitate user interaction with applications performing processes described herein and variations therein, when such interaction may be appropriate.

The storage subsystem 2306 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem 2306. These application modules or instructions may be executed by the one or more processors 2302. The storage subsystem 2306 may additionally provide a repository for storing data used in accordance with the present disclosure. The storage subsystem 2306 may comprise a memory subsystem 2308 and a file/disk storage subsystem 2310.

The memory subsystem 2308 may include a number of memories, including a main random access memory (RAM) 2318 for storage of instructions and data during program execution and a read only memory (ROM) 2320 in which fixed instructions may be stored. The file storage subsystem 2310 may provide a non-transitory persistent (non-volatile) storage for program and data files (also referred to herein as a non-transitory computer-readable storage medium), and may include a hard disk drive, a floppy disk drive along with associated removable media, a Compact Disk Read Only Memory (CD-ROM) drive, an optical drive, removable media cartridges, and other like storage media.

The example computing device 2300 may include at least one local clock 2324. The local clock 2324 may be a counter that represents the number of ticks that have transpired from a particular starting date and may be located integrally within the example computing device 2300. The local clock 2324 may be used to synchronize data transfers in the processors for the example computing device 2300 and all of the subsystems included therein at specific clock pulses and may be used to coordinate synchronous operations between the example computing device 2300 and other systems in a datacenter. In one embodiment, the local clock 2324 is an atomic clock. In another embodiment, the local clock is a programmable interval timer.

The example computing device 2300 may be of various types, including a portable computer device, tablet computer, a workstation, or any other device described herein. Additionally, the example computing device 2300 may include another device that may be connected to the example computing device 2300 through one or more ports 2326 (e.g., USB, a headphone jack, Lightning connector, etc.). The device that may be connected to the example computing device 2300 may include a plurality of ports configured to accept fiber-optic connectors. Accordingly, device that may be connected to the example computing device 2300 may be configured to convert optical signals to electrical signals that may be transmitted through the port connecting the device to the example computing device 2300 for processing. Due to the ever-changing nature of computers and networks, the description of the example computing device 2300 depicted in FIG. 23 is intended only as a specific example for purposes of illustrating an embodiment of the device. Many other configurations having more or fewer components than the system depicted in FIG. 23 are possible.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
monitoring a computational task distribution system to detect a challenge to a proposer string provided by a proposer computer system in response to a request made by a requester computer system, the request specifying a computational task and a first digital asset associated with the request, the proposer string indicated by a hash of a solution to the computational task, the proposer string specifying a second digital asset referenced in an input to a proposer transaction associated with the proposer string; and
as a result of detecting the challenge, at least:
resolving the challenge using a first blockchain network by at least selecting a solution from a set of solutions provided to the first blockchain network, the set of solutions at least including the proposer string; and
distributing digital assets from the first digital asset and the second digital asset to one or more parties of the computational task distribution system based at least in part on the solution.

2. The computer-implemented method claimed in claim 1, wherein the proposer string is selected from the set of solutions based at least in part on a timestamp associated with the proposer string.

3. The computer-implemented method claimed in claim 1, wherein the challenge specifies a hash of a challenger string to the computational task and the set of solutions includes the challenger string.

4. The computer-implemented method claimed in claim 1, wherein the computational task distribution system is implemented as a webservice associated with a proof-of-work blockchain network.

5. The computer-implemented method claimed in claim 1, wherein the computational task distribution system is implemented on a proof-of-work blockchain network.

6. The computer-implemented method claimed in claim 1, wherein the first blockchain network is a proof-of-stake blockchain network.

7. The computer-implemented method claimed in claim 1, wherein the proposer string indicates that there is no solution to the computational task.

8. The computer-implemented method claimed in claim 1, wherein the challenge indicates that there is no solution to the computational task.

9. The computer-implemented method claimed in claim 1, wherein the digital assets include a deposit provided by the proposer to the first blockchain network.

10. The computer-implemented method claimed in claim 1, wherein the digital assets are distributed from the first digital asset, the second digital asset, and a third digital asset referenced in an input to a transaction associated with the challenge.

11. The computer-implemented method claimed in claim 1, wherein resolving the challenge includes performing a corresponding set of verification operations of one or more solutions of the set of solutions.

12. The computer-implemented method claimed in claim 1, wherein resolving the challenge includes performing an arbitration procedure that at least includes:
receiving, from the proposer, a first set of intermediate results for the proposer string of the set of solutions;
receiving, from a challenger, a second set of intermediate results for a challenger string of the set of solutions;
comparing the first set of intermediate results to the second set of intermediate results to determine a location where the proposer string and the challenger string diverge; and
selecting a solution based at least in part on:
repeating one or more calculations of the first set of intermediate results at the location using the first blockchain network; and
repeating one or more calculations of the second set of intermediate results at the location using the first blockchain network.

13. The computer-implemented method claimed in claim 1, wherein resolving the challenge at least includes identifying an incorrect solution of the set of solutions by at least:
receiving, from the proposer, a first set of intermediate results for the proposer string of the set of solutions;
receiving, from a challenger, a second set of intermediate results for a challenger string of the set of solutions;
analyzing the first set of intermediate results and the second set of intermediate results to identify a location where the proposer string and the challenger string diverge; and
identifying the incorrect solution based at least in part on the analyzing.

14. A system, comprising:
a processor; and
memory including executable instructions that, as a result of execution by the processor, cause the system to:
monitor a computational task distribution system to detect a challenge to a proposer string provided by a proposer computer system in response to a request made by a requester computer system, the request specifying a computational task and a first digital asset associated with the request, the proposer string indicated by a hash of a solution to the computational task, the proposer string specifying a second digital asset referenced in an input to a proposer transaction associated with the proposer string; and
as a result of detecting the challenge, at least:
resolve the challenge using a first blockchain network by at least selecting a solution from a set of solutions provided to the first blockchain network, the set of solutions at least including the proposer string; and
distribute digital assets from the first digital asset and the second digital asset to one or more parties of the computational task distribution system based at least in part on the solution.

15. A non-transitory computer-readable storage medium having stored thereon executable instructions that, as a result of being executed by a processor of a computer system, cause the computer system to:
monitor a computational task distribution system to detect a challenge to a proposer string provided by a proposer computer system in response to a request made by a requester computer system, the request specifying a computational task and a first digital asset associated with the request, the proposer string indicated by a hash of a solution to the computational task, the proposer string specifying a second digital asset referenced in an input to a proposer transaction associated with the proposer string; and
as a result of detecting the challenge, at least:
resolve the challenge using a first blockchain network by at least selecting a solution from a set of solutions provided to the first blockchain network, the set of solutions at least including the proposer string; and
distribute digital assets from the first digital asset and the second digital asset to one or more parties of the computational task distribution system based at least in part on the solution.

* * * * *